(12) United States Patent
Monti

(10) Patent No.: US 12,235,065 B2
(45) Date of Patent: Feb. 25, 2025

(54) METHODS AND APPARATUSES FOR HAPTIC SYSTEMS

(71) Applicant: Haptech, Inc., New Orleans, LA (US)

(72) Inventor: Kyle Monti, Luling, LA (US)

(73) Assignee: HAPTECH, INC., New Orleans, LA (US)

( * ) Notice: Subject to any disclaimer, the term of this patent is extended or adjusted under 35 U.S.C. 154(b) by 0 days.

(21) Appl. No.: 18/655,755

(22) Filed: May 6, 2024

(65) Prior Publication Data

US 2024/0295378 A1    Sep. 5, 2024

Related U.S. Application Data

(63) Continuation of application No. 17/100,912, filed on Nov. 22, 2020, now Pat. No. 11,512,919.

(51) Int. Cl.
| | |
|---|---|
| *F41A 33/06* | (2006.01) |
| *A63F 13/245* | (2014.01) |
| *A63F 13/285* | (2014.01) |
| *A63F 13/837* | (2014.01) |

(52) U.S. Cl.
CPC ............ *F41A 33/06* (2013.01); *A63F 13/245* (2014.09); *A63F 13/285* (2014.09); *A63F 13/837* (2014.09)

(58) Field of Classification Search
CPC .......... F41A 33/00; F41A 33/02; F41A 33/04; F41A 33/06; A61F 13/245; A61F 13/285; A61F 13/837
See application file for complete search history.

(56) References Cited

U.S. PATENT DOCUMENTS

| | | |
|---|---|---|
| 2,023,497 A | 12/1935 | Trammell |
| 2,398,813 A | 4/1946 | Swisher |
| 2,520,281 A | 8/1950 | Heide |
| 2,674,923 A | 4/1954 | Brandt |
| 2,708,319 A | 5/1955 | Tratsch |
| 2,820,608 A | 1/1958 | Braselmann |
| 2,845,270 A | 7/1958 | Durant |
| 2,928,190 A | 3/1960 | Evans |
| 2,995,834 A | 8/1961 | Rowe |
| 3,057,102 A | 10/1962 | Hirsch |
| 3,088,225 A | 5/1963 | Amistadi |
| 3,220,732 A | 11/1965 | Pincus |
| 3,334,425 A | 8/1967 | Ohlund |
| 3,423,848 A | 1/1969 | Ohlund |
| 3,704,530 A | 12/1972 | Arenson |
| 3,964,178 A | 6/1976 | Marshall |
| 4,007,934 A | 2/1977 | Ochi |
| 4,019,423 A | 4/1977 | Johnson |

(Continued)

FOREIGN PATENT DOCUMENTS

| | | |
|---|---|---|
| CA | 2746225 A1 | 1/2012 |
| CN | 101441052 | 5/2009 |

(Continued)

OTHER PUBLICATIONS

"Common knowledge book" 1 Jun. 2000, pp. 4-7, 347-348.

*Primary Examiner* — Timothy A Musselman
(74) *Attorney, Agent, or Firm* — Jason P. Mueller; FisherBroyles, LLP

(57) ABSTRACT

Methods and apparatuses are provided that include linear motors and controllers configured to simulate haptic feedback for gaming devices and simulations systems, including gaming firearms and other peripheral devices used in various gaming environments.

21 Claims, 54 Drawing Sheets

(56) References Cited

U.S. PATENT DOCUMENTS

| | | |
|---|---|---|
| 4,050,166 A | 9/1977 | Swiatosz |
| 4,079,525 A | 3/1978 | Linton |
| 4,194,304 A | 3/1980 | Wolcott |
| 4,202,115 A | 5/1980 | Borel |
| 4,302,190 A | 11/1981 | Shaw |
| 4,321,043 A | 3/1982 | Grimmer |
| 4,365,959 A | 12/1982 | Caurant |
| 4,380,437 A | 4/1983 | Yarborough, Jr. |
| 4,480,999 A | 11/1984 | Witherell |
| 4,725,235 A | 2/1988 | Schroeder |
| 4,804,325 A | 2/1989 | Willits |
| 4,812,122 A | 3/1989 | Mueller |
| 4,829,877 A | 5/1989 | Zerega |
| 4,830,617 A | 5/1989 | Hancox |
| 4,963,096 A | 10/1990 | Khattak |
| 5,201,658 A | 4/1993 | Taylor |
| 5,244,431 A | 9/1993 | D Andrade |
| 5,257,937 A | 11/1993 | Bousquet |
| 5,857,854 A | 1/1999 | Kwalwasser |
| 5,947,738 A | 9/1999 | Muehle |
| 6,019,681 A | 2/2000 | Oishi |
| 6,088,019 A | 7/2000 | Rosenberg |
| 6,322,365 B1 | 11/2001 | Shechter |
| 6,572,375 B2 | 6/2003 | Shechter |
| 6,575,753 B2 | 6/2003 | Rosa |
| 6,579,098 B2 | 6/2003 | Shechter |
| 6,616,452 B2 | 9/2003 | Clark |
| 6,680,729 B1 | 1/2004 | Shahoian |
| 6,770,988 B2 | 8/2004 | Denne |
| 6,820,608 B2 | 11/2004 | Schavone |
| 6,869,285 B1 | 3/2005 | Jones, II |
| 6,874,492 B1 | 4/2005 | Schavone |
| 6,935,864 B2 | 8/2005 | Shechter |
| RE38,877 E | 11/2005 | Trabut |
| 7,025,052 B2 | 4/2006 | Schavone |
| 7,329,127 B2 | 2/2008 | Kendir |
| 7,581,954 B2 | 9/2009 | Schavone |
| 7,681,483 B1 | 3/2010 | Rhoades |
| 8,082,911 B1 | 12/2011 | Anderson |
| 8,166,797 B2 | 5/2012 | Mooty |
| 8,356,995 B2 | 1/2013 | Lvovskiy |
| 8,449,346 B2 | 5/2013 | Lee |
| 8,506,369 B2 | 8/2013 | Grant |
| 8,608,474 B2 | 12/2013 | Markert |
| 8,920,172 B1 | 12/2014 | Wilmink |
| 2002/0054011 A1 | 5/2002 | Bruneau |
| 2002/0103025 A1 | 8/2002 | Murzanski |
| 2002/0163497 A1 | 11/2002 | Cunningham |
| 2003/0013524 A1 | 1/2003 | Cochran |
| 2003/0022135 A1 | 1/2003 | Shechter |
| 2004/0174340 A1 | 9/2004 | Bruneau |
| 2005/0130739 A1 | 6/2005 | Argentar |
| 2005/0248549 A1 | 11/2005 | Dietz |
| 2005/0260545 A1 | 11/2005 | Schavone |
| 2007/0152514 A1 | 7/2007 | Motherway |
| 2007/0184909 A1 | 8/2007 | Kitami |
| 2008/0161829 A1 | 7/2008 | Kang |
| 2009/0085558 A1 | 4/2009 | David |
| 2009/0253103 A1 | 10/2009 | Hogan, Jr. |
| 2010/0173686 A1 | 7/2010 | Grant |
| 2010/0216097 A1 | 8/2010 | Romagnoli |
| 2010/0245232 A1 | 9/2010 | Birnbaum |
| 2011/0121654 A1 | 5/2011 | Recker |
| 2011/0181129 A1 | 7/2011 | Aso |
| 2011/0282188 A1 | 11/2011 | Burnside |
| 2011/0318715 A1 | 12/2011 | Markert |
| 2012/0122058 A1 | 5/2012 | Jensen |
| 2012/0148989 A1 | 6/2012 | Lvovskiy |
| 2012/0225413 A1 | 9/2012 | Kotranza |
| 2012/0271197 A1 | 10/2012 | Castle |
| 2013/0002411 A1 | 1/2013 | Henderson |
| 2013/0316308 A1 | 11/2013 | Monti |
| 2013/0323700 A1 | 12/2013 | Samosky |
| 2014/0272806 A1 | 9/2014 | Hunt |

FOREIGN PATENT DOCUMENTS

| | | |
|---|---|---|
| CN | 202648520 | 1/2013 |
| EP | 0768506 | 4/1997 |
| EP | 1236965 | 9/2002 |
| EP | 1243888 | 9/2002 |
| EP | 1243889 A1 | 9/2002 |
| FR | 2345694 | 10/1977 |
| GB | 2319076 | 5/1998 |
| JP | H04212986 A | 8/1992 |
| JP | H05192449 | 8/1993 |
| JP | 2003180896 | 7/2003 |
| JP | 2003308514 | 10/2003 |
| JP | 2008073184 | 4/2008 |
| JP | 2008092751 | 4/2008 |
| JP | 2008546534 | 12/2008 |
| JP | 2010063346 | 3/2010 |
| JP | 2010225155 | 10/2010 |
| JP | 2010233752 | 10/2010 |
| JP | 4950798 | 6/2012 |
| JP | 2012526331 | 10/2012 |
| JP | 2014513367 | 5/2014 |
| RU | 114142 | 3/2012 |
| WO | 0124158 | 4/2001 |
| WO | 2008026642 | 3/2008 |
| WO | 2009025891 A2 | 2/2009 |
| WO | 2012082072 A1 | 6/2012 |

METHODS AND APPARATUSES FOR HAPTIC SYSTEMS

This application is a continuation of U.S. patent application Ser. No. 17/737,696, filed May 22, 2022, which is a continuation of U.S. patent application Ser. No. 17/100,912, filed Nov. 22, 2020, which is a continuation of U.S. patent application Ser. No. 14/951,961, filed Nov. 25, 2015, now U.S. Pat. No. 10,852,093, which is a continuation-in-part of U.S. patent application Ser. No. 14/808,247, filed Jul. 24, 2015, now U.S. Pat. No. 9,810,502, which is a continuation of U.S. patent application Ser. No. 13/804,429, filed Mar. 14, 2013, now U.S. Pat. No. 9,146,069, which claims the benefit of U.S. Provisional Application No. 61/650,006, filed May 22, 2012. U.S. patent application Ser. No. 14/808,247 also claims benefit of U.S. Provisional Application No. 62/085,443, filed Nov. 28, 2014, and U.S. Provisional Application No. 62/170,572, filed Jun. 3, 2015. The entire contents of each of the above applications are incorporated herein by reference. U.S. patent application Ser. No. 14/551,526 is also incorporated by reference herein.

DESCRIPTION OF EMBODIMENTS

Figure 1:
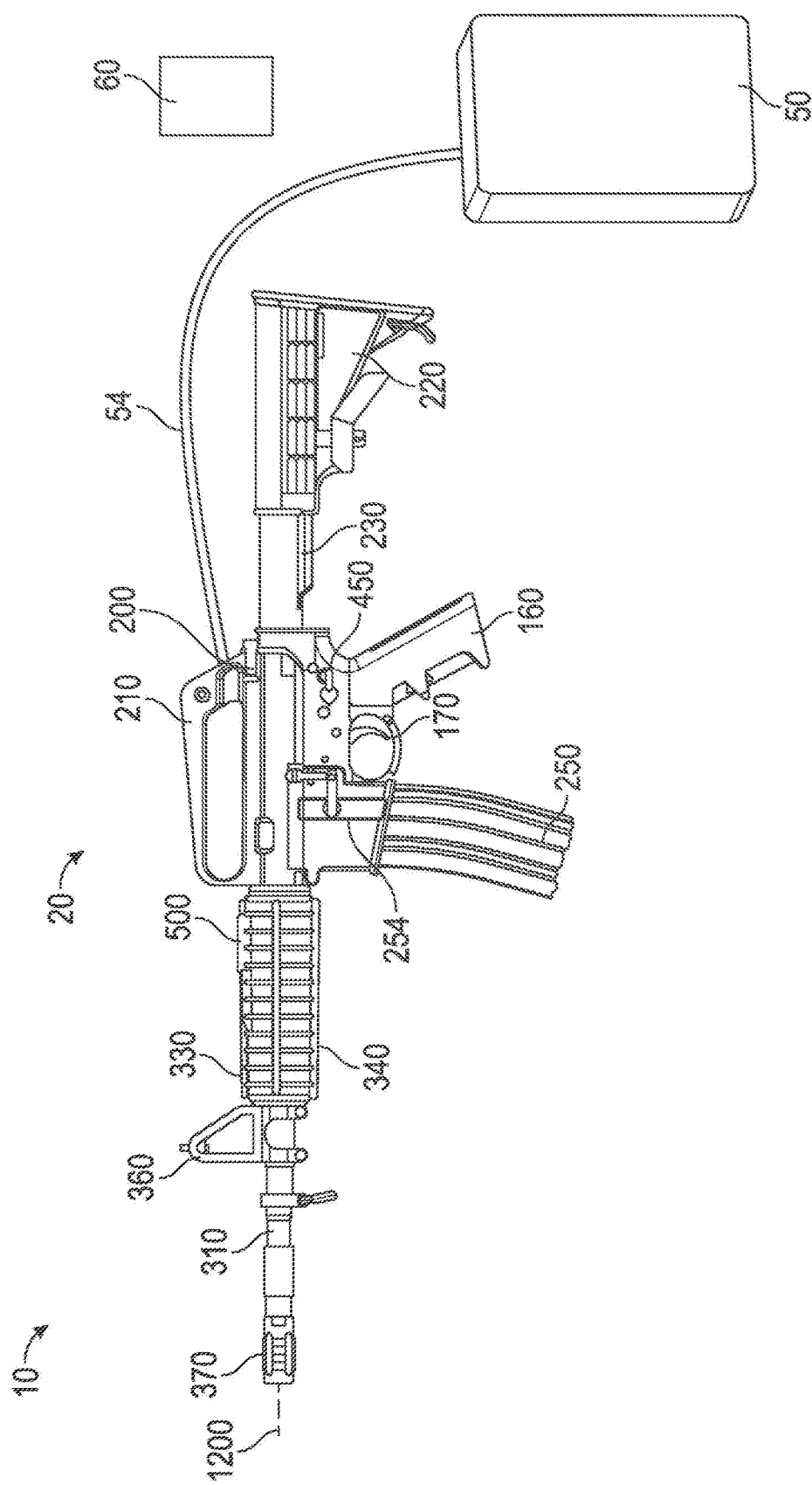
FIG. 1 is a side view of a firearm training system, according to an exemplary embodiment of the present disclosure.

Methods and apparatuses are provided for haptic systems. Embodiments include linear motors configured to simulate haptic feedback for gaming devices and simulations systems, including gaming firearms and other peripheral devices used in various gaming environments.

Embodiments relate to simulating of recoil for firearms. More specifically, an embodiment provides a method and apparatus for simulating the recoil of a selected conventional firearm. Embodiments additionally provide a laser to simulate the path of a bullet if the bullet had been fired from a firearm being simulated by the method and apparatus.

Firearms training for military personnel, law enforcement officers, and private citizens increasingly encompass role playing and decision making in addition to marksmanship. Such training often includes competing against role players and/or responding to situations projected onto a screen in front of the trainee.

Although self-healing screens exist, permitting the use of conventional firearms for such training, the use of such a system requires a location appropriate to the use of conventional firearms. Furthermore, such systems are expensive and may be unreliable. Alternatives to conventional firearms have been developed. These alternatives include paintball, simulated munitions, and the use of a laser to show the path a bullet would have taken had one been fired.

Such alternatives, however, do not duplicate substantially all of the characteristics of firing an actual weapon with actual ammunition, and limit the extent to which the training will carry over to use of actual firearms. In various embodiments, the characteristics of a conventional firearm to be duplicated may include size, weight, grip configuration, trigger reach, trigger pull weight, type of sights, level of accuracy, method of reloading, method of operation, location and operation of controls, and/or recoil.

Realistic recoil is a difficult characteristic to duplicate. The inability to get a trainee accustomed to the recoil generated by a particular firearm is one of the greatest disadvantages in the use of various firearm training simulators. Recoil not only forces a firearm shooter to reacquire the sights after shooting, but also forces the shooter to adapt to a level of discomfort proportional to the energy of the particular bullet to be fired by the firearm. Recoil is significantly more difficult to control during full automatic fire than during semi-automatic fire, making the accurate simulation of both recoil and cyclic rate important in ensuring that simulation training carries over to the use of actual firearms.

Embodiments provide a firearm training simulator having a recoil emulating the recoil impulse pattern of a particular firearm firing a particular size and type of bullet. In an embodiment, the method and apparatus may include a laser beam projector for projecting the path of a bullet fired from the particular firearm being simulated.

In various embodiments, the method and apparatus may also simulate additional operations of a particular firearm, which operations include sighting, positioning of the firearm controls, and methods of operation of the firearm. Particular firearms that may be simulated include M4, AR-15, or M-16 rifles, along with other conventional firearms, including pistols and heavy firearms.

In an embodiment, a method and apparatus may be controlled by a combination of the trigger assembly, bolt, and linear motor. In embodiments, methods and apparatuses may be capable of simulating modes of semi-automatic fire and full automatic firing. In various embodiments, the cyclic rate of full automatic firing mode simulation may be substantially the same cyclic rate of a conventional automatic rifle.

An embodiment provides a laser substantially tracking the path of an actual bullet being fired from a firearm being simulated. One laser emitter may be housed within the barrel of the firearm simulating body. In an embodiment, the laser emitter may be operatively connected to a controller which may also be operatively connected to a recoil. An embodiment of the switch may be a roller switch structured to be actuated by a switching rod extending forward from the bolt. When the bolt moves forward in response to pulling the trigger, the switching rod may engage the roller of the switch, thereby depressing the switch and actuating the laser. Another embodiment may use a proximity switch mounted in a location wherein a magnet may be brought into contact with it upon forward movement of the bolt. A preferred location may be adjacent to the juncture between a barrel and upper receiver. A magnet affixed to the bolt may be structured to be brought into proximity with the proximity switch when the bolt is in its forwardmost position, thereby causing the proximity switch to actuate the laser.

One embodiment provides a method and apparatus wherein the level of recoil imparted to the user may be programmed by the user.

One embodiment provides a method and apparatus capable of both semi-automatic and full automatic operation.

One embodiment provides a method and apparatus wherein different cyclic rates of full automatic fire may be programmed by the user.

One embodiment provides a method and apparatus including a laser assembly projecting laser substantially along the path of a bullet that may have been fired from the firearm being simulated.

One embodiment provides a method and apparatus simulating the recoil of a conventional firearm using a linear motor controlling a sliding mass and operatively coupled to a controller.

A linear motor may be thought of as an electric motor that has had its stator and rotor "unrolled" so that, instead of producing a torque (i.e., through rotation), it produces a linear force along its longitudinal length. The most common mode of operation for conventional linear motors is as a Lorentz-type actuator, in which the applied force is linearly proportional to the current and the magnetic field.

Many designs have been put forward for linear motors, falling into two major categories: low-acceleration and high-acceleration linear motors. Low-acceleration linear motors are suitable for maglev trains and other ground-based transportation applications. High-acceleration linear motors are normally rather short, and are designed to accelerate an object to a very high speed, for example, see the railgun. High-acceleration linear motors are usually used for studies of hypervelocity collisions, as weapons, or as mass drivers for spacecraft propulsion. High-acceleration motors are usually of the AC linear induction motor (LIM) design with an active three-phase winding on one side of the air-gap and a passive conductor plate on the other side. However, the direct current homopolar linear motor railgun may be another high acceleration linear motor design. The low-acceleration, high speed and high power motors are usually of the linear synchronous motor (LSM) design, with an active winding on one side of the air-gap and an array of alternate-pole magnets on the other side. These magnets may be permanent magnets or energized magnets. The Trans rapid Shanghai motor is an LSM design.

Linear motors employ a direct electromagnetic principle. Electromagnetic force provides direct linear movement without the use of cams, gears, belts, or other mechanical devices. The motor includes two parts: the slider and the stator. The slider is a precision assembly that includes a stainless steel tube, which is filled with neodymium magnets, that has threaded attachment holes on each end. The stator, including coils, the bearing for the slider, position sensors and a microprocessor board, may be designed for use in harsh industrial environments.

A solenoid is a coil wound into a tightly packed helix. The term solenoid refers to a long, thin loop of wire, often wrapped around a metallic core, which produces a magnetic field when an electric current is passed through it. The term solenoid refers to a coil designed to produce a uniform magnetic field in a volume of space (where some experiment might be carried out). In engineering, the term solenoid may also refer to a variety of transducer devices that convert energy into linear motion. The term is also often used to refer to a solenoid valve, which is an integrated device containing an electromechanical solenoid which actuates either a pneumatic or hydraulic valve, or a solenoid switch, which is a specific type of relay that internally uses an electromechanical solenoid to operate an electrical switch. For example, electromechanical solenoid may be an automobile starter solenoid or a linear solenoid.

Electromechanical solenoids include an electromagnetically inductive coil, wound around a movable steel or iron slug (termed the armature). The coil may be shaped such that the armature may be moved in and out of the center, altering the coil's inductance and thereby becoming an electromagnet. The armature may be used to provide a mechanical force to some mechanism (such as controlling a pneumatic valve). Although typically weak over anything but very short distances, solenoids may be controlled directly by a controller circuit, and thus have very low reaction times. The force applied to the armature is proportional to the change in inductance of the coil with respect to the change in position of the armature, and the current flowing through the coil (see Faraday's law of induction). The force applied to the armature will always move the armature in a direction that increases the coil's inductance. The armature may be a ferromagnetic material.

Free recoil is a vernacular term or jargon for recoil energy of a firearm not supported from behind. Free recoil denotes the translational kinetic energy ($E_t$) imparted to the shooter of a small arm when discharged and is expressed in joule(J) and foot-pound force (ft·lbf) for non-SI units of measure. More generally, the term refers to the recoil of a free-standing firearm, in contrast to a firearm securely bolted to or braced by a massive mount or wall.

Free recoil should not be confused with recoil. Free recoil is the given name for the translational kinetic energy transmitted from a small arm to a shooter. Recoil is a name given for conservation of momentum as it generally applies to an everyday event. Free recoil, sometimes called recoil energy, is a byproduct of the propulsive force from the powder charge held within a firearm chamber (metallic cartridge firearm) or breech (black powder firearm). The physical event of free recoil occurs when a powder charge is detonated within a firearm, resulting in the conversion of chemical energy held within the powder charge into thermodynamic energy. This energy may then be transferred to the base of the bullet and to the rear of the cartridge or breech, propelling the firearm rearward into the shooter while the projectile is propelled forward down the barrel, with increasing velocity, to the muzzle. The rearward energy of the firearm is the free recoil and the forward energy of the bullet is the muzzle energy.

The concept of free recoil comes from the tolerability of gross recoil energy. Figuring out the net recoil energy of a firearm (also known as felt recoil) is a futile endeavor. Even the recoil energy loss due to: muzzle brake; recoil operated action or gas operated action; mercury recoil suppression tube; recoil reducing butt pad and/or hand grip; shooting vest and/or gloves can be calculated, the human factor is not calculable.

Free recoil may be thought of as a scientific measurement of recoil energy. The comfort level of a shooter's ability to tolerate free recoil is a personal perception. This personal perception may be similar to, for example, a person's personal perception of how comfortable he or she feels to room or outside temperature.

Many factors may determine how a shooter may perceive the free recoil of his or her small arm. Some of the factors include, but are not limited to: body mass; body frame; experience; shooting position; recoil suppression equipment; small arm fit and/or environmental stressors.

Several different methods may be used to calculate free recoil. The two most common methods are indicated via momentum short and long form equations.

Both forms may yield the same value. The short form uses one equation while the long form requires two equations. In the long form, the fire/small arm velocity may first be determined. With the velocity known for the small arm, the free recoil of the small arm may be calculated using the translational kinetic energy equation. A calculation may be performed as follows:

Momentum short form:

$$E_{tgu} = 0.5 * m_{gu} * [[(m_p * v_p) * (m_c * v_c)]/1000]^2 / m_{gu}^2$$

Momentum long form:

$$v_{gu} = [(m_p * v_p) + (m_c * v_c)]/(1000 * m_{gu}) \text{ and}$$

and $$E_{tgu} = 0.5 * m_{gu} * v_{gu}^2$$

Where:
$E_{tgu}$ is the translational kinetic energy of the small arm as expressed by the joule (J).
$m_{gu}$ is the weight of the small arm expressed in kilograms (kg).
$m_p$ is the weight of the projectile expressed in grams (g).
$m_c$ is the weight of the powder charge expressed in grams (g).
$v_{gu}$ is the velocity of the small arm expressed in meters per second (m/s).
$v_p$ is the velocity of the projectile expressed in meters per second (m/s).
$v_e$ is the velocity of the powder charge expressed in meters per second (m/s).
1000 is the conversion factor to set the equation equal to kilograms.

In various embodiments, the linear motor may include a sliding mass/rod including a plurality of individual magnets each having north and south poles. In various embodiments, the plurality of individual magnets may be longitudinally aligned with like poles of adjacent magnets facing like poles. In various embodiments, the plurality of individual magnets may be longitudinally aligned with unlike poles of adjacent magnets facing unlike poles. In various embodiments, the plurality of individual magnets in the sliding mass/rod may include 2, 3, 4, 5, 6, 7, 8, 9, 10, 11, 12, 13, 14, 15, 16, 19, 20, 25, 30, 35, 40, 45, and/or 50 magnets. In various embodiments, the number of magnets may be between the range of any two of the above listed numbers.

Linear motor may include a plurality of magnetic coils independently controllable with respect to each other regarding timing and/or amount of current flow. In various embodiments, the plurality of independently controllable magnetic coils may each be independently controllable regarding the timing and/or amount of current flow and/or direction of current flow.

In embodiments, each of the plurality of independently controllable magnetic coils may include a plurality of sub-coil sections spaced apart from each other but connected electrically in series causing the electrically serially connected spaced apart sub-coil sections to form a single independently controllable magnetic coil. In various embodiments, at least one sub-coil of a first independently controllable magnetic coil of the plurality of coils may be intermediately spaced between two spaced apart sub-coils of a second independently controllable magnetic coil of the plurality of coils.

Linear motor may include a plurality of independently controllable magnetic coils which are longitudinally aligned with each other and closely spaced, wherein at least two adjacent independently controllable magnetic coils may be energized to create oppositely polarized magnetic fields. In embodiments, the linear motor may include a plurality of independently controllable magnetic coils which are longitudinally aligned, wherein adjacent independently controllable magnetic coils may be simultaneously energized to create oppositely polarized magnetic fields.

In various embodiments, the linear motor may include a plurality of independently controllable magnetic coils which may be longitudinally aligned with each other and closely spaced, slidingly connected to a sliding mass of magnets, which sliding mass may include a plurality of longitudinally aligned adjacent magnets, wherein the linear motor may cause movement of a sliding mass of magnets by varying current through individual independently controllable coils in relation to the proximity of a particular magnet in the plurality of magnets to a particular coil in the plurality of independently controllable magnetic coils.

In various embodiments, the plurality of individually controllable magnetic coils in the plurality of coils may include at least 2, 3, 4, 5, 6, 7, 8, 9, 10, 11, 12, 13, 14, 15, 16, 19, 20, 25, 30, 35, 40, 45, and/or 50 independently controllable coils. In embodiments, the number of independently controllable magnetic coils may be between the range of any two of the above listed numbers.

In one embodiment, a plurality of linear motors may be provided that independently control a plurality of different controllable weight units.

In an embodiment, a housing facade unit may be provided having a plurality of different spaced apart positional locations in the housing facade unit for receiving and holding one or more linear motors and controllable weight units. In various embodiments the positional locations may be selectable by a user.

In another embodiment, a housing facade unit may be provided having a plurality of different angular orientations for receiving and holding one or more linear motors and controllable weight units. In various embodiments, the angular orientations may be selectable by a user.

In yet another embodiment, a plurality of different housing facade units may be provided with different positions and/or angular orientations for receiving and holding one or more linear motors and controllable weight units. In various embodiments, the positional locations and/or angular orientations may be selectable by a user.

In one embodiment, a selectable set of linear motors and controllable weight units may be provided, each having adjustable configurations including spacing and/or orientation of the different controllable weights in a housing.

In various embodiments, one or more of the linear motors and controllable weight units may include a plurality of different weight inserts.

In other embodiments, one or more of the linear motors and controllable weight units may include a plurality of different and selectable mechanical stopping positions for the controllable weights.

In some embodiments, methods and apparatuses disclosed herein may simulate operations of one or more selectable gaming devices such as tennis racket, baseball bat, magic wand, hockey stick, cricket bat, badminton, pool stick, boxing glove(s), sword, light saber, bow and arrow, golf club, and fishing pole.

In various embodiments, the methods and apparatuses disclosed herein may haptically simulate one or more secondary type actions of system being emulated, for example, halo plasma gun, broken bat, bat vibrations after hitting baseball, weapon, charging/loading, etc.

One embodiment may provide a firearm simulator body 20 which may simulate an M-4A1, AR-15, M-16 rifle or any other type of rifle. While body 20 is shown as a rifle in FIG. 1, embodiments of the present disclosure as described herein may include various other firearm bodies. For example, embodiments of the present disclosure may include simulation systems for handguns, rifles, shotguns, and heavy weapons, including M2s, Mark 19s, Rocket Propelled Grenade (RPG) Launchers, Mortars, and Machine Guns. The list above is not exhaustive and various different types of bodies may be included that incorporate the recoil/shock systems described herein for firearm simulation in gaming, military and other applications.

As shown in the example embodiment of FIGS. 1 to 4, firearm simulator body 20 includes upper receiver 120 and lower receiver 140. Like a conventional M-16, upper receiver 120 may be pivotally secured to lower receiver 140 by a screw or pin.

Lower receiver 140 may include a pistol grip 160, a trigger 170 disposed in front of the pistol grip 160, and a selector 450 disposed above the pistol grip 160. A shoulder stock 220 may be secured to lower receiver 140.

A barrel assembly 300 may be mounted to the front portion of upper receiver 120. 30 The barrel assembly 300 may include a barrel 310 which may be directly secured to upper receiver 120. An upper handguard 330 and lower handguard 340 may be secured to barrel assembly 300. A front sight block 360 may be disposed around barrel 310.

Figure 2:
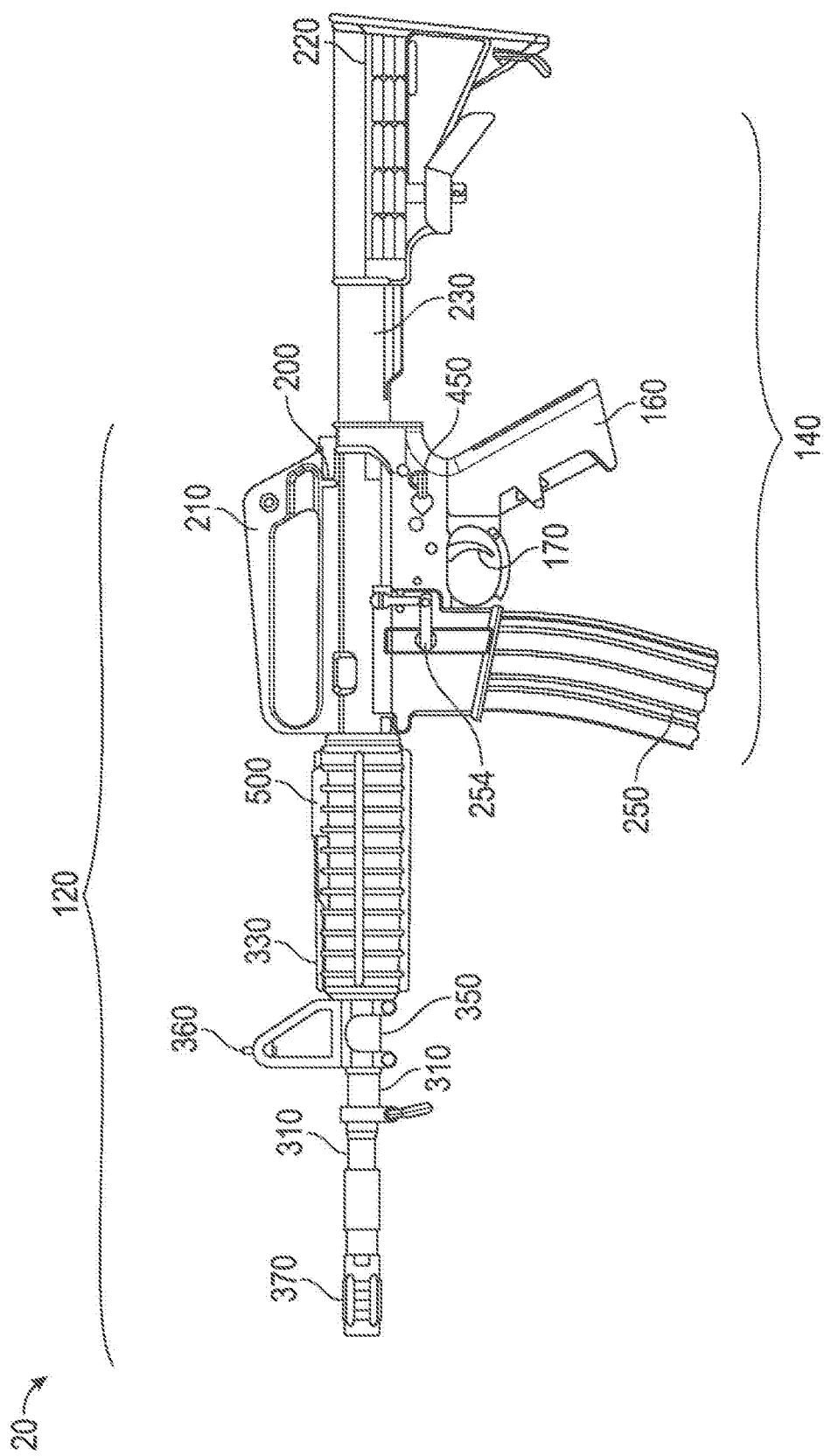
FIG. 2 is a side view of a simulated firearm body of the system shown in FIG. 1.
Figure 3:
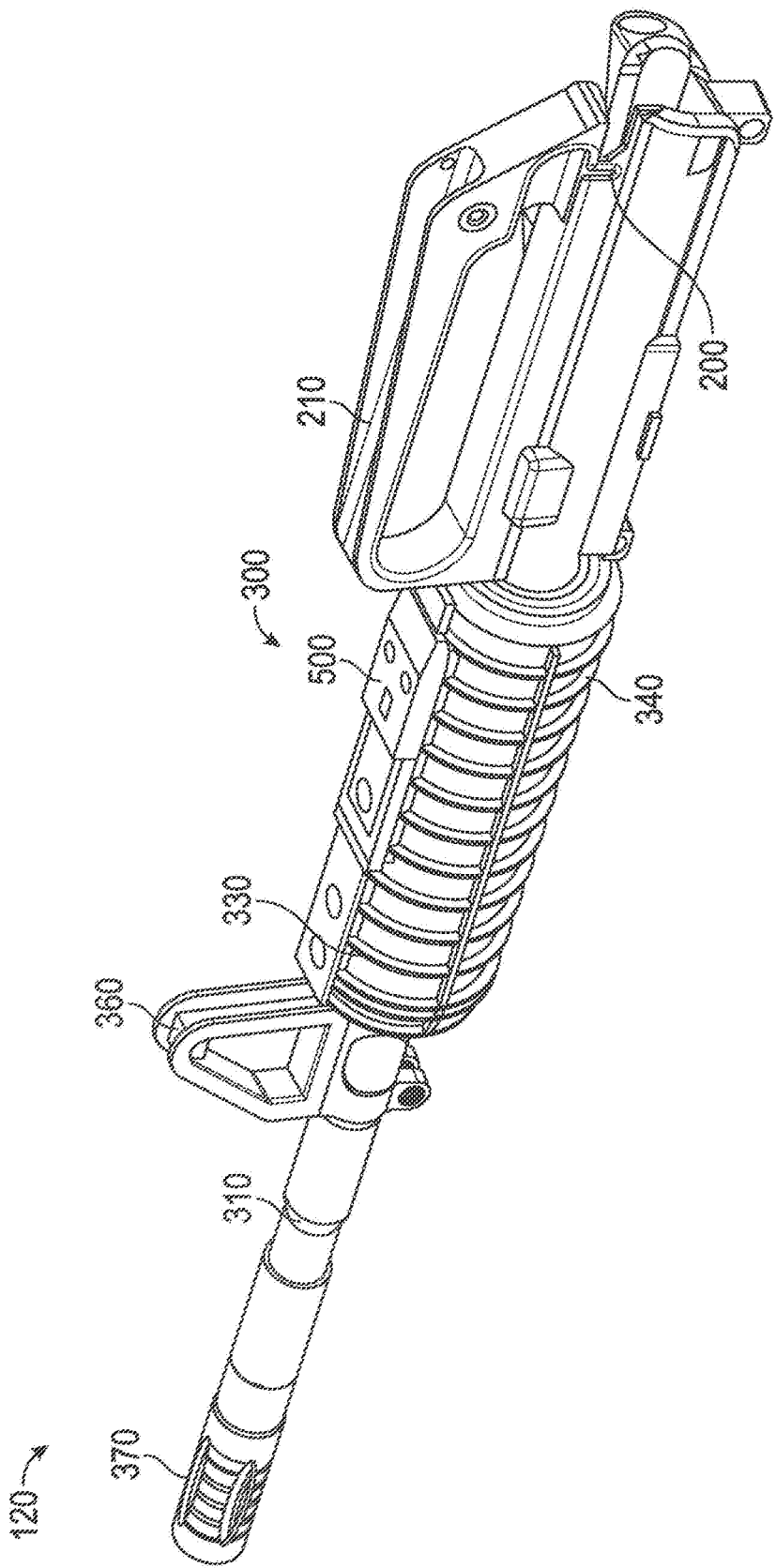
FIG. 3 is a perspective view of an upper assembly of the simulated firearm body shown in FIG. 2.
Figure 4:
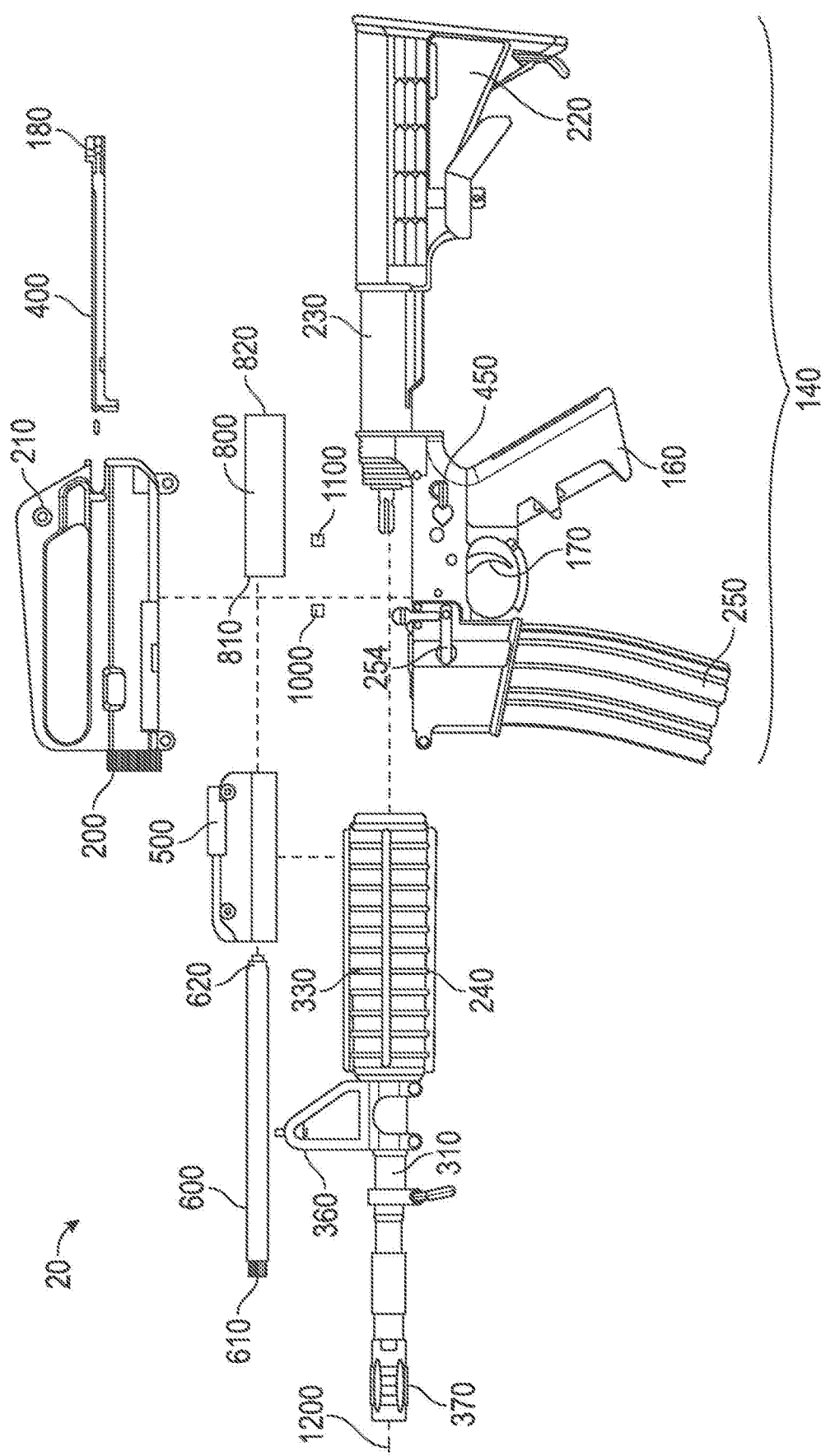
FIG. 4 is an exploded view of the simulated firearm body shown in FIG. 2.

FIG. 1 is a side view of one embodiment of a firearm training system 10. FIG. 2 is a side view of simulated firearm body 20. FIG. 3 is a perspective view of upper assembly/receiver 120. FIG. 4 is an exploded view of simulated firearm body 20.

Firearm training system 10 may include a simulated firearm body 20 having a linear motor 500 operatively connected to a slider mass 600, and a controller 50 operatively connected to the linear motor 500 via connecting wire bus 54.

Simulated firearm body 20 may include upper assembly 120 and lower assembly 140. Upper assembly 120 may include barrel assembly 300, barrel 310, along with upper 330 and lower 340 hand guards.

Lower assembly 140 may include stock shoulder stock 220, buffer tube 230, and pistol grip 160. Pistol grip 160 may include trigger 170. Cartridge 250 may be detachably connectable to lower assembly 140.

Linear motor 500 may be attached to upper assembly 120 via connector assembly 700. Connector assembly 700 may include first end 710, second end 720, connector plates 721 and 722, connector tube 740 having bore 750. Connector plate 721 may include fastener openings 730, and connector plate 722 includes fastener openings 732.

Figure 5:
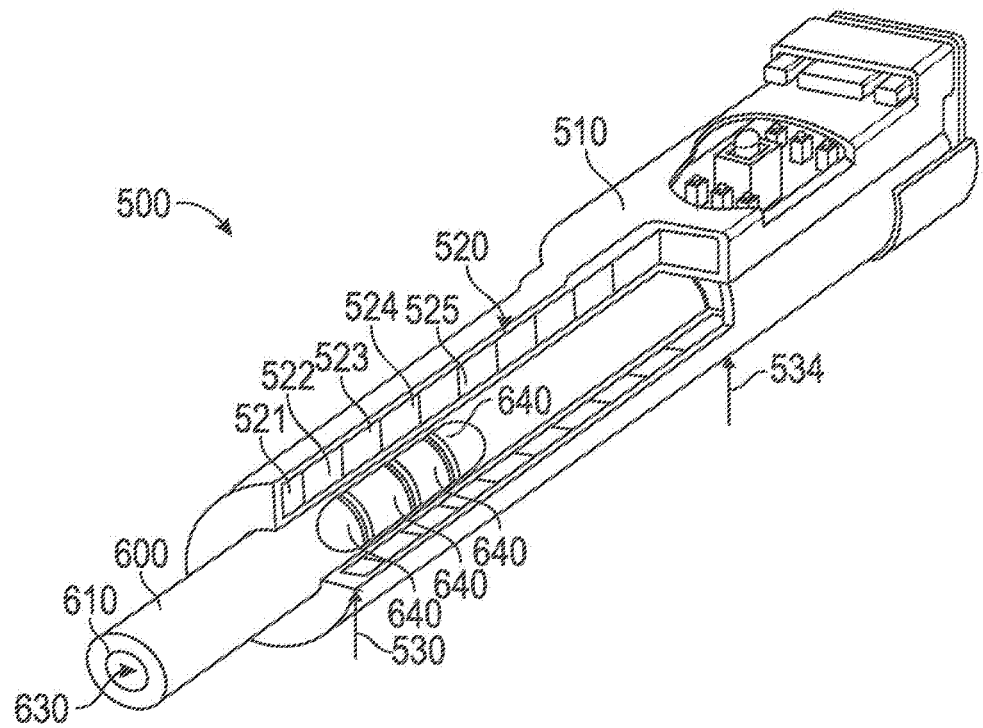
FIG. 5 is a perspective view of a linear motor and sliding mass, according to an exemplary embodiment of the present disclosure.
Figure 6:
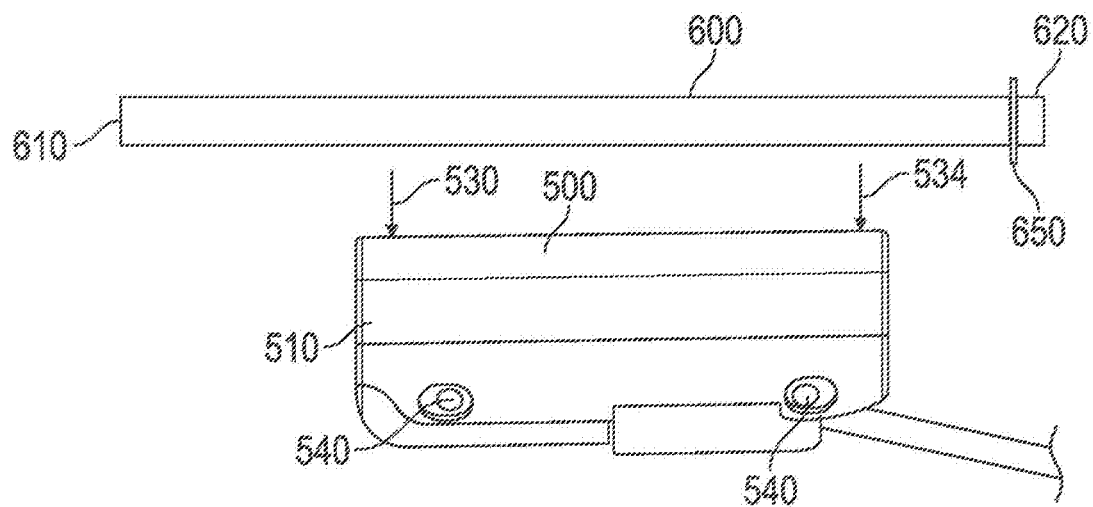
FIG. 6 is an exploded side view of the linear motor and sliding mass shown in FIG. 5.
Figure 7:
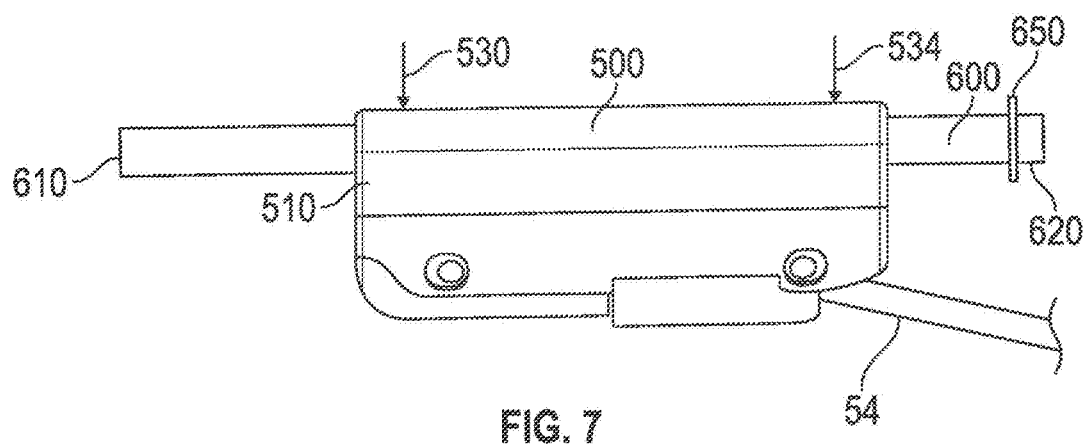
FIG. 7 is an assembled side view of the linear motor and sliding mass shown in FIG. 6.

FIG. 5 is a perspective view of a linear motor 500 and sliding mass 600. FIG. 6 is an exploded side view of linear motor 500 and sliding mass 600. FIG. 7 is an assembled view of the linear motor 500 and sliding mass 600.

Linear motor 500 may include a plurality 520 of separately controllable energized coils 521, 522, 523, 524, 525, 526, 527, 528, 529, 530, etc. which may electromagnetically interact with the plurality of magnets 640 in mass 600. By controlling the timing, direction of current, and power of magnetic attraction of particular magnetic coils in plurality of separately controllable magnetic coils 520, movement, acceleration, velocity, and position of mass 600 may be controlled to obtain a desired momentum/impulse curve over time which approximates a particular impulse curve over time for a particular firearm being simulated. One method of control for power delivered to the linear motor that may be advantageous in the present disclosure is Pulse-Width Modulation or (PWM). PWM technique may be used to encode a message into a pulsing signal; it is a type of modulation. Although this modulation technique may be used to encode information for transmission, its main use is to allow the control of the power supplied to the linear motor. The average value of voltage (and current) fed to the load may be controlled by turning the switch between supply and load on and off at a fast rate. The longer the switch is on compared to the off periods, the higher the total power supplied to the load. The PWM switching frequency is much higher than what would affect the load (the device that uses the power), which is to say that the resultant waveform perceived by the load must be as smooth as possible. Typically switching is done tens of kHz for a motor drive. For example, in one embodiment, PWM may be used to control the sliding mass in the range of 10 kHz to 30 kHz for recoil/shock production. This may be advantageous for keeping power consumption low and having repeatability in the movement on the linear motor. The duty cycle describes the proportion of 'on' time to the regular interval or 'period' of time; a low duty cycle corresponds to low power because the power is off for most of the time. Duty cycle may be expressed in percent, 100% being fully on. One of the main advantages of PWM use with the particular linear motor applications described herein is that power loss in the switching devices is very low. When a switch is off there is practically no current. When the switch is on and power is being transferred to the load, there is almost no voltage drop across the switch. Power loss, being the product of voltage and current, is thus in both cases close to zero. By adjusting the linear motor's duty cycle, when the switch is ON versus OFF, power saving may be achieved especially in cases of untethered use where battery/power sources are limited and at a premium. In one embodiment, the linear motor system may use a super-capacitor pack as the power source and the duty cycle/PWM may be chosen such that the power consumption is optimized based on the duty cycle for producing recoil, and the resolution of the linear motor (minimum repeatable linear movement) optimized based on the PWM needed to produce recoil/shock.

Linear motor 500 may include a mass 600 which is slidably connected to linear motor 500. Mass 600 may include first end 610, second end 620, and bore 630. Plurality of magnets 640 may be included inside of bore 630. Linear motors 500 have not been used in simulated firearms for controlling recoil force.

Figure 8:
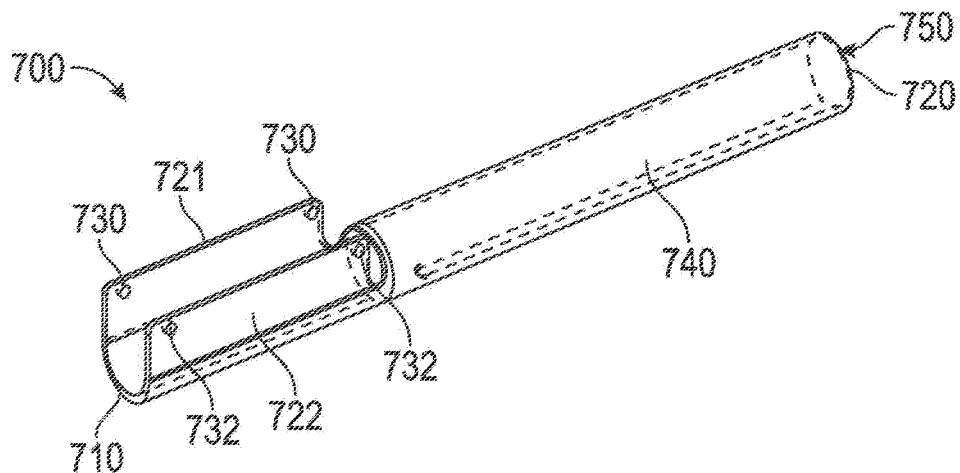
FIG. 8 is a perspective view of a support bracket for a linear motor and sliding mass, according to an exemplary embodiment of the present disclosure.

FIG. 8 is a perspective view of one embodiment of a support 700 for linear motor 500 and sliding mass 600. Support 700 may include first end 710 and second end 720. On first end may be first and second connector flanges 721, 722. First connector flange 721 may include a plurality of connector openings 730. Second connector flange 722 may include a plurality of connector openings 732. Coming from second end 720 may be tubular section 740 having a tubular bore 750. Linear motor 500 may be mounted to support 700 via plurality of openings 730 and 732 being connected to plurality of connector openings 540. After mounting to support 700, linear motor 500 may cause sliding mass 600 to controllably move (e.g., slide, accelerate, etc.) inside of and relative to bore 750.

In one embodiment, mechanical stop 800 may be employed to increase free recoil from sliding mass 600. Mechanical stop 800 may be employed inside the simulated firearm body 20 to "rigidly" (i.e., more quickly negatively accelerate to zero sliding mass 600 than linear motor 500 is capable of) at the end of allowed length of travel 660. Such quick stop may produce an enhanced recoil effect on user 5 by increasing the maximum generated recoil force on the user 5. Because linear motor 500 employs a magnetic sliding mass 600 with an electromagnetic stator, there is a coupling between the two and a corresponding maximum acceleration and deceleration that the device can achieve. To such limitation, mechanical stop 800 may be employed. Linear motor 500 normally brakes sliding mass 600 by reversing the driving magnetic field originally used to accelerate sliding mass 600 in the opposite direction for stopping at the end of the length of travel 660. Instead of this method, braking is left up to contact between sliding mass second end 620 and mechanical stop first end 810 inside lower assembly 140. This allows for much faster breaking times for sliding mass 600 than linear motor 500 could, with such faster braking or deceleration creating larger reactive forces from sliding mass 600 and thus a larger free recoil value produced by system 10 at this point in time and position for sliding mass 600.

In various embodiments, during an emulated firing cycle, linear motor 500 may control movement of sliding mass 600 causing sliding mass 600 to continue to acceleration until the last 1 percent of the entire stroke of sliding mass 600 as sliding mass 600 moves towards collision with mechanical stop 800. In embodiments, acceleration may be increased until the last 2, 3, 4, 5, 10, 15, 20, 25, 30, 35, and/or 40 percent of the entire stroke of sliding mass 600 as sliding mass 600 moves towards collision with mechanical stop 800. In some embodiments, the control of increased acceleration may be until the range of any two of the above referenced percentages percent of the entire stroke of sliding mass 600 as sliding mass 600 moves towards collision with mechanical stop 800.

During an emulated firing cycle, linear motor 500 may control movement of sliding mass 600 causing sliding mass 600 to continue acceleration until 1 millisecond before sliding mass 600 collides with mechanical stop 800. In embodiments, acceleration may be increased until 2, 3, 4, 5, 6, 7, 8, 9, 10, 12, 14, 15, 16, 18, and/or 20 milliseconds before sliding mass 600 collides with mechanical stop 800. In various embodiments, the control of increased acceleration may be until the range of any two of the above referenced time periods before sliding mass 600 collides with mechanical stop 800.

Simulated firearm body 20 may include a selector switch 450 operatively connected to controller 50 for controlling the type of operation firearm training system 10. For example, selector switch 450 may have a plurality of modes of simulation such as: (1) safety; (2) semi-automatic firing mode; (3) fully automatic firing mode; and (4) burst firing mode.

To use firearm training system 10, a user may select the position of selector switch 450, aim simulated firearm body 20 at a target, and pull trigger 170. When trigger 170 is pulled, controller 50 may cause linear motor 500 to kinematically control sliding mass 600 to create reactionary forces which may be transmitted to user holding simulated firearm body 20. The reactionary forces created by controlling sliding mass 600 may be controlled to be substantially similar in time and amount for particular ammunition being simulated as being fired from the firearm being simulated.

In an embodiment, a time versus force diagram of a particular round of ammunition being fired from a particular firearm to be simulated may be identified, and controller 50 may be programmed to control linear motor 500 to control movement of sliding mass 600 to create substantially the same forces over time by controlling the acceleration versus time of sliding mass. Because force is equal to the product of acceleration multiplied by mass, controlling acceleration versus time also controls force versus time.

In some embodiments, a plurality of simulation data point sets (such as force versus time values) may be generated. In one embodiment, a particular type of ammunition may be tested in a firearm to be simulated and a data set of apparent recoil force versus time may be generated. A plurality of measurements may be taken over a plurality of times. In an embodiment, a program for linear motor may be created to cause reaction forces of sliding mass 600 to substantially match in both time and amplitude such emulated force diagram for a plurality of points. In embodiments, at least 3 points may be matched.

In various embodiments, at least 3, 4, 5, 6, 7, 8, 9, 10, 11, 12, 14, 15, 16, 17, 18, 19, 20, 25, 30, 35, 40, 45, 50, 60, 70, 80, 90, and/or 100 simulation point data sets may be substantially matched. In embodiments, a range of between any two of the above specified number of simulation point data sets may be substantially matched.

In one embodiment, system 10 may be used to emulate a force versus time curve that is estimated to occur with a particular firearm firing a particular size and type of ammunition being simulated.

Recoil may be thought of as the forces that a firearm places on the user firing the firearm. Such recoil forces may be dependent upon the size and construction of the firearm, along with the characteristics of the bullet being fired from the firearm. The recoil imposed on a user of the same firearm may be different when the firearm fires a first type of ammunition compared to a second type of ammunition.

In embodiments, linear motor 500 and sliding mass 600 combined may have a total mass which approximates the mass of the particular firearm being simulated. In one embodiment, simulated firearm body 20, which includes linear motor 500 and sliding mass 600 combined, have a total mass which approximates the mass of the particular firearm being simulated. In various embodiments, either the linear motor 500 and/or sliding mass 600 combined may have a total mass (and/or the simulated firearm body 20 which includes linear motor 500 and sliding mass 600 combined) have a total mass which is about 65, 70, 75, 80, 85, 90, 95, and/or 100 percent of the mass of the particular firearm being simulated. In embodiments, a range between any two of the above referenced percentages may be used.

In embodiments, a substantially balanced simulated firearm body 20 may be provided. By locating linear motor 500 in the front portion of simulated firearm body 20, better weight balance as well as a more realistic starting position for the simulated reactive force vector may be achieved. By positioning sliding mass 600 movement in this way, barrel 300 weight and center of gravity of simulated firearm body 20 may be more realistic to user 5 when system 10 is idle and trigger 170 is not being pulled. This is due to the starting position of sliding mass 600. In one embodiment, barrel 310 material being used in upper assembly 120 may not be steel, and upper assembly 120 may feel unrealistic to user 5 due to a change in weight distribution compared to an upper assembly for an actual firearm being simulated. To solve this problem, during the initial stage of a recoil simulation cycle, a portion of sliding mass 600 may rest inside barrel 310. Such portion of sliding mass may simulate this extra "missing" weight in barrel 310 with the extra weight from the stator of linear motor 500 assisting as well. When user fires system 10, sliding mass 600 moves from barrel 310 towards the rear of simulated firearm body 20 and is stopped by stop 800 that is even with the beginning of the stock. Sliding mass 600 may then return to its initial position and create a seamless effect for user 5 that the weight distribution of the gun "feels" correct when the gun is not being fired. Furthermore, since the weight distribution of simulated firearm body 20 changes during the course of the recoil/shock effect, additional backward load may be perceived by user 5 enhancing the perceived recoil/shock effect of the linear motor. This is due to the linear motor slider moving towards the mechanical stop with high acceleration, unbalancing the firearm toward the back end of the simulator, and then striking the mechanical stop causing the front of the simulated firearm to rise as shown in FIGS. 18 to 21. When the simulated firearm rises, additional static load toward the ground may be placed on the shoulder of user 5 by the change in the center of gravity, giving user 5 the perception of an increased recoil effect from the linear motor striking the mechanical stop and the new angular distribution of weight. Moreover, the slider may return to its original position to complete the recoil cycle and this also applies additional force onto user 5. While the figures discussed above show a rifle, the same principles may be applied to the various different firearms and devices discussed herein, mainly positioning the linear motor in a device, controlling the position of the sliding mass and/or positioning the mechanical stops to optimize a particular haptic effect for a particular device and user.

In different embodiments, the location of linear motor 500 may be moved from the hand grip position, such as in stock 220, or farther up into the receiver if necessary.

Figure 9:
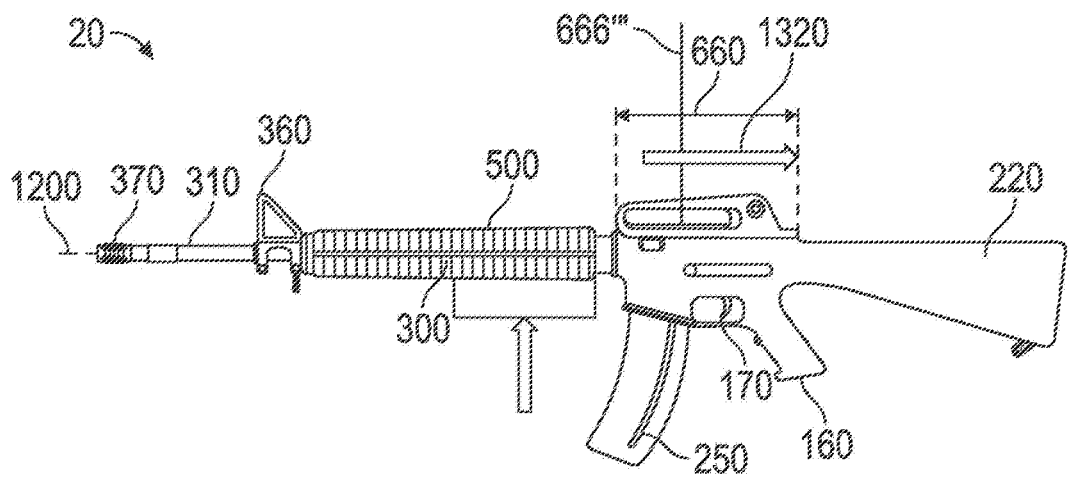
FIG. 9 is a side view of a simulated firearm body, according to an exemplary embodiment of the present disclosure.

FIG. 9 is a side view of one embodiment of a simulated firearm body 20. The amount of linear travel of sliding mass 600 may be schematically indicated by arrows 660. In this view, the actual position 666 of second end 620 of sliding mass 600 is schematically shown by "time dependent" vertical line 666''' indicating the transient position of second end 620 of sliding mass 600 in length of travel 660. Arrow 1320 schematically represents a time dependent recoil force which may be created by time dependent acceleration of sliding mass 600 by linear motor 500. Clip 650 may be removed from sliding mass 600 before or after installation of linear motor 500 to allow, if desired, during control of sliding mass 600, first and second ends 610, 620 of sliding mass 600 to enter plurality of coils 520 of linear motor 500 between first and second ends 530, 534 of plurality of coils 520.

Figure 10:
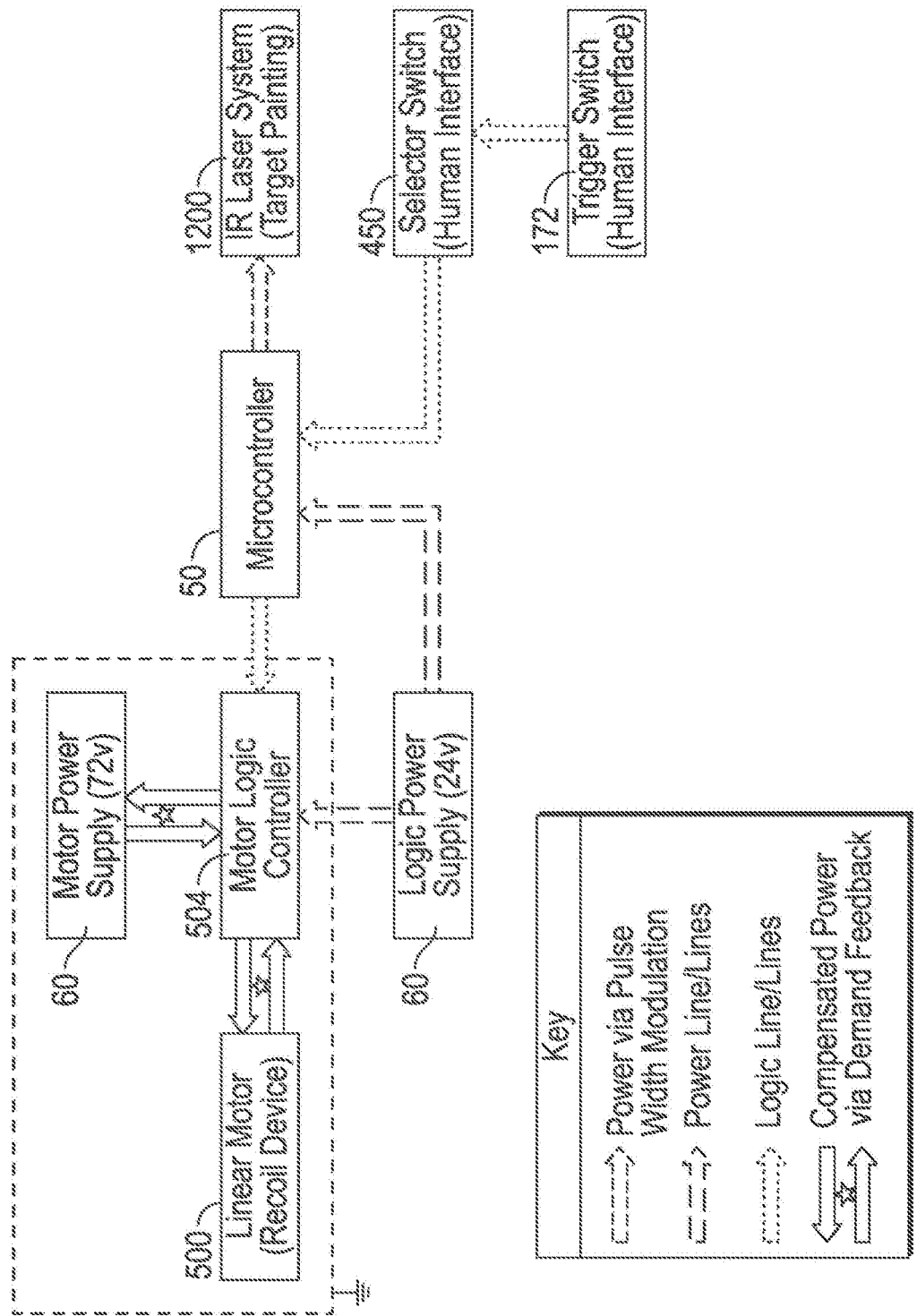
FIG. 10 is a schematic flow diagram of the simulated firearm system shown in FIG. 1.

FIG. 10 is a schematic flow diagram of various operation of the simulated firearm system shown in FIG. 1. In one embodiment, controller 50 may be programmed to control linear motor 500 to control kinematic movement of sliding mass 600 within length of free travel 660 of sliding mass 600 to cause sliding mass to create a desired reactionary force versus time curve, where such force versus time curve may simulate a force versus time curve of a particular bullet fired in a particular firearm being simulated. Linear motor 500 may include controlled sliding mass 600 along with motor logic controller 504. Motor logic controller 504 may be operatively connected to controller 50. Power supply 60 (e.g., 24 volts) may be connected to both linear motor's logic controller 504 and controller 50. Because of the larger current demand of the linear motor 500 stator, a separate power supply 60 (e.g., 72 volts) may be connected to linear motor 500.

Sequencing

FIGS. 11 to 15 are sequencing side views showing the sliding mass 600 of the linear motor 500 at four different positions relative to simulated firearm body 20. In one embodiment, system 10 may be programmed to simulate recoil for different ammunition types that a user 5 may use in a particular rifle. Programming of system 10 may be accomplished by measuring the force vs. time of an actual round in a particular weapons system to be simulated by system 10 and by using the "free recoil" formula to determine the energy produced by the actual firearm system to be simulated. Once the force vs. time of the actual firearm system to be simulated is known and the free recoil of the actual system is known, then system 10 may be programmed to cause sliding mass 600 to create reactionary forces that substantially match the same or similar force vs. time and free recoil energy that should be delivered to user 5. This method may give the same perceived recoil as the live ammunition fired from the actual firearm being simulated for user 5.

Accordingly, by changing the stroke distance, velocity, acceleration, and/or deceleration at preselected time intervals or points of sliding mass 600, the reactive recoil force imparted to user 5 from simulated firearm body 20 may be controlled. This reactive recoil force may be controlled to mimic or simulate:
 (1) the recoil force generated by a particular type of ammunition round in the particular firearm being simulated;
 (2) the recoil force generated by different types of ammunition rounds in the particular firearm being simulated; which different types of ammunition rounds may use more gun powder/less gun powder or use a higher weight bullet/lower weight bullet or some combination of both.

The different types of recoil forces may be simulated by merely having linear motor 500 change the dynamic movements of sliding mass 600 over time. For example, if a larger force is desired at a particular point in time during the recoil time period at such particular point in time linear motor merely increases the instantaneous acceleration of sliding mass 600 to cause such reactionary force.

Figure 11:
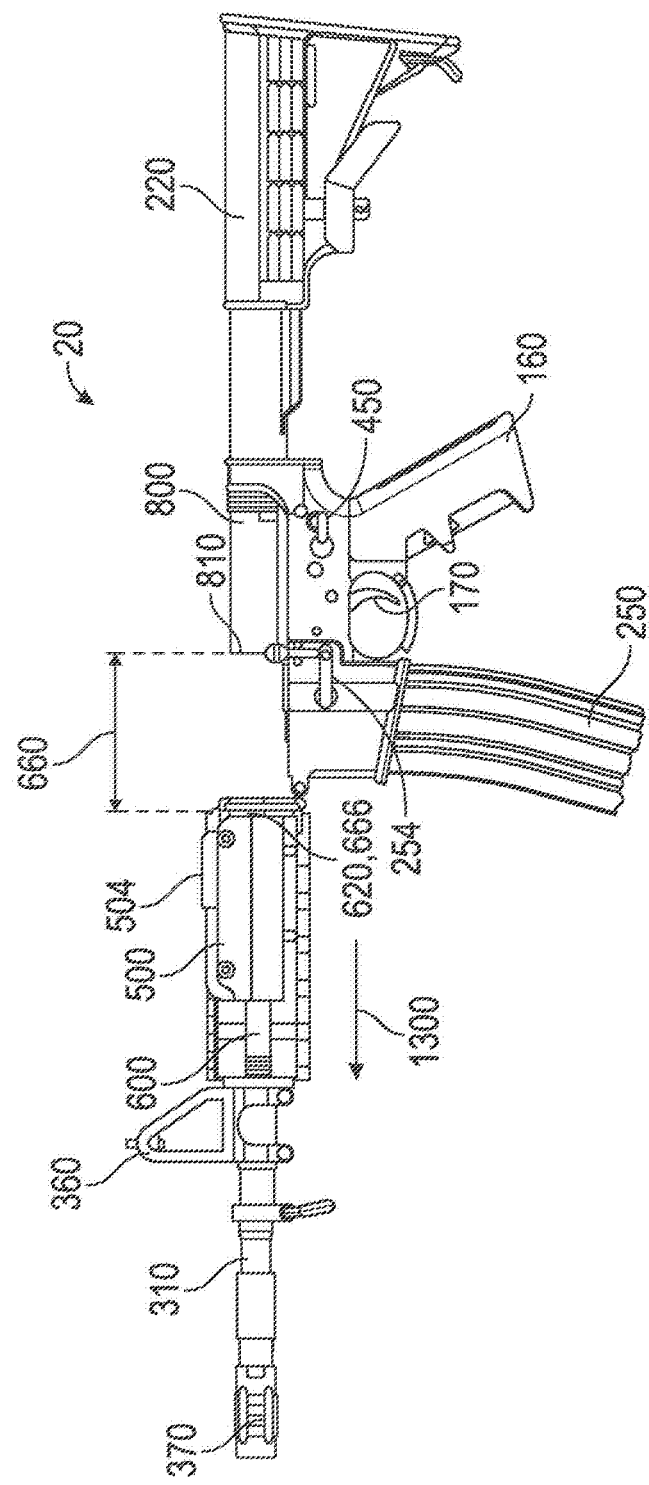
FIG. 11 is a sequencing side view showing a sliding mass of a linear motor at an initial position relative to a simulated firearm body in a simulation recoil cycle, according to an exemplary embodiment of the present disclosure.
Figure 12:
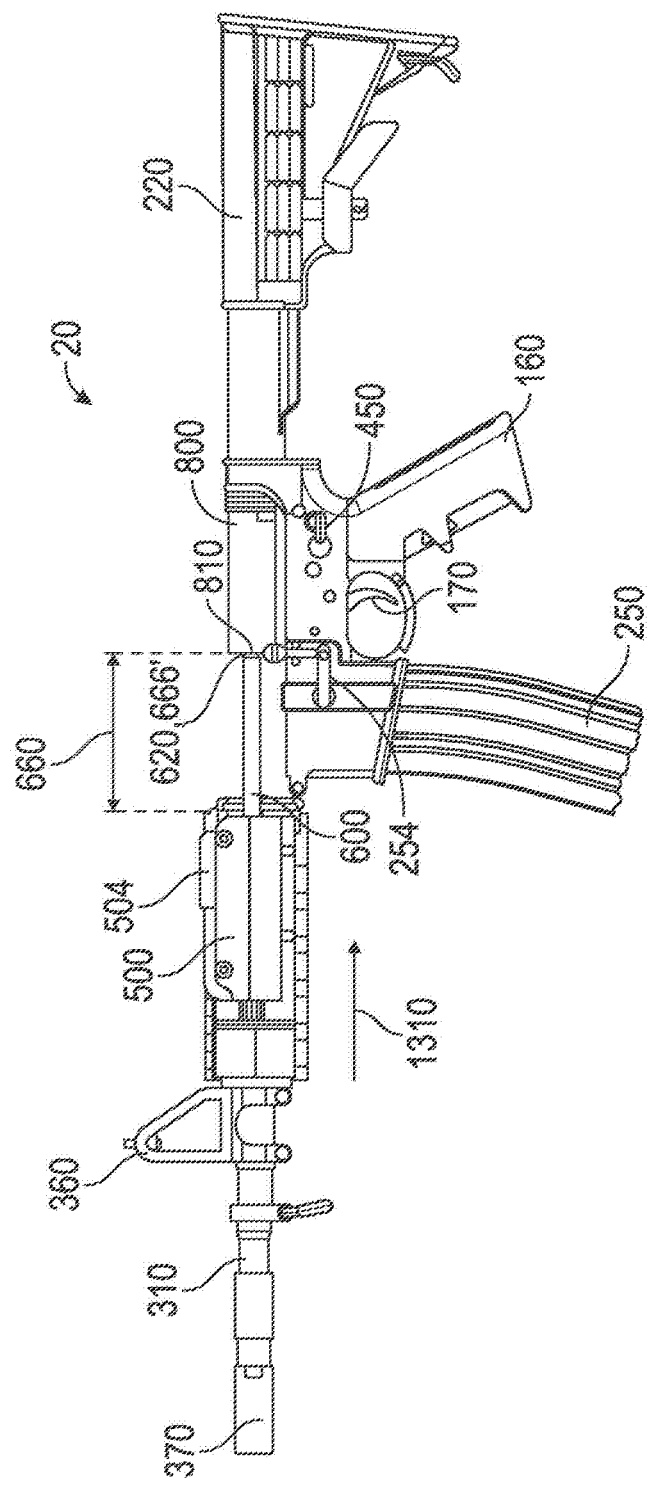
FIG. 12 is a sequencing side view showing the sliding mass of the linear motor shown in FIG. 11 extending a sliding shaft to the end of its rightmost movement relative to the simulated firearm body in the simulation recoil cycle.
Figure 15:
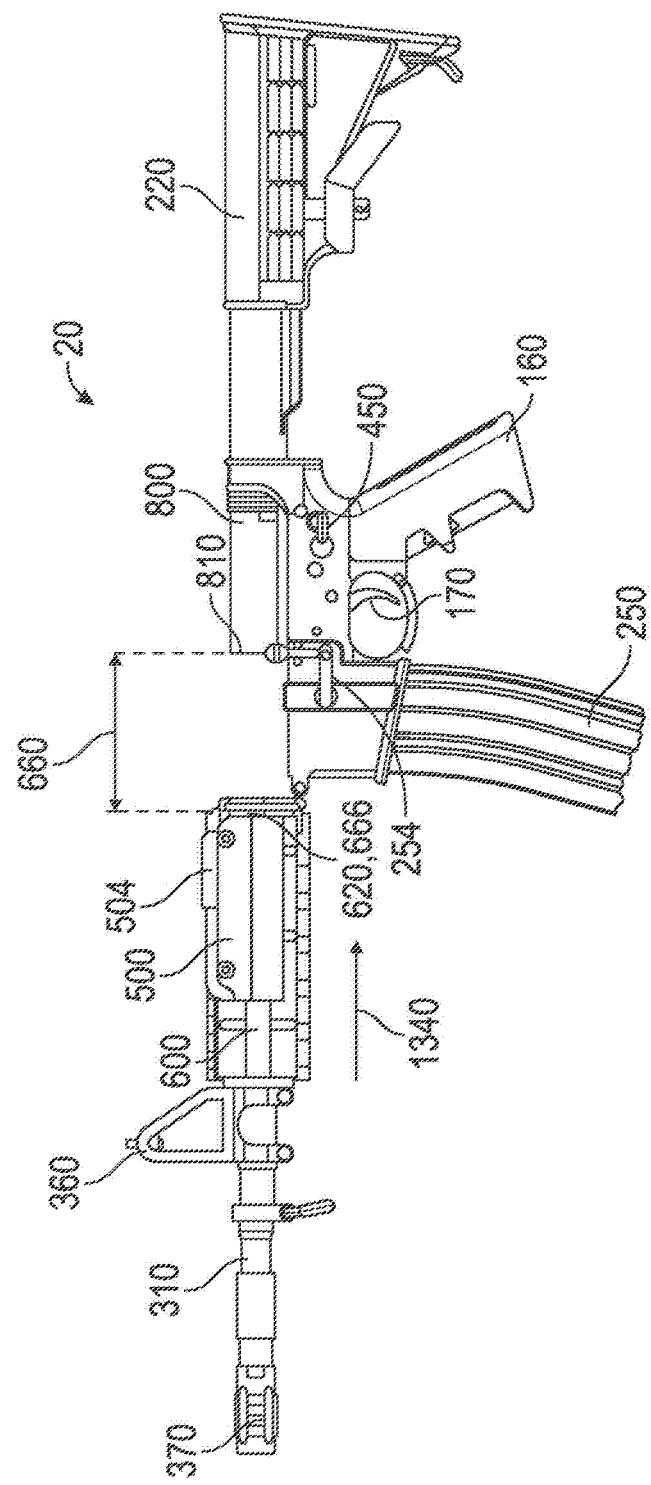
FIG. 15 is a sequencing side view showing the linear motor of FIG. 14 after finishing retraction of the sliding mass relative to the simulated firearm body in the simulation recoil cycle so that the linear motor is ready for a next simulation recoil cycle.
Figure 16:
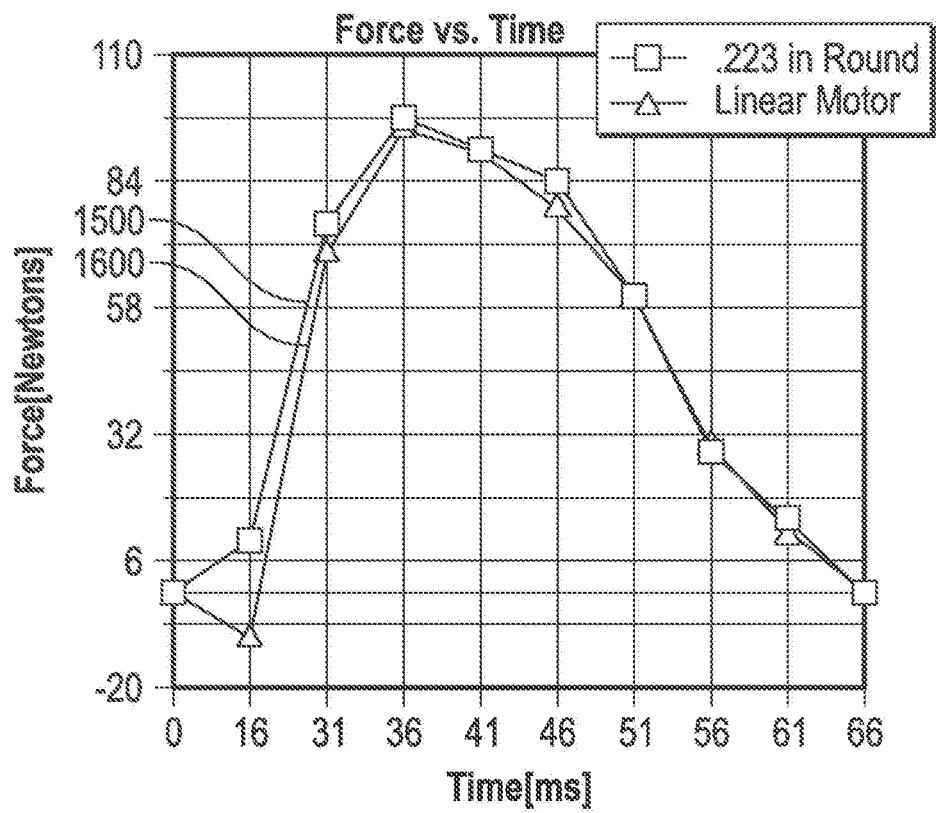
FIG. 16 is a prophetic graph plotting recoil force versus time of a first round of ammunition along with force versus time caused by a linear motor kinematically controlling dynamics of a sliding mass, according to an exemplary embodiment of the present disclosure.

FIG. 16 is a graph plotting hypothetical recoil force versus time (shown via the square tick marks) of a first round of ammunition along with force versus time caused by the linear motor kinematically controlling dynamics of the sliding mass (shown via the triangular tick marks). FIG. 16 may be compared to sequencing FIGS. 11 to 15. At time zero, second end 620 of sliding mass 600 is as shown in FIG. 11 at position 666, and has just started to accelerate in the opposite direction of arrow 1300 (causing a reactive force in the direction of arrow 1300 to be imposed on simulated firearm body 20 and user holding body 20). Linear motor 500 causes second end 620 of sliding mass 600 to accelerate and move in the opposite direction of arrow 1300 until second end 620 reaches position 666' (shown in FIG. 12) having contact with first end 810 of stop 800. Immediately before reaching 666', acceleration of sliding mass 600 causes a reactive force in the direction of arrow 1300 (shown at time 16 milliseconds in FIG. 16 and in a negative reactive force). However, immediately after impact between second end 620 and first end 810, such collision/contact causes an acceleration of sliding mass 600 in the opposite direction of arrow 1310 creating a reactive force in the direction 1310 (shown between times 16 and 36 milliseconds in FIG. 16 and being a positive reactive force). During this same time period of contact/collision between second end 620 and first end 810, linear motor 500 may independently accelerate sliding mass in the opposite direction of arrow 1310 (adding to the reactive force 1310 shown in FIG. 12 by force vectors). From times 36 to 66 milliseconds on the graph shown in FIG. 16, controller 50 may be programmed to cause linear motor 500 to control acceleration of sliding mass 500 to create the desired simulated recoil reactive forces.

Figure 13:
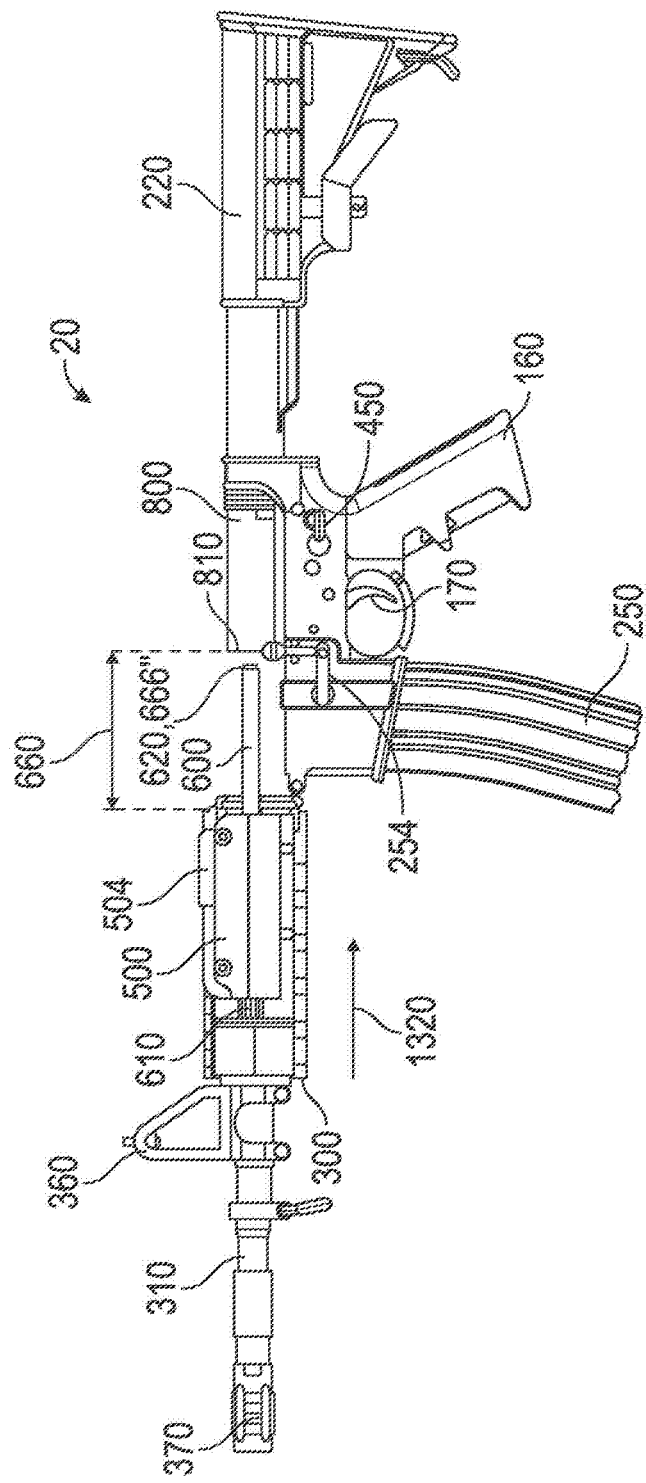
FIG. 13 is a sequencing side view showing the linear motor of FIG. 12 retracting the sliding mass relative to the simulated firearm body in the simulation recoil cycle.
Figure 14:
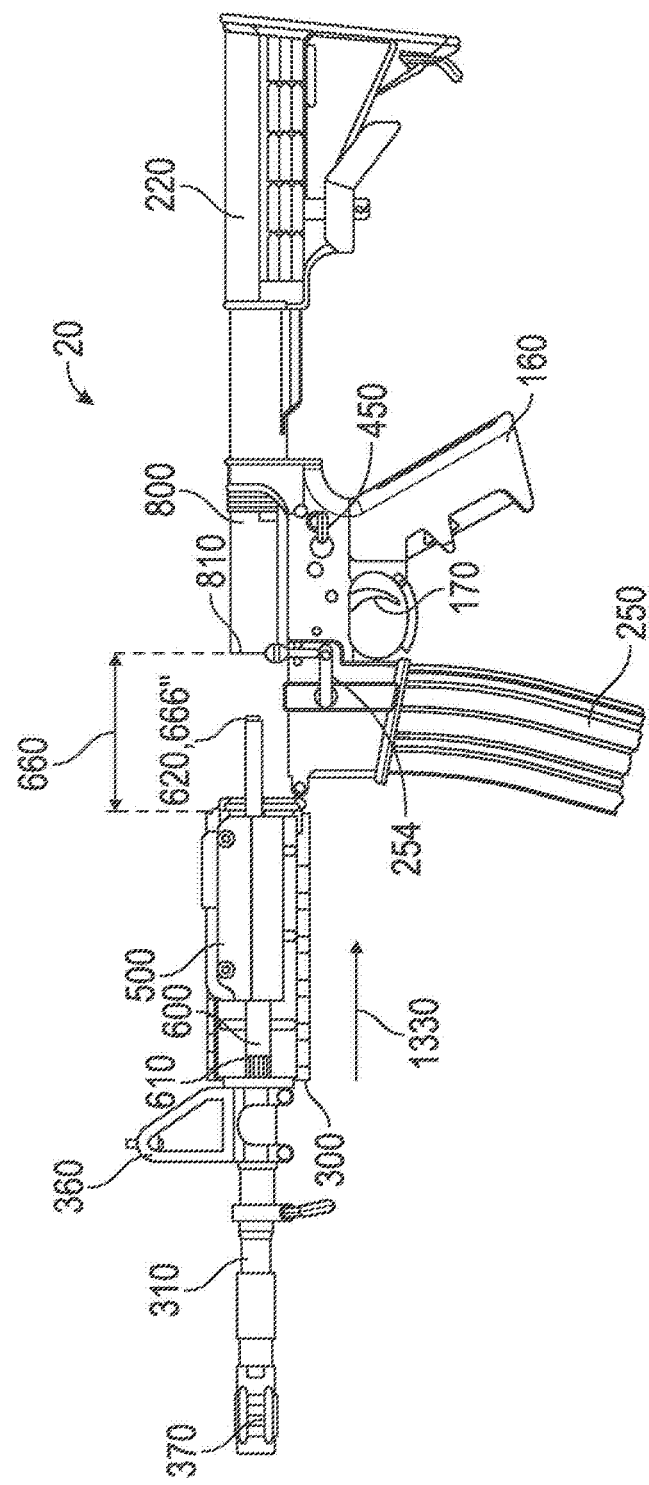
FIG. 14 is a sequencing side view showing the linear motor of FIG. 13 continuing to retract the sliding mass relative to the simulated firearm body in the simulation recoil cycle.

FIG. 13 shows second end 620 at position 666''' where linear motor may cause sliding mass 600 to accelerate to create a reactive force shown at 41 milliseconds in FIG. 16. FIG. 14 shows second end 620 at position 666''' where linear motor may cause sliding mass 600 to accelerate to create a reactive force shown at 56 milliseconds in FIG. 16. FIG. 15 shows second end 620 at starting position 666 for the next recoil cycle. Now between possible 666''' shown in FIG. 14 to position 666 shown in FIG. 15, linear motor 500 may have to accelerate sliding mass in the direction of arrow 1330 (to eventually slow and then stop sliding mass 600 at position 666 to be ready for the next recoil cycle). However, such slowing acceleration may be controlled to a minimum to minimize the amount of negative reactive force imposed on simulated firearm body 20 and user 5. Such negative reactive force is not shown in FIG. 16 and may be relatively small. In such manner, the amplitudes and timing of such amplitudes of recoil forces experienced by a user firing a particular type of bullet in a particular firearm may be simulated by programmed kinematics of sliding mass 600 being controlled by linear motor 500.

Figure 17:
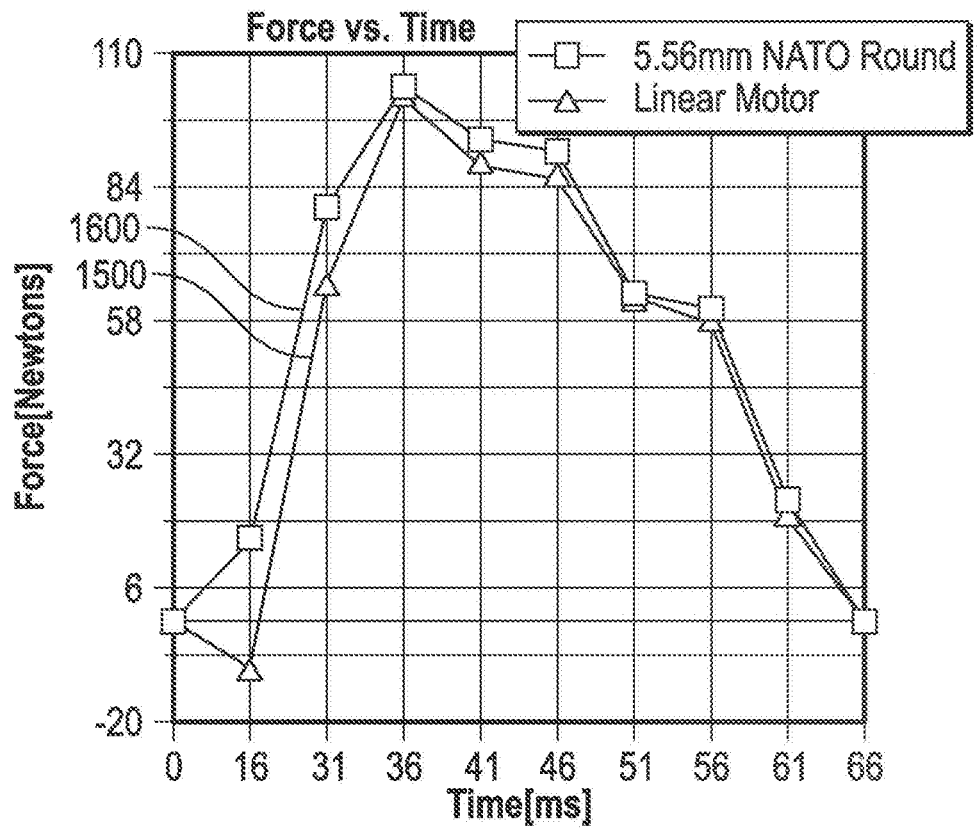
FIG. 17 is a prophetic graph plotting recoil force versus time of a second round of ammunition along with force versus time caused by a linear motor kinematically controlling dynamics of a sliding mass, according to an exemplary embodiment of the present disclosure.

To simulate multiple firing cycles, the linear motor 500 may control dynamic movement of sliding mass 600 to create repeated force versus time patterns/diagrams of kinematic movement of sliding mass 600 for the desired number of times or cycles. FIG. 17 is a graph plotting hypothetical recoil force versus time (shown via the square tick marks) of a first round of ammunition along with force versus time caused by the linear motor kinematically controlling dynamics of the sliding mass (shown via the triangular tick marks). FIG. 17 shows a different bullet with different force versus time curve to be simulated by programmed linear motor 500 controlling kinematic movement of sliding mass 600. Additionally, the overall period of the curve may be different from 66 milliseconds and may change depending of the recoil characteristics of the firearm being simulated firing a particular bullet.

The ability of linear motor 500 to create reactive forces with sliding mass 600 may be further enhanced by the alternating of the mass of sliding mass 600. In one embodiment, the different overall lengths for sliding mass 600 may be used (with the longer length option having a greater mass). With a greater mass for a given acceleration of such mass the reactive force created is found by the formula force equals mass times acceleration. In various embodiments, sliding mass 600 may be 270 mm in length slider, or may be 350 mm in length, and such optional sliding masses 600, 600' may be interchanged with linear motor 500 to modify the mass of the sliding mass 600. The 270 mm sliding mass 600 has a mass of 215 grams and the 350 mm sliding mass 600' has a mass of 280 grams. The change in mass gives rise to different reactive forces caused by acceleration, and different free recoil energies, which may be used to better approximate the force vs. time curve produced by certain rounds of ammunition.

Additionally, the length of sliding mass 600 changes the overall acceleration and length of travel 660 linear motor 500 has to approximate the force vs. time curve produced by particular rounds of ammunition.

With a shorter sliding mass 600, linear motor 500 may achieve higher velocities due to the longer acceleration time and thus give larger values of free recoil energy to the user.

The maximum reactive forces for different sliding masses 600, 600' may be computed as follows:

$$E_{tgu}=0.5 * m_{gu} * v_{gu}^2$$

Since there will be no powder or velocity of the powder charge, these corresponding values ($v_c$ & $m_{gu}$) go to zero, resulting in the standard kinetic energy formula $K=(0.5*m*v^2)$. The maximum values achieved for $E_{tgu}$ are as follows for both sliders:

| Sliding Mass Length | Sliding Mass Mass | Sliding Mass Acceleration | Overall Mass of Firearm | Free Recoil |
| --- | --- | --- | --- | --- |
| 270 mm | 215 grams | 7.35 m/s² | 1.5 kg | 2.539 J |
| 350 mm | 280 grams | 7.4 m/s² | 1.5 kg | 4.071 J |

FIGS. 18 to 21 are schematic sequencing diagrams illustrating an individual 5 repetitively firing of a firearm simulating body 20 with recoil causing increasing loss of accuracy with repetitive shots. These figures schematically show a simulating training exercise via semi-auto-burst fire modes with electronic recoil to train an individual 5 for accuracy.

One embodiment uses firearm simulating body 20 with linear motor 500 simulating an M4A1 rifle firing a particular type of bullet (although other types of firearms and bullets are envisioned in different embodiments). In one embodiment, selector switch 450 may have three modes of operation (1) semiautomatic, (2) burst, and (3) fully automatic. Schematically shown in FIGS. 18 to 21 is a user fire after selecting burst mode. In burst mode (2), a series of three simulated bullet firings may be performed by system 10.

Figure 18:
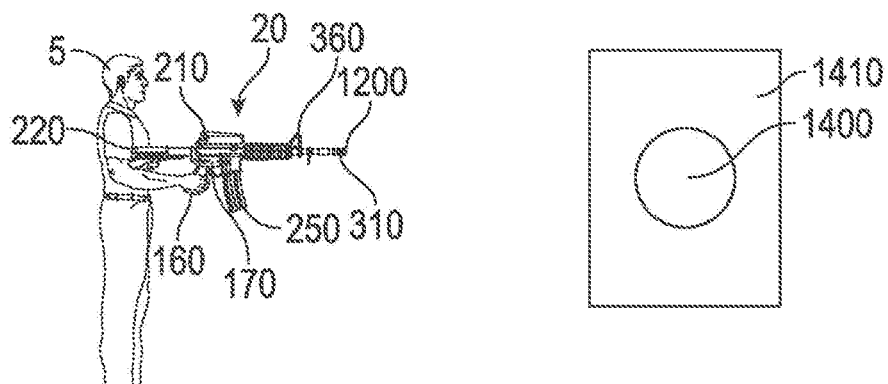
FIGS. 18 to 21 are schematic sequencing diagrams illustrating an individual repetitively firing a firearm with recoil causing increasing loss of accuracy with repetitive shots, according to an exemplary embodiment of the present disclosure.

User 5 selects which type of simulation for this particular firearm is desired by using selector switch 450. As schematically shown in FIG. 18, user 5 may aim simulated firearm body 20 at target area 1400. User 5 may then pull on trigger 170 which is connected to trigger switch 172, sending a signal to controller 50. Controller 50 may control linear motor 500 which in turn may control sliding mass 600. Controller 50 may also control laser emitter 1200. Aiming may be translated to system via laser emitter, magnetic tracking, optical tracking, 3D laser tracking, etc.

Many types of tracking systems may be used/incorporated into the present disclosure. For example, positioning systems may be used that incorporate positioning technology to determine the position and orientation of an object or person in a room, building or in the world. Time of flight systems determine the distance by measuring the time of propagation of pulsed signals between a transmitter and receiver. When distances of at least three locations are known, a fourth position may be determined using trilateration. In other embodiments, optical trackers, such as laser ranging trackers, may also be used. However, these systems often suffer from line of sight problems and their performance may be adversely affected by ambient light and infrared radiation. On the other hand, they do not suffer from distortion effects in the presence of metals and may have high update rates because of the speed of light. In other embodiments, ultrasonic trackers may also be used. However, these systems have a more limited range because of the loss of energy with the distance traveled. They may also be sensitive to ultrasonic ambient noise and have a low update rate. But the main advantage is that they do not need line of sight. Systems using radio waves such as the Global navigation satellite system do not suffer because of ambient light, but still need line of sight. In other embodiments, a spatial scan system may also be used. These systems may typically use (optical) beacons and sensors. Two categories may be distinguished: (1) inside out systems where the beacon is placed at a fixed position in the environment and the sensor is on the object and (2) outside in systems where the beacons are on the target and the sensors are at a fixed position in the environment. By aiming the sensor at the beacon, the angle between them may be measured. With triangulation, the position of the object may be determined. In other embodiments, inertial sensing systems may also be used and one of their advantages is that they do not require an external reference. Instead, these systems measure rotation with a gyroscope or position with an accelerometer with respect to a known starting position and orientation. Because these systems measure relative positions instead of absolute positions, they may suffer from accumulated errors and are therefore subject to drift. A periodic re-calibration of the system may provide more accuracy. In other embodiments, mechanical linkage systems may also be used. These systems may use mechanical linkages between the reference and the target. Two types of linkages may typically be used. One is an assembly of mechanical parts that may each rotate, providing the user with multiple rotation capabilities. The orientation of the linkages may be computed from the various linkage angles measured with incremental encoders or potentiometers. Other types of mechanical linkages may be wires that are rolled in coils. A spring system may ensure that the wires are tensed in order to measure the distance accurately. The degrees of freedom sensed by mechanical linkage trackers are dependent upon the constitution of the tracker's mechanical structure. While six degrees of freedom are most often provided, typically only a limited range of motions is possible because of the kinematics of the joints and the length of each link. Also, the weight and the deformation of the structure may increase with the distance of the target from the reference and impose a limit on the working volume.

In other embodiments, phase difference systems may be used. These systems measure the shift in phase of an incoming signal from an emitter on a moving target compared to the phase of an incoming signal from a reference emitter. With this the relative motion of the emitter with respect to the receiver may be calculated. Like inertial sensing systems, phase-difference systems may suffer from accumulated errors and are therefore subject to drift, but because the phase may be measured continuously they are able to generate high data rates. In yet other embodiments, direct field sensing systems may also be used. These systems use a known field to derive orientation or position: a simple compass uses the Earth's magnetic field to know its orientation in two directions. An inclinometer may use the Earth's gravitational field to determine its orientation in the remaining third direction. The field used for positioning does not need to originate from nature, however. A system of three electromagnets placed perpendicular to each other may define a spatial reference. On the receiver, three sensors measure the components of the field's flux received as a consequence of magnetic coupling. Based on these measures, the system may determine the position and orientation of the receiver with respect to the emitters' reference. Because each system described herein has its pros and cons, most systems may use more than one technology. A system based on relative position changes like the inertial system may need periodic calibration against a system with absolute position measurement.

Systems combining two or more technologies are called hybrid positioning systems and may be used with the various embodiments of the present disclosure described herein. In one embodiment, magnetic tracking may be used with firearm peripheral body 20 and substantially track its motion profile. In embodiments, optical tracking of peripheral body 20 may be accomplished by placing optical markers on body 20 in key points that may not be obstructed by user 5 and may allow pre-programmed cameras (optical trackers) to successfully track the orientation of body 20 for gaming and simulations training. In an embodiment, direct field sensing may be used to track body 20 through a gyroscopic sensor—or other inertial sensor—placed on body 20 to gauge the change in angular orientation and by magnetic tracking placed on body 20. Both sensors add to the achievable resolution for tracking body 20. In one embodiment, direct field sensing (magnetic & inertial tracking) may be used together with optical tracking to track firearm peripheral body 20 for enhanced resolution of position of body 20 in 3D space by using the optical tracking to calibrate the direct field sensing trackers with an absolute positioning reference and thereby avoiding drift. In exemplary embodiments, body 20 may be any type of simulated body providing haptic effects according to the present disclosure, including gaming devices/peripherals or firearms.

Controller 50 may control linear motor 500 causing sliding mass 600 to traverse pre-programmed kinematic movements creating reactionary forces in accordance with a predefined reactionary force versus time in an effort to simulate the recoil forces that an individual would experience actually simulating the particular bullet for the particular gun. Controller 50 may also be connected to an infrared laser system 1200 which may be in phase with user 5 pulling trigger 170. Laser 1200 may simulate on the target screen (area 1400 or 1410) where a bullet would have traveled from simulated firearm body 20. If laser 1200 is replaced with optical or magnetic aiming (tracking/positioning), coordinates of the firearm peripheral's location in 3D space may be translated into game play simulations for accurate tracking of facade body 20. This may allow trigger 170 to be pulled by user 5 and an accurate calculation of bullet trajectory may be performed and inserted into the simulation for real-time tracking and game play.

Figure 19:
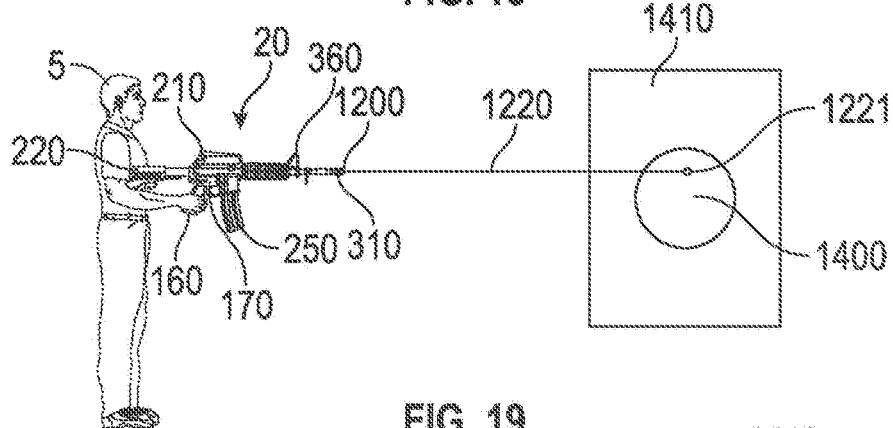
Figure 20:
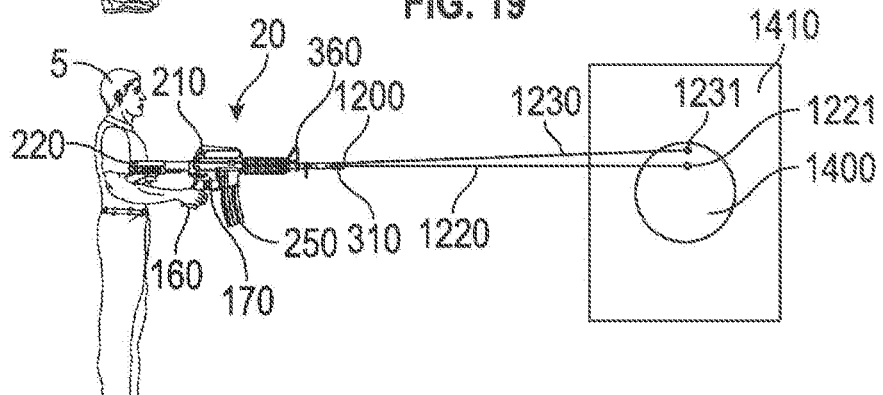
Figure 21:
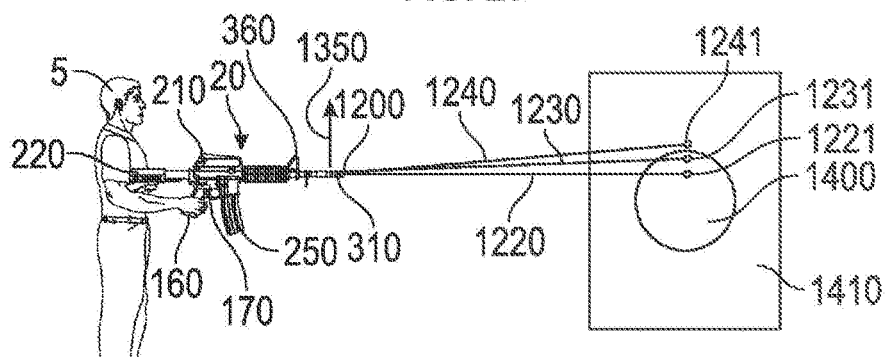

In FIG. 19, the first of the three simulated burst rounds, laser 1200 may shoot laser line 1220 and have a hit 1221 in target area 1400. In FIG. 20, the second of the three simulated burst rounds, laser 1200 may shoot laser line 1230 and have a hit 1231 in target area 1400 (but closer to non-target area 1410). In FIG. 21, the third of the three simulated burst rounds, laser 1200 may shoot laser line 1240 and have a hit 1241 in non-target area 1410. Arrow 1350 schematically represents the simulated recoil placed on body 20 causing aim of user 5 to degrade. With repeated use of system 10, user 5 may become accustomed to the simulated recoil and adjust his aim.

In an actual training exercise, the projection system may simulate "target space" and "non-target" space for user 5. If user 5 fires off of the screen 1400, this may count as "non-target" space 1410. These targets 1400 may be either moving or stationary and may vary greatly in size and shape. However, the projection system may count the total number of bullet strikes (e.g., 1221, 1231) in target space and non-target space and add them. This allows for the following formula to be used to determine accuracy for user 5:

$$\text{Accuracy} = [[\text{Total} - (\text{non-target space})]/\text{Total}] * 100\%$$

For example, if the user fired a total of 10 shots, corresponding to 4 shots in the target space 1400 and 6 shots in the non-target space 1410, the formula would read:

$$\text{Accuracy} = [[10 - 6]/10] * 100\%.$$

This simulation would give the user an accuracy of 40%. Since a real recoil effect may be produced and knock the user's sights off of the target space 1400 for which he is aiming, system 10 may help to train user 5 to become more accurate in firing actual firearm system without the need to fire live ammunition. In one embodiment, the projection system described herein may be made up of a computer system and a visual display system.

Located inside barrel 310 may be laser emitter 1200. Laser emitter 1200 assembly may include a circuit board, a battery box, a switch, and a laser emitter. Laser emitter 1200 may be preferably housed within barrel 310, and may be oriented to emit a laser beam substantially parallel to and coaxial with the longitudinal centerline of barrel 310.

Accordingly to exemplary embodiments of the present disclosure, using tracking systems, or combinations thereof as described herein, a user and/or apparatus may be tracked in real time for gaming and/or simulation purposes. For example, tracking of user locomotion that may be translated into the simulation may be achieved via controls on firearm peripheral body 20 through joysticks or through magnetic or optical tracking of body 20. User 5 may also be tracked directly by magnetic or optical tracking instead of indirectly by applying the tracking only to firearm body 20. Thus, by adding additional locomotion—other than 2D stationary aiming via laser 1200—a more immersive and comprehensive level of realism may be obtained in game play and training simulation. While firearm peripheral body 20 is discussed in the example above, other devices, including the gaming devices described herein, may be tracked.

Furthermore, virtual reality scenarios using head-mounted displays (HMDs) and projection based displays also called optical head-mounted displays (traditional screen displays/projection systems that have been miniaturized and affixed to the user's head) are increasingly becoming necessary for generating ever more accurate and successful simulation and game play environments. Such new display systems may include a head-mounted display (or helmet-mounted display, for example for aviation applications) that is a display device, worn on the head or as part of a helmet, which may have a small display optic in front of one (monocular HMD) or each eye (binocular HMD). An optical head-mounted display (OHMD) may also be used, which is a wearable display that has the capability of reflecting projected images as well as allowing the user to see through it. A typical HMD may have either one or two small displays with lenses and semitransparent mirrors embedded in a helmet, eyeglasses (also known as data glasses) or visor. The display units may be miniaturized and may include CRT, LCDs, Liquid crystal on silicon (LCos), or OLED. Some vendors may employ multiple micro-displays to increase total resolution and field of view. HMDs differ in whether they can display just a computer generated image (CGI), show live images from the real world or a combination of both. Most HMDs display only a computer-generated image, sometimes referred to as a virtual image. Some HMDs may allow a CGI to be superimposed on a real-world view. This may sometimes be referred to as augmented reality or mixed reality. Combining real-world view with CGI may be done by projecting the CGI through a partially reflective mirror and viewing the real world directly. This method is often called Optical See-Through. Combining real-world view with CGI may also be done electronically by accepting video from a camera and mixing it electronically with CGI. This method is often called Video See-Through.

An optical head-mounted display may use an optical mixer made of partly silvered mirrors. It has the capability of reflecting artificial images as well as letting real images to cross the lens and let the user look through it. Various techniques have existed for see-through HMD's. Most of these techniques may be summarized into two main families: "Curved Mirror" based and "Waveguide" based. The curved mirror technique has been used by Vuzix in their Star 1200 product and by Laster Technologies. Various waveguide techniques have existed for some time. These techniques include but are not limited to diffraction optics, holographic optics, polarized optics, and reflective optics.

Major HMD applications include military, governmental (fire, police, etc.) and civilian/commercial (medicine, video gaming, sports, etc.).

Ruggedized HMDs are increasingly being integrated into the cockpits of modern helicopters and fighter aircraft, and are usually fully integrated with the pilot's flying helmet and may include protective visors, night vision devices and displays of other 25 symbology.

Engineers and scientists use HMDs to provide stereoscopic views of CAD schematics. These systems may also be used in the maintenance of complex systems, as they can give a technician what is effectively "x-ray vision" by combining computer graphics such as system diagrams and imagery with the technician's natural vision. There are also applications in surgery, wherein a combination of radiographic data (CAT scans and MRI imaging) may be combined with the surgeon's natural view of the operation, and anesthesia, where the patient's vital signs may be within the anesthesiologist's field of view at all times. Research universities often use HMDs to conduct studies related to vision, balance, cognition and neuroscience.

Low cost HMD devices are available for use with 3D games and entertainment applications. One of the first commercially available HMDs was the Forte VFX-1 which was announced at Consumer Electronics Show (CES) in 1994. The VFX-1 had stereoscopic displays, 3-axis head-tracking, and stereo headphones. Another pioneer in this field was Sony Corporation, who released the Glasstron in 1997, which had as an optional accessory a positional sensor which permitted the user to view the surroundings, with the perspective moving as the head moved, providing a deep sense of immersion. One application of this technology was in the game Mech Warrior® 2, which permitted users of the Sony Glasstron or Virtual I/O Inc.'s iGlasses to adopt a new visual perspective from inside the cockpit of the craft, using their own eyes as visual and seeing the battlefield through their craft's own cockpit. Many brands of video glasses may now be connected to video and DSLR cameras, making them applicable as a new age monitor. As a result of the glasses ability to block out ambient light, filmmakers and photographers are able to see clearer presentations of their live images.

The Oculus Rift® is an upcoming virtual reality (VR) head-mounted display created by Palmer Luckey, and being developed by Oculus VR, Inc. for virtual reality simulations and video games. VR headsets are also planned for use with game consoles like the Xbox One® and the P54®.

A key application for HMDs is training and simulation, allowing for virtual placement of a trainee in a situation that may either be too expensive or too dangerous to replicate in real-life. Training with HMDs cover a wide range of applications, including but not limited to driving, welding and spray painting, flight and vehicle simulators, dismounted soldier training, and medical procedure training.

Embodiments of the present disclosure may be used with the foregoing systems. In an embodiment, a HMD may be used in a simulation system that incorporates a peripheral body 20, including a linear motor recoil/shock system, and allows user 5 to fire with 3D positional tracked body 20 at simulated targets inside a 3D virtual space while generating recoil to emulate gun fire. In one embodiment, a HMD may be used in a gaming system that incorporates a 3D positional tracked peripheral gaming body, including a linear motor recoil/shock system, and allows user 5 to interact with the virtual space by generating haptic output via linear motor 500 with interactions from the virtual space. In an embodiment, the virtual space may be controlled and generated by a computer system to send the visual information to the HMD or other visual system. In another embodiment, the virtual space may gain positioning data from the tracking methods described herein, and may send that positioning data to the computer which may then update the virtual space and may send that visual information of the virtual space to the HMD or other visual system. In another embodiment, the simulation system described herein may include a computer system. In another embodiment, the simulation system described herein may include a computer system running a virtual simulation, a visual display, a tracking system, a linear motor that includes a sliding mass, and a controller controlling the movement of the linear motor's sliding mass. In another embodiment, the gaming system described herein may be a computer system.

In exemplary embodiments, a typical cyclic rate for full automatic fire with a low cyclic rate is approximately 600 rounds per minute. A typical cyclic rate for full automatic fire at a high cyclic rate is approximately 900 rounds per minute, approximately simulating the cyclic rate of an M-4A1, AR-15, and/or M-16 rifle.

The firearms training simulator therefore simulates the recoil, cyclic rate, configuration, controls, and mode of operation of the firearm for which it is intended to be used to train a shooter. The training simulator may further provide the opportunity to conduct decision-making training scenarios projected on a screen, with the safety and reduced facilities cost of using a laser instead of live ammunition, while duplicating a sufficient number of the characteristics of a conventional firearm so that the training may effectively carry over to a conventional firearm.

Figure 51:
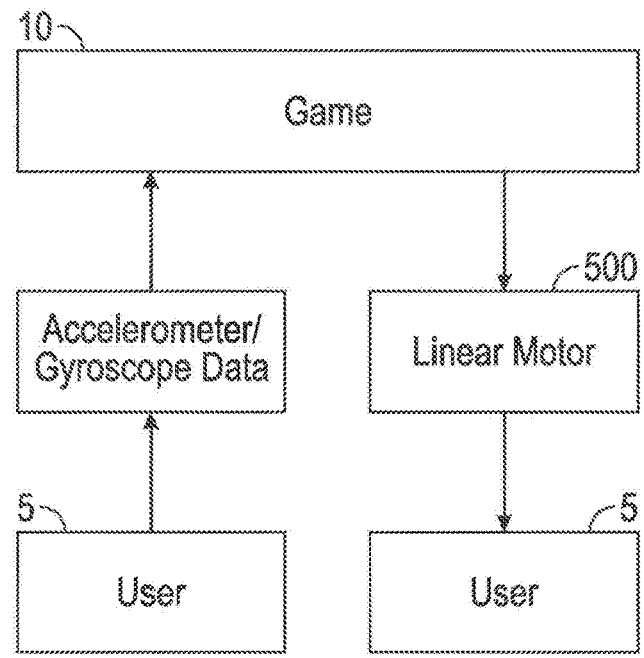
FIG. 51 is a schematic of an embodiment of the method and apparatus shown in FIGS. 49 and 50.

In additional embodiments, systems are provided that may be incorporated into existing structures, including structures designed for providing recoil using pneumatics. Referring to simulator 10 in FIG. 1, controller 50 may be attached either in a wired or wireless communication type configuration as described herein to an existing system's infrastructure as well as to linear motor 500. Embodiments include configurations where the components of controller 50 may also be located within body 20 of the simulator 10. The existing infrastructure may be connected to the simulations/gaming computer that may keep track of in game/in simulation statistics for user 5. Depending on particular installations/applications, the existing infrastructure may include communications/power receptacles (for e.g., on the floor/wall/hanging from ceiling, etc.) where pneumatic systems previously plugged into for communication to the simulations/gaming computer. In some embodiments, controller 50 may plug into these receptacles for communication to the simulations/gaming computer. Once the simulations/gaming computer is connected to controller 50, either in a wired/wireless or hybrid configuration, it may then keep track of system 10 for evaluation of user 5. For example, computer may determine how many rounds have been spent by user 5 in the training exercise, whether user 5 is properly squeezing the trigger based on accelerometer or comparable sensor data from the trigger, and/or if user 5 has taken a hit from in game/in simulation targets. FIG. 51 is a diagram illustrating data collection from user 5 on the left side, while leaving the right side of the diagram (motor feedback from the game/simulation) open for more immersive feedback from the linear motor 500 in additional scenarios/gameplay.

Figure 22:
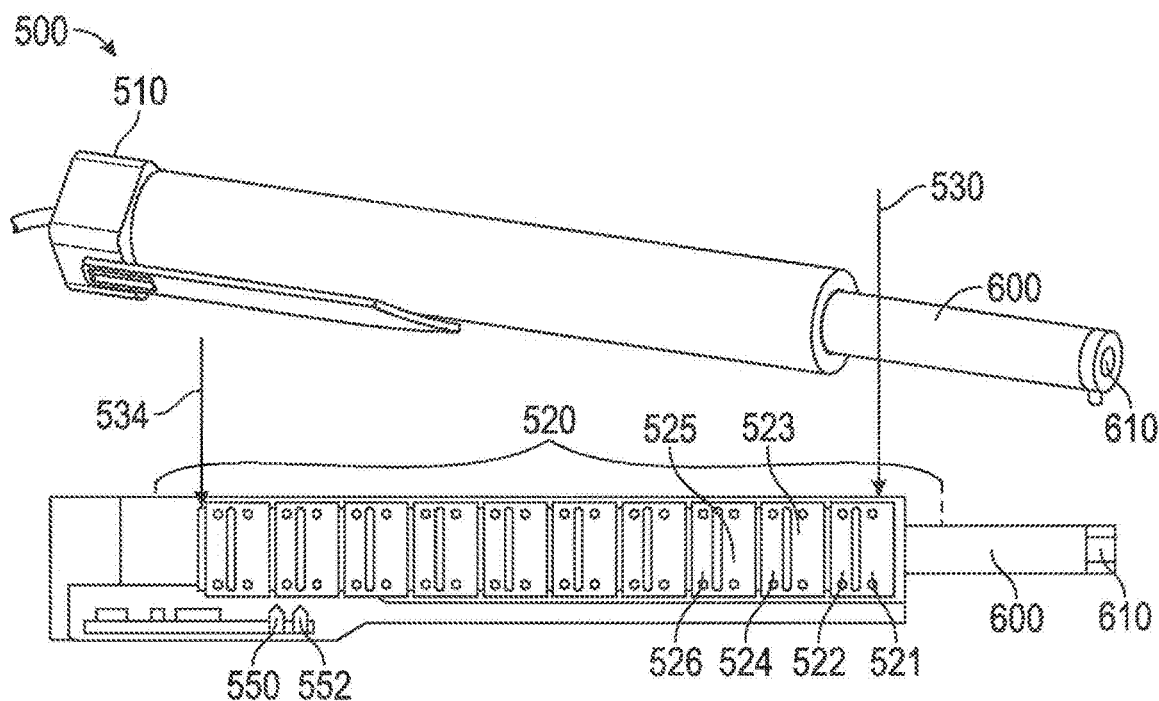
FIG. 22 is a perspective and internal side view of a linear motor and sliding mass, according to an exemplary embodiment of the present disclosure.
Figure 23:
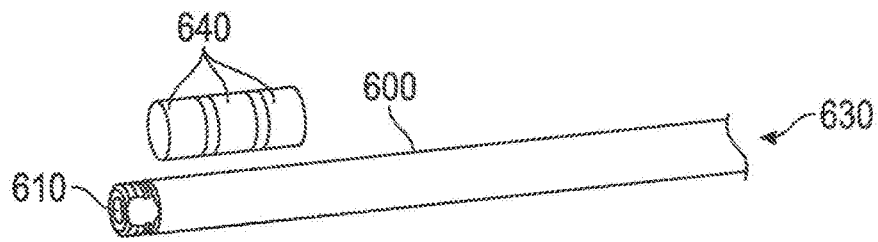
FIG. 23 is a perspective view of a sliding mass with exemplary magnets removed, according to an exemplary embodiment of the present disclosure.
Figure 24:
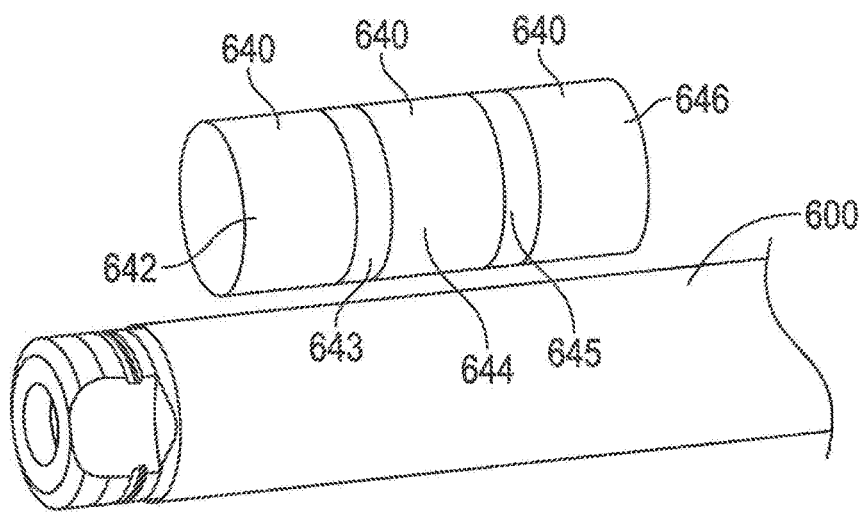
FIG. 24 is an enlarged perspective view of the sliding mass shown in FIG. 23 with exemplary magnets removed.

FIG. 22 is a perspective view of another embodiment of a linear motor 500 and sliding mass 600. Linear motor 500 may include sensors 550 and 552, which may be Hall Effect sensors. FIG. 23 is a perspective view of a sliding mass 600 with exemplary plurality of magnets 640 removed. FIG. 24 is an enlarged perspective view of the sliding mass 600 with exemplary magnets 640 removed. In FIGS. 23 and 24, the plurality of magnets 640 (e.g., magnets 642, 644, 646, etc.) may include neodymium. Additionally, between pairs of magnets 640 may be spacers (e.g., spacer 643 between magnets 642 and 644, and spacer 645 between magnets 644 and 645). In a preferred embodiment, the spacers may include iron (such as ferromagnetic iron). In embodiments, plurality of magnets 640 may be aligned so that like poles face like poles (i.e., north pole to north pole and south pole to south pole). As shown in FIGS. 23 and 24, starting from the left hand side, left pole of first magnet 640 is north and right pole of the first magnet 640 is south. In the middle, left pole of second magnet 640 is south and right pole of the second magnet 640 is north. Finally, in third magnet 640 located at the rightmost portion, left pole of third magnet 640 is north and right pole of the third magnet 640 is south. In exemplary embodiments, the pattern of like magnetic poles facing like magnetic poles repeats throughout slider 600. Thus, the plurality of magnets 640 contained in slider/driven mass 600 may have similar poles facing each other creating a repelling force. In a preferred embodiment, the outer shell of sliding mass 600 may longitudinally hold the plurality of magnets 640 and spacers securely together. In an embodiment, the outer shell may be stainless steel which may be a non-magnetic material that does not substantially interfere with the magnetic forces between plurality of coils 520 of linear motor 500 and plurality of magnets 640 of sliding mass 600. In one embodiment, the sliding mass 600 may use a combination of magnetic materials, for instance neodymium magnets and ceramic magnets, such that for a known set of movements the arrangement of magnets may lower the cost of production while substantially maintaining the acceleration profiles required for the known set of movements. For instance, if the initial movement requires high acceleration of sliding mass 600, a slider 600 may be chosen such that the most expensive and strongest magnets sit within the coil(s) of linear motor 500 prior to movement. This allows a high energy input into the linear motor system that is efficient at accelerating the sliding mass 600 to high speed and may then use the ceramic magnets to bring the neodymium magnets back to the center of the coil(s) at lower velocity, ready for the next recoil/shock effect movement.

Figure 60:
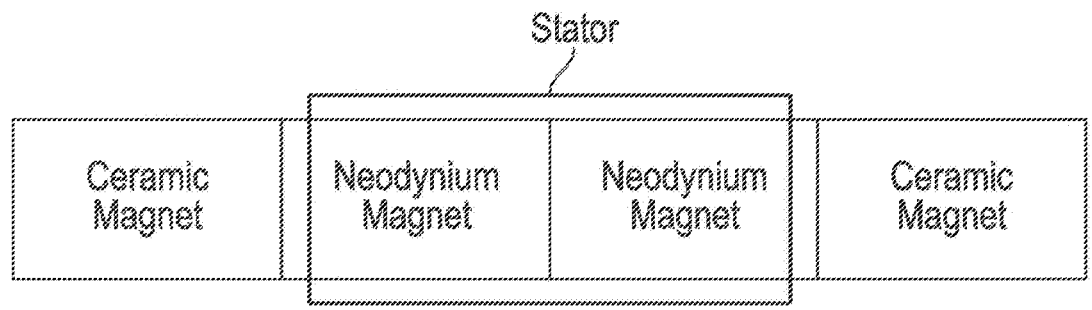
FIG. 60 is a schematic of a sliding mass including four magnets, according to an exemplary embodiment of the present disclosure.

FIG. 22 represents a linear motor system with linear motor 500 and sliding mass 600. FIG. 60 shows sliding mass 600 including four magnets. As shown, two neodymium magnets are in the center and two ceramic magnets are on each end. The two neodymium magnets start inside the stator for each movement. This may allow the strongest magnets to accelerate sliding mass 600 quickly during the initial part of the linear motor system's stroke. When a ceramic magnet is reached, linear motor 500 may still have control of sliding mass 600 and may return the slider to its initial starting position with the neodymium magnets in the center of the stator. This allows for higher cost neodymium magnets to be conserved while using low cost ceramic magnets to allow linear motor 500 to perform at substantially the same functionality for recoil/shock effect and haptic feedback movements.

In one embodiment, the sliding mass 600 may have different length magnets of different types of magnets.

In an embodiment, the sliding mass 600 may have neodymium and ceramic magnets of the same length that are set in the linear path to produce the most efficient single recoil/shock effect or haptic feedback effect possible.

In another embodiment, the sliding mass 600 may have neodymium and ceramic magnets of different lengths that are set in the linear path to produce the most efficient single recoil/shock effect or haptic feedback effect possible.

In embodiments, the linear motor 500 may be modified such that the coil(s) give the most efficient energy transfer possible for both magnet types.

In an embodiment, the linear motor 500 may be modified such that the coil(s) give the most efficient energy transfer possible for one magnet type.

In one embodiment, the sliding mass 600 may have multiple magnetic materials (neodymium, ceramic, etc.) in multiple configurations (changes in length and order) to produce efficient recoil/shock effects or haptic feedback effects.

Figure 25:
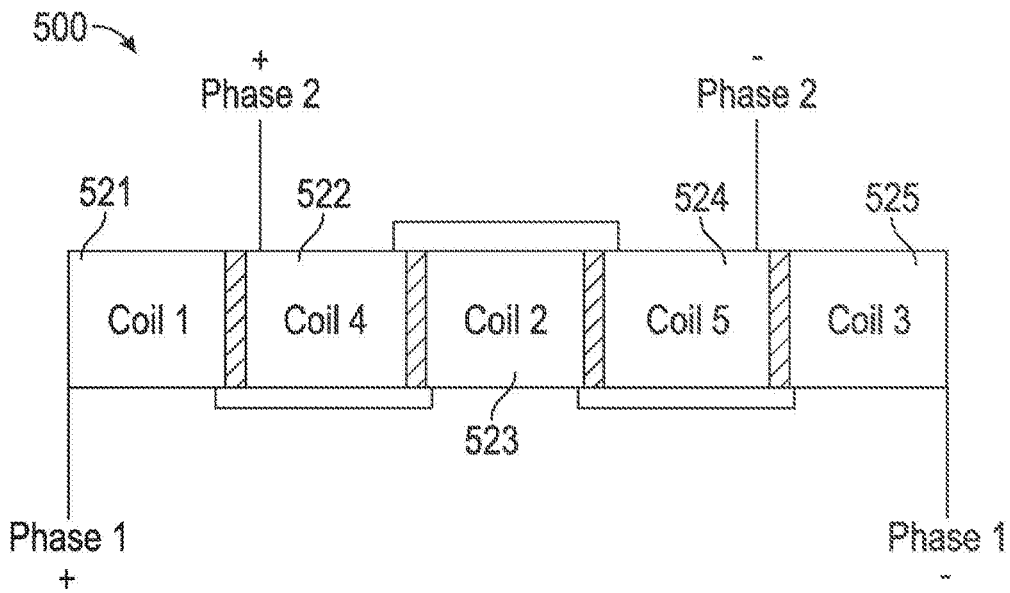
FIG. 25 is a schematic diagram illustrating operation of coils in a linear motor, according to an exemplary embodiment of the present disclosure.
Figure 26:
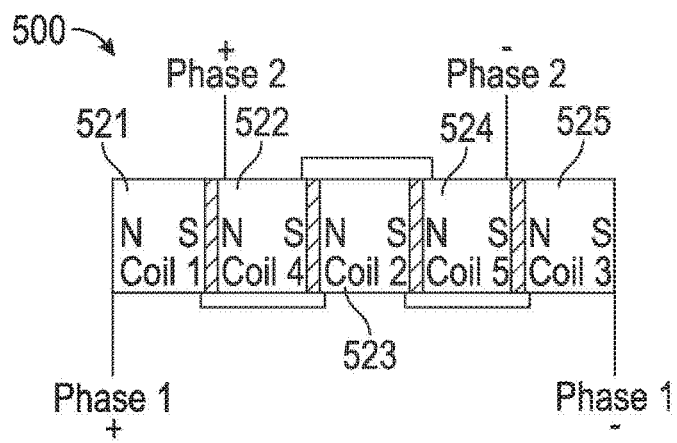
FIGS. 26 and 27 are schematic diagrams illustrating operation of coils in a linear motor in two different energized states, according to an exemplary embodiment of the present disclosure.
Figure 27:
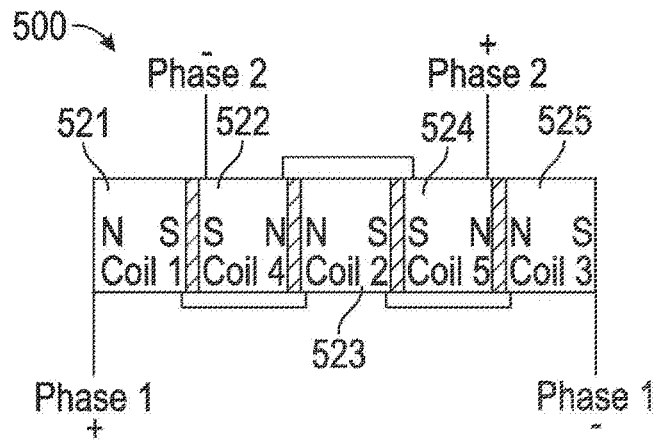

FIGS. 25 to 29 schematically show operation of linear motor 500 and sliding mass 600 as the plurality of magnets 640 are driven by the plurality of coils 520. FIG. 25 is a schematic diagram illustrating operation of the plurality of coils 520 in a linear motor 500. FIGS. 26 and 27 are schematic diagrams illustrating operation of the coils 520 in a linear motor 500 in two different energized states.

In FIG. 25, coils 521, 523, and 525 in the stator of linear motor 500 may be wired in series and labeled as phase 1 (when wired together in series these coils of phase 1 may be considered sub-coils of a single independently controllable magnetic coil). Coils 522 and 524 may also be wired in series and labeled as phase 2 (when wired together in series these coils of phase 2 may be considered sub-coils of a single independently controllable magnetic coil). The plurality of independently controllable magnetic coils 520 of linear motor 500 may be wound in the same or different direction depending on design. Each independently controllable coil in phase 1 and 2 may produce its own magnetic field when energized. This allows for independently controllable magnetic coils of phase 1 and 2 in the plurality of coils 520 to repel each other or for phase 1 and phase 2 coils to attract each other depending on the way the phases are polarized and the coils wound. These alternative states of polarization are shown in FIGS. 26 and 27. In FIG. 26, phase 1 and phase 2 are polarized in the same direction so that coils in the two phases are attracted to each other. In FIG. 27, phase 1 and phase 2 are polarized in the opposite direction so that coils in the two phases repel each other. By varying the polarization of phases in the plurality of independently controllable magnetic coils 520 of linear motor 500, sliding mass 600 may be controllably moved as desired through the plurality of coils 520 so as to create the desired reactive forces which may include time dependent controlled force (impulse), acceleration, velocity, position, and/or momentum.

Figure 28:
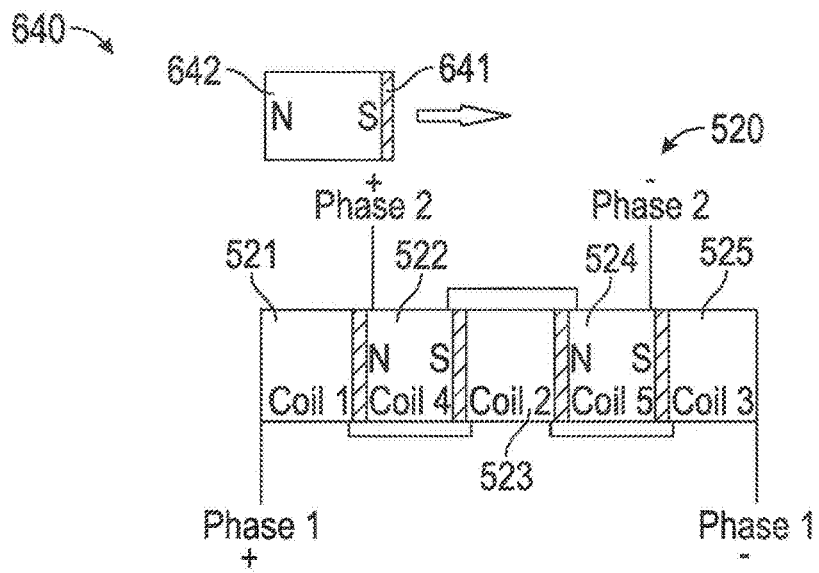
FIGS. 28 and 29 are schematic diagrams illustrating movement of magnets through a linear motor in two different energized states, according to an exemplary embodiment of the present disclosure.
Figure 29:
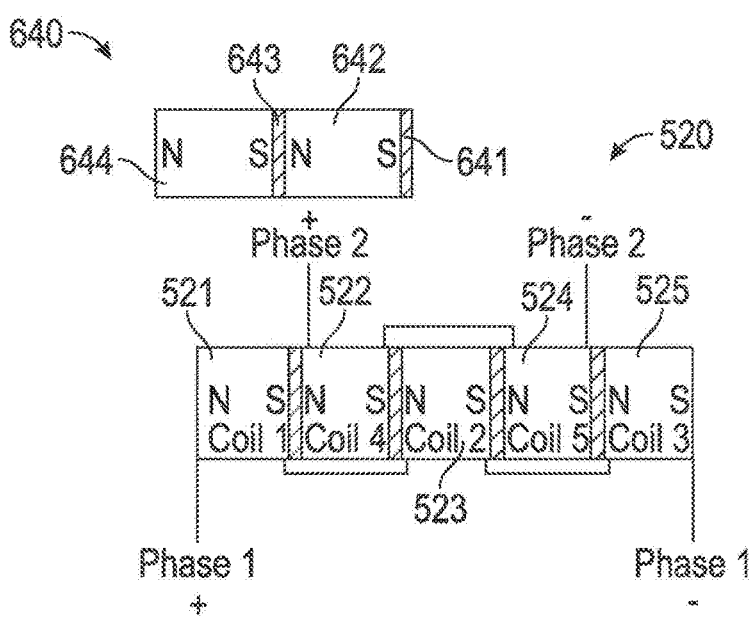

FIGS. 28 and 29 are schematic diagrams illustrating movement of the plurality of magnets 640 of sliding mass 600 through the plurality of coils 520 in linear motor 520 in different energized states.

FIG. 28 schematically indicates initial movement of sliding mass 600 with plurality of magnets 640 through plurality of coils 520 of linear motor 500. In FIG. 28, the first magnet 642 of sliding mass 600 enters plurality of coils 520 of linear motor 500. Plurality of coils 520 may then be energized with phase 2 polarized as shown and phase 1 not being energized (or OFF). This causes magnet 642 (and sliding mass 600) to be pulled deeper into plurality of coils (schematically indicated by the arrow towards the right). As schematically shown in FIG. 29, when first magnet 642 moves halfway into coil 522, phase 1 may be energized (or turned ON), thereby creating a pulling force on magnet 642 and speeding the second magnet 644 to the center of coil 521 while at the same time repelling the magnet 642. The movement of sliding mass 600 eventually stops when the plurality of magnets 640 reach steady state with the plurality of coils 520, which in this case means that the north pole of coils 521 and 522 are aligned with the north poles of magnets 644 and 642, respectively; and north pole of coil 522 is aligned with south pole of magnet 644 and south pole of coil 521 is aligned with the north pole of magnet 642. Thus, the magnetic forces are in equilibrium and movement ceases while phase 1 and 2 remain energized with this polarization. So, by switching the coils ON/OFF and by alternating the coils polarization, the slider (filled with neodymium magnets) may be pushed or pulled through the stator (made up of many coils). Furthermore, the number of coils depicted in FIGS. 25 through 29 through may be increased to have a larger accelerating cross-section.

In one embodiment, there may be two or more phases in linear motor 500.

In another embodiment, two phases in linear motor 500 may use two or more coils 520.

Figure 30:
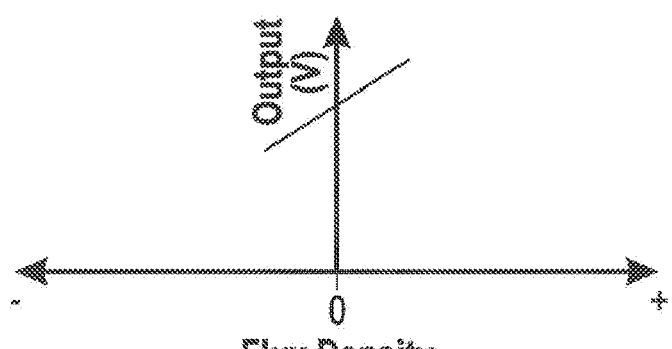
FIG. 30 is a diagram illustrating magnetic flux density versus voltage output, according to an exemplary embodiment of the present disclosure.

The velocity, acceleration, and linear distance of sliding mass 600 may be measured as a function of Hall Effect sensors 550 and 552 that are 90 degrees out of phase. Out of phase Hall Effect sensors 550 and 552 may each produce a linear voltage in response to increasing or decreasing magnetic fields. FIG. 22 shows the mechanical alignment in linear motor 500 and sensors 550, 552. The response that sensors 550 and 552 give as a function of magnetic field strength (flux through the sensor) versus voltage (out of the sensor) is depicted in FIG. 30, which is a diagram illustrating magnetic flux density versus voltage output.

Figure 31:
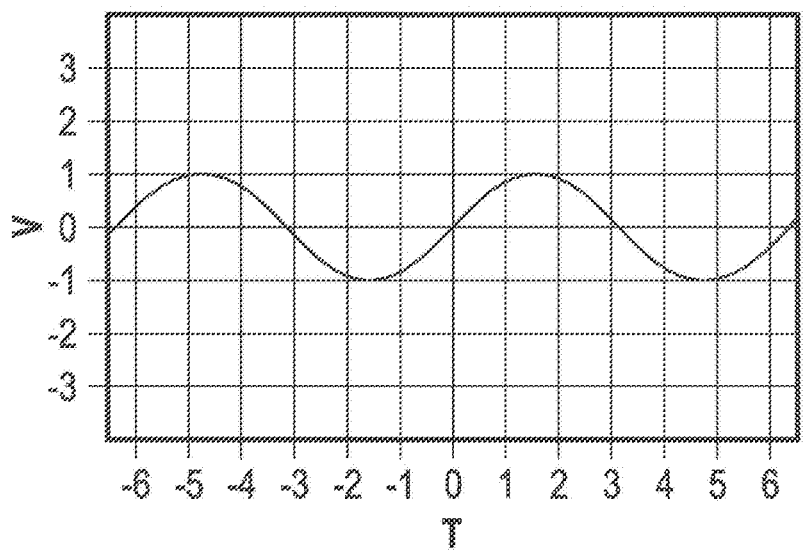
FIGS. 31 and 32 are diagrams of sensor voltage response versus time for a slider moving through a linear motor, according to an exemplary embodiment of the present disclosure.
Figure 32:
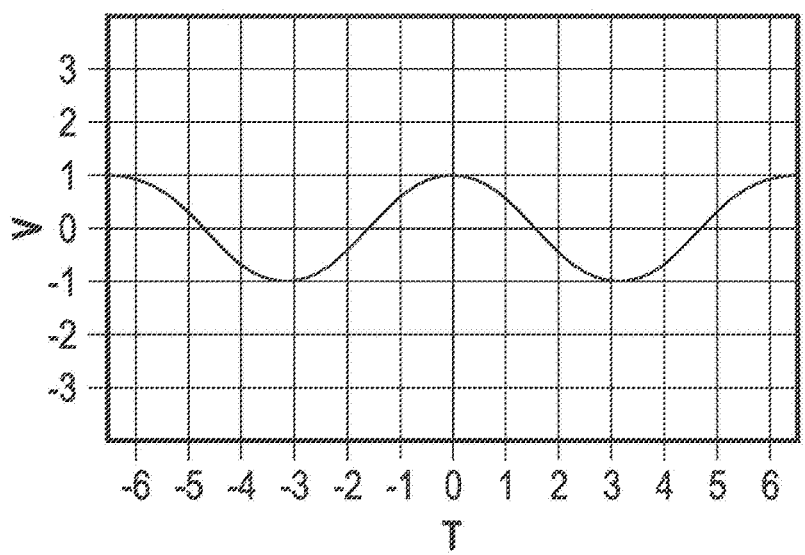

FIGS. 31 and 32 are exemplary diagrams of sensors 550 and 552 voltage response versus time for a slider moving through the linear motor. When sliding mass 600 is moved through the plurality of coils 520 of linear motor 500, 90 degree out of phase sensors 550 and 552 provide a voltage response versus time falling into a Sine or Cosine function as indicated in FIGS. 31 (sine(x) for sensor 550) and FIG. 32 (cosine(x) for sensor 552). These resultant waves are generated by sensors 550 and 552 because generated magnetic flux for the plurality of magnets 640 inside sliding mass 600 are most powerful at their magnetic poles. So as the north poles of two magnets approach, the wave goes positive and peaks when directly above those poles. Continuing in the same direction, as the south poles approach, the wave goes negative and peaks when directly above those poles. Thus, one sensor 550 gives a function of $\sin(x)$ and the other sensor 552 gives a function of $\cos(x)$. As shown, these functions are 90 degrees out of phase. Two sensors 550 and 552 may be used for better precision feedback and control of sliding mass 600 through the plurality of coils 520 of linear motor 500, and as a method to make sure sliding mass is continually tracked accurately.

Figure 33:
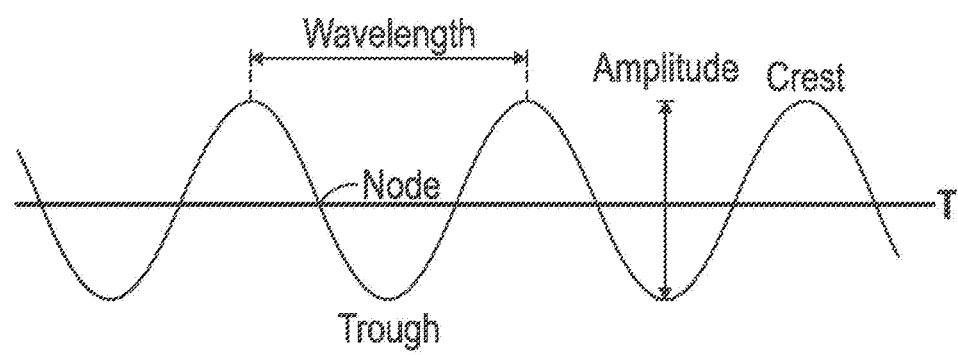
FIG. 33 is a diagram of a sample wave form, according to an exemplary embodiment of the present disclosure.

To provide additional explanation, sensor 550 generating a sine wave is plotted in FIG. 31, and will be further examined regarding how this graph may be used to track velocity, acceleration, and displacement of sliding mass 600. FIG. 32 illustrates the cosine wave generated from sensor 552. FIG. 33 is a diagram of a sample waveform which illustrates the various components of a waveform generated by sensor 550. The wavelength ($\lambda$) relates to the velocity of sliding mass 600 through plurality of coils 520 of linear motor 500. As the wavelength shortens, the frequency may be calculated by $f=1/\lambda$, and the frequency will increase as the wavelength shortens.

Figure 34:
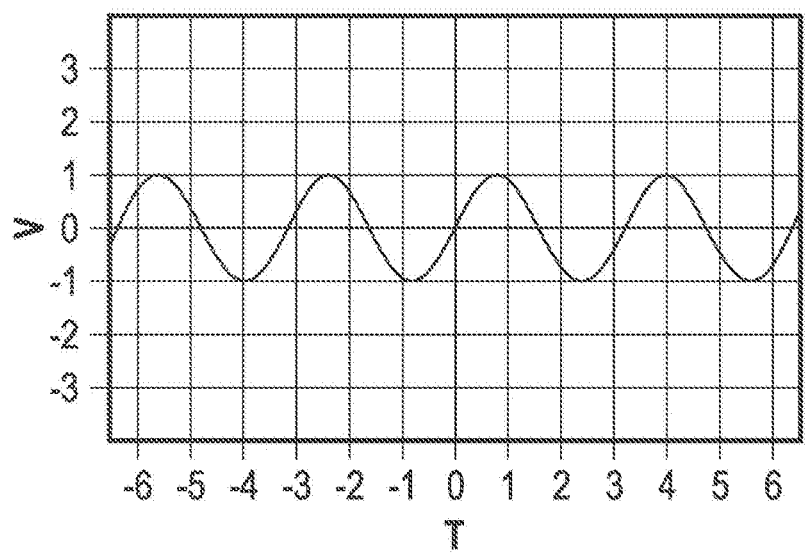
FIGS. 34 and 35 are diagrams of sensor voltage response versus time for a slider moving through a linear motor at two different constant linear speeds, according to an exemplary embodiment of the present disclosure.
Figure 35:
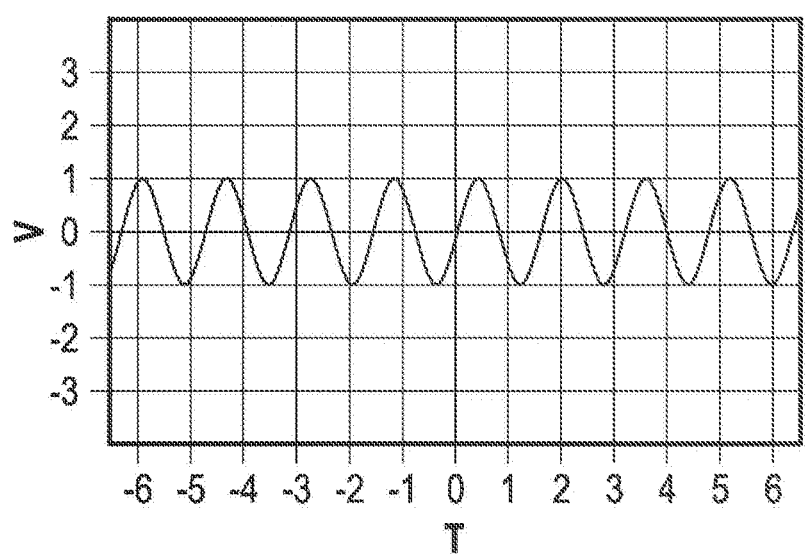

FIGS. 34 and 35 are exemplary diagrams of sensor 550 voltage response versus time for a sliding mass 600 moving through linear motor 500 at two different constant linear speeds. For example, in FIG. 34, sliding mass 600 may be said to be moving through plurality of coils 520 at 1 meter per second and generating this wave. FIG. 35 may be generated as sliding mass 600 speeds up to 2 meters per second. As shown, an increase in wave frequency corresponds to the velocity with which sliding mass 600 is moving through the plurality of coils 520 of linear motor 500. Furthermore, the change in waveform from FIG. 34 to FIG. 35 relates to the acceleration of sliding mass 600. FIGS. 34 and 35 each individually represent constant velocities of sliding mass 600 (although the constant velocity in FIG. 35 is twice that of the constant velocity in FIG. 34) so that in each of these two figures, there is no acceleration; however, as sliding mass 600 slider approached 2 meters per second linear speed shown in FIG. 35, the frequency increased to the value in FIG. 35: that frequency change over time may be used to compute acceleration of driven mass 600. Lastly, the distance traveled by driven mass 600 may be calculated by knowing the length of the plurality of magnets 640 in sliding mass, and counting the number of wavelengths that go past sensor 550. Each wavelength may correspond to the full length of the permanent magnet inside the body of sliding mass 600. Additionally, waveforms from both sensors 550, 552 may be used to keep slider 600 in a steady state (non-moving). By looking at the output of sensors 550, 552, for example, the sine and cosine waves may be compared since they are 90 degrees out of phase to maintain a steady state driving signal from controller 50 that does not drift (or compound error) based on the accuracy of two measurements rather than one. Accordingly, velocity, acceleration, and distance may be calculated from voltage versus magnetic flux graphs of sensors 550, 552.

Emulating Overall Recoil Impulse

In one embodiment, linear motor 500 and sliding mass 600 may be used to emulate total recoil impulse for a particular firearm firing a particular form of ammunition.

"Actual recoil force" is the force generated by a particular type of firearm firing a particular type of ammunition at any point in time after firing where such force is transmitting to the user. Such actual recoil force may be plotted over a particular period of time from initial firing of the ammunition in the firearm to the end of any actual recoil force following such firing.

On the other hand, "generated recoil force" is the reactive force generated by linear motor 500 controlling movement of sliding mass 600. Such generated recoil force may be transmitted to a user 5 holding simulated firearm body 20 of simulator system 10. Actual recoil impulse is the area under a force versus time diagram where the force is generated by a particular type of firearm firing a particular type of ammunition. Generated recoil impulse is the area under a force versus time diagram 1600 of a reactive force generated by linear motor 500 controlling movement of sliding mass 600 (e.g., acceleration, velocity, and distance) over time.

FIG. 16 shows prophetic examples of diagrams for actual recoil force 1500 versus time, along with generated recoil force 1600 versus time. The area under the actual recoil force versus time diagram 1500 is the actual recoil impulse. The area under the generated recoil force versus time diagram 1600 is the generated recoil impulse. The area under the generated recoil impulse may be both positive (above the zero), and negative (below the zero). In a preferred embodiment, the negative area may be subtracted from the positive area in calculating total impulse. In other embodiments, the negative area may be ignored in calculating total impulse.

As shown, the force versus time diagrams 1500, 1600 of actual recoil over time versus reaction forces generated by linear motor 500 and sliding mass 600 over time closely track each other so that the impulse and reactive impulse are approximately equal. However, in different embodiments, the actual recoil over time diagram 1500 versus reaction forces generated by linear motor 500 and sliding mass over time 1600 may substantially vary as long as both calculated impulses (from the areas under the diagrams) are close to each other at the end of the firing cycle.

Figure 36:
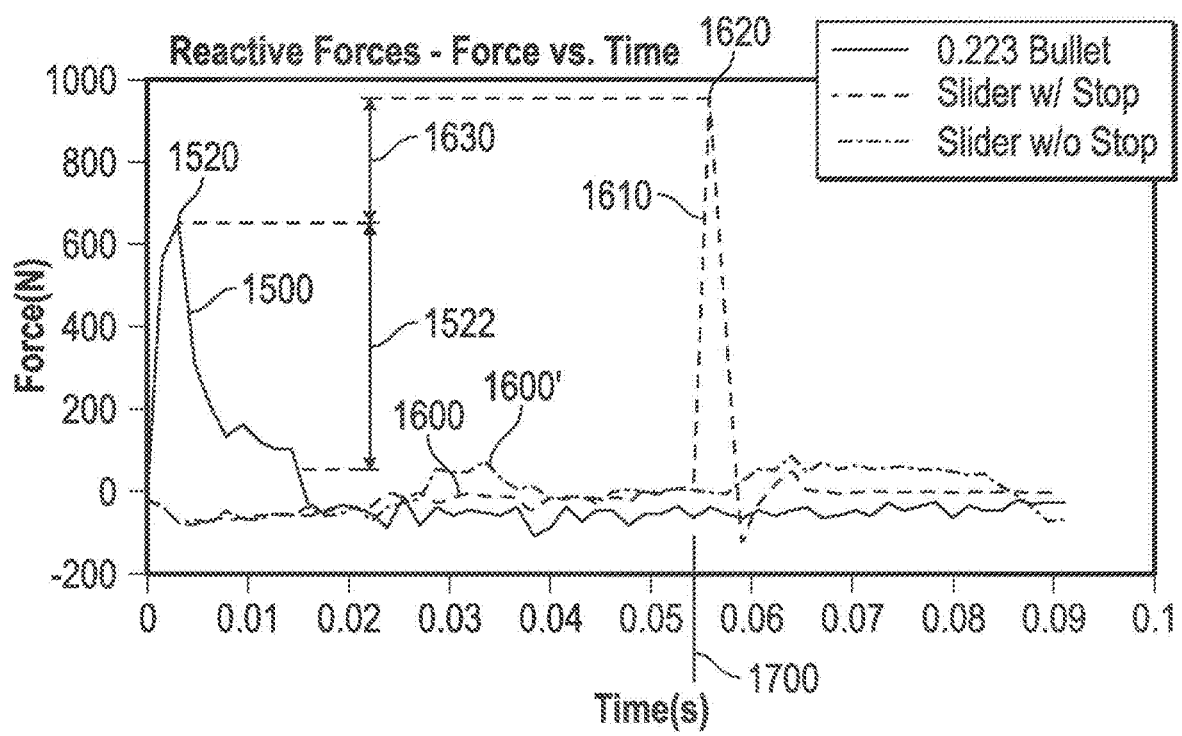
FIG. 36 is a diagram of a force versus time plotted for recoil forces for an actual firearm, compared to simulated recoil forces by a method and apparatus using a mechanical stop, and not using a mechanical stop, according to an exemplary embodiment of the present disclosure.

FIG. 36 shows a single diagram with three force versus time plots: (1) force versus time of actual forces 1500 (first plot for an M16/AR-15 type rifle firing a .223 Remington bullet/round having an overall weight of about 7.5 pounds (3.4 kg)), (2) force versus time of generated reactive forces from linear motor and sliding mass in combination with a mechanical stop 1600, and (3) force versus time of generated reactive forces from linear motor and sliding mass without using a mechanical stop 1600'. A positive value of force indicates a force pushing user 5 backward. As shown by the time, a firing cycle of about 90 milliseconds is used.

Diagram 1600 includes a spike 1610 when the sliding mass 600 hits the mechanical stop 800, and the areas under each plot 1500, 1600 should be roughly the same to get the same overall impulse. For diagram 1600, time 1700 indicates the initial contact between sliding mass 600 and mechanical stop 800. In different embodiments, because the time period for the collision between sliding mass 600 and mechanical stop 800 is so short (about less than 5 milliseconds), time of initial contact 1700 may also be calculated using the time of peak reactive force 1620.

FIG. 36 shows the peak 1520 of actual recoil force 1500 which is compared to the peak 1620 of generated recoil force 1600, and the difference 1630 between such peaks. In various embodiments, mechanical stop 800 may be used to generate a spike 1610 in the generated recoil force, which spike 1620 has a difference of 1630 compared to the peak 1520 of actual recoil force 1500.

In various embodiments, peak 1620 may be such that the difference 1630 may be minimized. In embodiments, during an emulated firing sequence, the difference 1630 is less than 50 percent of the peak 1620. In various other embodiments, the difference 1630 is less than no more than 45, 40, 35, 30, 25, 20, 15, 10, 5, 4, 3, 2, and/or 1 percent of the peak 1620. In embodiments, the difference 1630 may be within range between any two of the above referenced percentages of peak 1620.

In various embodiments, the average generated recoil force by linear motor 500 controlling sliding mass 600 during a particular simulated firing sequence before initial contact of sliding mass 600 with mechanical stop 800 at time 1700 may be calculated by calculating the impulse up to initial impact at time 1700 divided by the time at time 1700. In embodiments, the peak 1620 of generated reactive force is at least 50 percent greater than the average generated recoil force by linear motor 500 controlling sliding mass 600 during a particular simulated firing sequence before initial contact of sliding mass 600 with mechanical stop 800 at time 1700. In various embodiments, the peak generated reactive force 1620 is greater than 55, 60, 65, 70, 75, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling sliding mass 600 during a particular simulated firing sequence before initial contact of sliding mass 600 with mechanical stop 800 at time 1700. In embodiments, a range between any two of the above referenced percentages may be used for such comparison.

The average generated recoil force by linear motor 500 controlling sliding mass 600 during an entire particular simulated firing sequence may be calculated by calculating the impulse during the entire firing sequence and dividing the time for such entire firing sequence. In various embodiments, the peak 1620 of generated reactive force may be at least 50 percent greater than the average generated recoil force by linear motor 500 controlling sliding mass 600 during an entire particular simulated firing sequence (i.e., both before and after initial contact of sliding mass 600 with mechanical stop 800 at time 1700). In embodiments, the peak generated reactive force is greater than 55, 60, 65, 70, 75, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling sliding mass 600 during an entire particular simulated firing sequence. In various embodiments, a range between any two of the above referenced percentages may be used for such comparison.

The average generated recoil force by linear motor 500 controlling sliding mass 600 during a particular simulated firing sequence after initial contact of sliding mass 600 with mechanical stop 800 at time 1700 may be calculated by calculating the impulse following initial impact at time 1700 divided by the time following time 1700. In embodiments, the peak 1620 of generated reactive force is at least 50 percent greater than the average generated recoil force by linear motor 500 controlling sliding mass 600 during a particular simulated firing sequence subsequent initial contact of sliding mass 600 with mechanical stop 800 at time 1700. In various embodiments, the peak generated reactive force is greater than 55, 60, 65, 70, 80, 85, 90, 95, 100, 110, 120, 130, 140, 150, 175, 200, 225, 250, 275, 300, 400, 500, 600, 700, 800, 900, 1000, 1200, 1500, and/or 2000 percent greater than the average generated recoil force by linear motor 500 controlling sliding mass 600 during a particular simulated firing sequence subsequent to initial contact of sliding mass 600 with mechanical stop 8—at time 1700. In embodiments, a range between any two of the above referenced percentages may be used for comparison.

Figure 37:
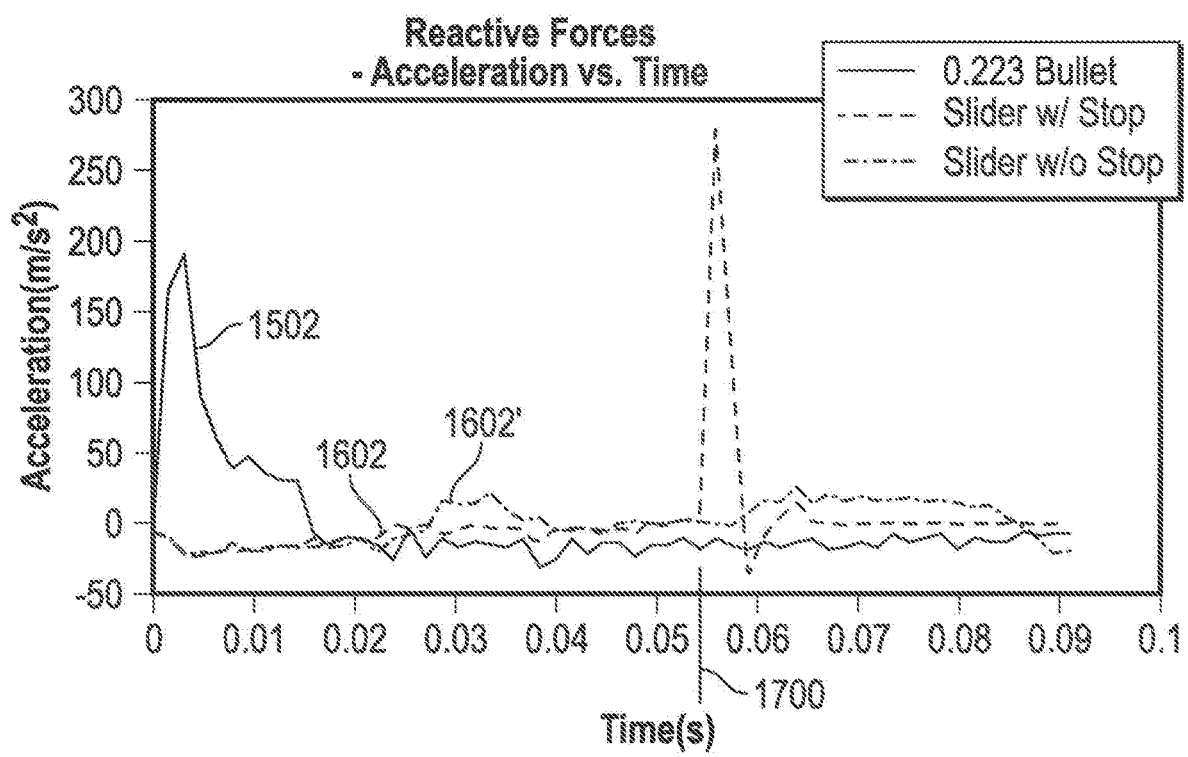
FIG. 37 is a diagram of an acceleration versus time plotted for recoil acceleration for an actual firearm, compared to simulated acceleration of a sliding mass caused by a method and apparatus using a mechanical stop, and not using a mechanical stop, according to an exemplary embodiment of the present disclosure.

FIG. 37 is an exemplary diagram of an acceleration versus time plotted for recoil acceleration for an actual firearm 1502, compared to simulated acceleration of the sliding mass caused by the method and apparatus using a mechanical stop 1602, and not using a mechanical stop 1602'. Force from the acceleration diagrams may be calculated using the formula force equals mass times acceleration.

Figure 38:
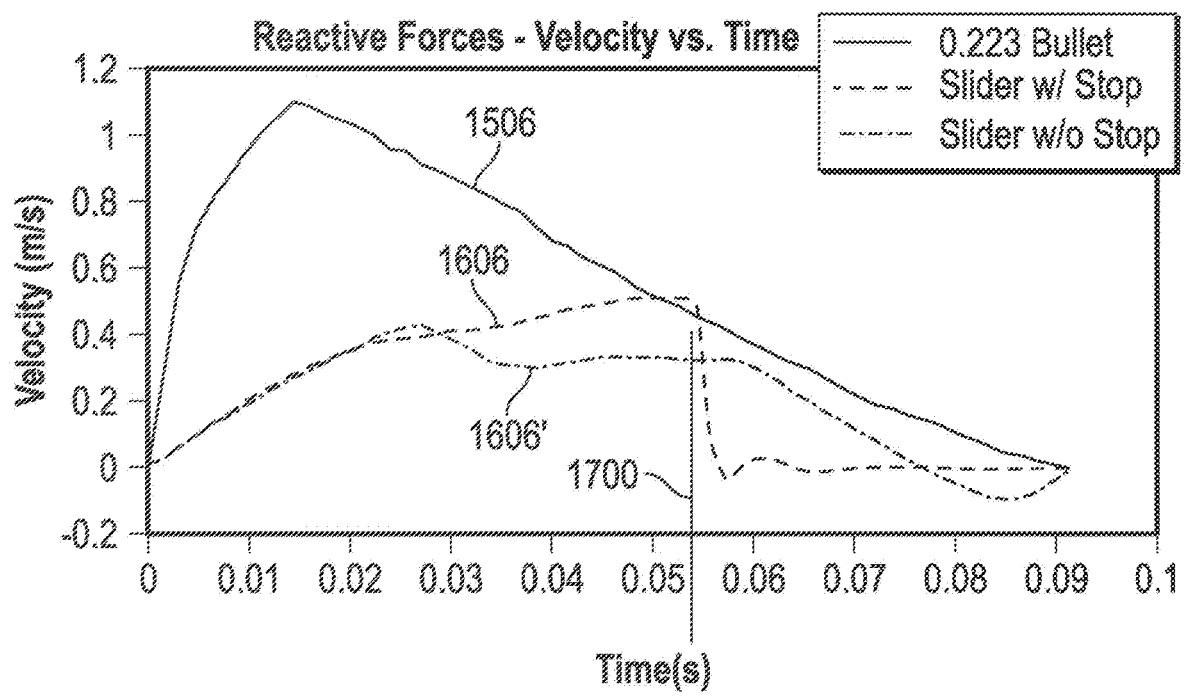
FIG. 38 is a diagram of a velocity versus time plotted for recoil velocity for an actual firearm, compared to simulated velocity of a sliding mass caused by a method and apparatus using a mechanical stop, and not using a mechanical stop, according to an exemplary embodiment of the present disclosure.

FIG. 38 is an exemplary diagram of a velocity versus time plotted for recoil velocity for an actual firearm 1506, compared to simulated velocity of the sliding mass 25 caused by the method and apparatus using a mechanical stop 1606, and not using a mechanical stop 1606'.

In one embodiment, stop 800 may be employed to modify the generated recoil force diagram from linear motor 500 controlling sliding mass 600 by sharply increasing the reactive force at the point of collision between sliding mass 600 and mechanical stop 800. A mechanical stop 800 may be employed inside the simulated firearm body 20 to "rigidly" (i.e., more quickly negatively accelerate to zero sliding mass 600 than linear motor 500 is capable of) at the end of allowed length of travel 660. Such quick stop produces an enhanced recoil effect on user 5, and higher generated reactive force. In one embodiment, the reactive force generated by sliding mass 600 colliding with mechanical stop 800 may be greater than any force generated by linear motor 500 accelerating sliding mass 600 during an emulated firing sequence.

In embodiments, during an emulated firing sequence, the maximum reactive force generated by linear motor 500 accelerating sliding mass 600 is no more than 50 percent of the reactive force generated by sliding mass 600 colliding with mechanical stop 800. In various embodiments, the maximum reactive force generated by linear motor 500 accelerating sliding mass 600 is no more than 55, 60, 65, 70, 75, 80, 85, 90, 95, 99, and/or 100 percent of the reactive force generated by sliding mass 600 colliding with mechanical stop 800. In other embodiments, the maximum reactive force generated by linear motor 500 accelerating sliding mass 600 may be within range between any two of the above referenced percentages of the maximum reactive force generated by linear motor 500 controlling sliding mass 600.

In various embodiments, either actual recoil impulse and/or the generated recoil impulse by linear motor 500 controlling sliding mass 600 are within about 50, 55, 60, 65, 70, 75, 80, 85, 90, 95, and/or 100 percent of each other. In various embodiments, a range between any two of the above referenced percentages may be used.

In various embodiments, the total time for an emulated firing cycle by linear motor 500 controlling sliding mass 600 may be less than about 200 milliseconds. In embodiments, the maximum time for an emulated firing cycle may be less than about 25, 30, 35, 40, 45, 50, 55, 60, 65, 70, 75, 80, 85, 90, 95, 100, 110, 120, 130, 140, 150, 160, 170, 180, 190, and/or 200 milliseconds. In embodiments, the maximum time may be between any two of the above referenced times.

Emulating a Force Versus Time Plot of Firearm

In one embodiment, an actual firearm with actual ammunition may be tested and the actual recoil force over time plotted. In this embodiment, linear motor 500 and magnetic mass/shaft 600 movement (e.g., acceleration, velocity, and position) may be programmed so as to emulate the actual force versus time diagram that was obtained from the test. In different embodiments, the emulated force versus time may be within 1, 2, 3, 4, 5, 10, 15, 20, 25, 30, 35, 40, 45, and/or 50 percent of the plot. In embodiments, the variation may be within a range between any two of the above referenced values. Total impulse (which is the integral or sum of the area under the force versus time diagram) may be emulated for relatively short time sequences as it is believe that users have difficulty perceiving changes in force over time for very short time intervals regarding recoil forces, and effectively feel the overall impulse of the recoil force in firearms.

Changing the Strength of the Magnetic Field of Linear Motor

In one embodiment, the strength of the magnetic field generated by the plurality of coils 520 of linear motor 500 as a magnet in magnetic mass/shaft 600 passes by and/or is in touch with a particular coil generating a magnetic field may be increased from an initial value. In different embodiments, the strength of the field may be changed by 1, 2, 3, 4, 5, 10, 15, 20, 25, 30, 35, 40, 45, and/or 50 percent of the initial value. In embodiments, the variation may be within a range between any two of the above referenced percentages.

Using Sensors to Directly/Indirectly Measure Dynamic Properties of Sliding Mass and Have Linear Motor Control Dynamic Properties of Sliding Mass Based on Sensor Input In one embodiment, the acceleration, velocity, and/or position versus time of the magnetic mass/shaft 600 may be measured directly and/or indirectly (such as by sensors 550 and/or 552), and linear motor 500 may change/set the strength of the magnetic field generated by plurality of coils 520 to achieve a predetermined value of acceleration, velocity, and/or position versus time for sliding mass 600. In different embodiments, the predetermined values of emulated acceleration, velocity, and/or position versus time may 25 be based on emulating a force versus time diagram obtained from testing an actual firearm (or emulating impulse). In embodiments, the emulated diagram may be within 1, 2, 3, 4, 5, 10, 15, 20, 25, 30, 35, 40, 45, and/or 50 percent of the plot. In different embodiments, the variation may be within a range between any two of the above referenced values.

Options to Program in Different Variations for Firearm to be Simulated

In various embodiments, a user of system 10 may be provided one or more of the following options in using system 10 regarding changes in a type of firearm for which recoil is to be simulated by system 10:
(a) different size/caliber/type of ammunition in actual type of firearm to be simulated with particular type of ammunition.
(b) adding/removing a muzzle suppressor to actual type of firearm to be simulated with particular type of ammunition.
(c) different size/type of bolt springs for actual type of firearm to be simulated with particular type of ammunition.

In each of the above options, system 10 may cause linear motor 500 to control sliding mass 600 to generate a recoil force versus time diagram (or generate an impulse) which is different from the simulation for the type of firearm without the option selected, and which approximates the recoil of the firearm having such option.

Using Same Core Simulation System With Different Firearm Model Attachments to Provide User With Option of Better Simulating Different Types of Firearms Embodiments of the present disclosure provide for methods and apparatuses including the same core simulation system described herein but having different firearm attachments for simulating different firearms. Here, using the same controller 50 and attached linear motor 500, have different firearm attachments (e.g., AR-15 rifle unit attachment, and Glock pistol unit attachment). Magnetic sliding mass/shaft 600 slidably connected to the linear motor 500 may also be changed, without also changing the linear motor 500.

In various embodiments, simulator 10 may include a plurality of different body attachments 20, 20', 20", etc. for simulating recoil patterns from a plurality of different type firearms, each of the plurality of body attachments being interchangeably operably connectable with linear motor 500. In embodiments, each of the plurality of body attachments 20, 20', 20", etc. may include unique identifiers that inform controller 50 in the selection of one of a plurality of predefined sets of recoil simulating kinematic movements of sliding mass 600 in order to simulate a recoil pattern for the particular type of firearm that the particular body attachment represents. Based on the unique identifier of the particular body attachment 20, 20', 20", etc, operably connectable to linear motor, controller 50 may select one of the plurality of predefined sets of kinematic movement to control linear motor 500 in controlling sliding mass 600 to create a series of predefined movements for sliding mass 600 and emulate recoil for the particular type of firearm that the particular connected body attachment represents. In embodiments, the individual identifiers may be microcontrollers which, when a body attachment 20 is connected to linear motor 500, communicate with microcontroller 50 (shown in FIG. 10), and identify the particular type of firearm for which recoil is to be simulated. In one embodiment, the plurality of interchangeable different type body attachments 20, 20', 20", etc. includes a plurality of different type rifles. In embodiments, the plurality of interchangeable different type body attachments 20, 20', 20", etc. includes a plurality of different type shotguns. In one embodiment, the plurality of interchangeable different type body attachments 20, 20', 20", etc. includes at least one rifle body type and at least one shotgun body type and/or at least one pistol body type. In embodiments, the plurality of interchangeable different type body attachments 20, 20', 20", etc. includes a plurality of different type rifles and different type shotguns and/or pistols.

In various embodiments, wireless/communication may be provided for one or more of the components of the method and apparatus 10 such as where the body attachment 20 and/or linear motor 500 are not hard wired to the controller 50 but these components are set up to communicate wirelessly between each other, along with one or more battery power supplies being used to power the linear motor 500 and/or controller 50 and/or other components. In one embodiment, the battery power supply for the linear motor may be contained in the body 20 (such as where the battery simulates an ammunition clip to be inserted into body 20).

Handgun

In an embodiment, a method and apparatus for charging or "cocking" simulated handguns using a linear motor system 500 may be provided where the linear motor 500 is in the path of cocking of the slider 900.

In one embodiment, a handgun 10 with linear motor 500 may be provided having a mechanical sear 680 and spring 950. In embodiments, the spring 950 includes a spring constant emulating the force required to charge or "cock" a slider 900 of the handgun being simulated. In other embodiments, the spring 950 includes a spring constant which stores substantially the same amount of potential energy as the work energy required to charge or "cock" the slider 900 of the handgun being simulated.

Figure 61:
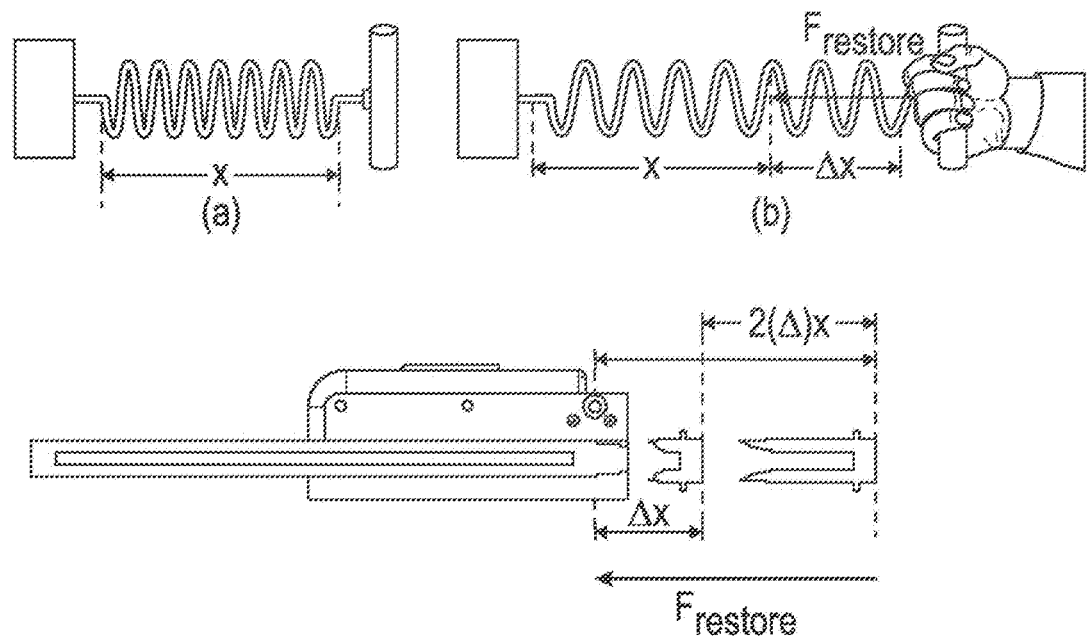
FIG. 61 is a schematic of a linear motor emulating a spring constant of a force required to charge or cock a slide of a handgun being simulated, according to an exemplary embodiment of the present disclosure.

In embodiments, a handgun 10 may be provided with linear motor 500 emulating the spring constant of the force required to charge or "cock" the slider 900 of the handgun being simulated. This may be accomplished by treating the linear motor as a simple spring. FIG. 61 shows the force imparted on the user by the spring, $F_{restore}$, trying to return to its original location (x), which may be described by Hook's Law (F=−kx). The change in x or (Δx) determines the spring's force pulling back on the user, typically as the distance x increases so does $F_{restore}$ until material deformation is reached.

This emulation of the charging spring by the linear motor may follow the traditional spring used in the real handgun by varying its resistance force over the linear position of the motor's slider with a single spring constant k. Or the motor may emulate multiple spring constants $k_1 \ldots _2 \ldots _3 \ldots$ to emulate other mechanical resistances encountered in a typical handgun platform's linear movement associated with charging or "cocking" the weapon slider 900. For instance, as the motor's slider is moved to position Δx it may apply a spring constant $k_1$ to the user by altering the force available to the motor to resist changes in slider position. Then as the motor slider is moved to position 2(Δx) it may apply a spring constant $k_2$ to the user varying $F_{restore}$ over the linear position. Thus, the traditional forces of the weapon spring may be emulated over the linear position with other mechanical forces figured in as well.

Figure 39:
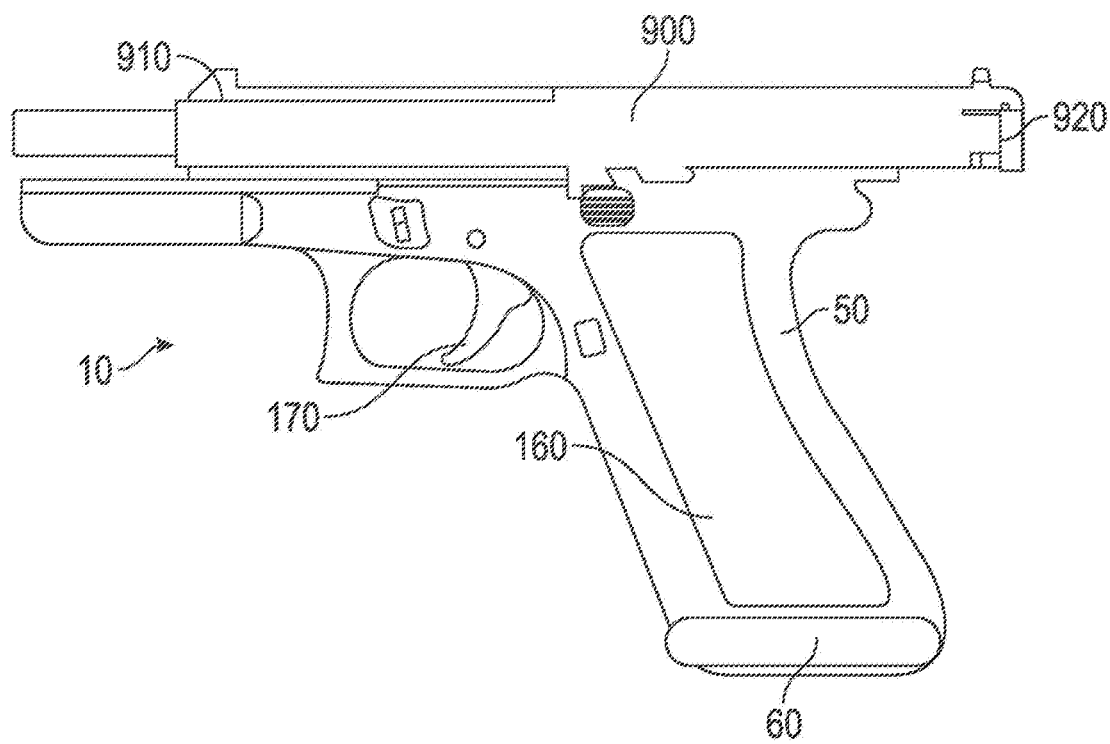
FIG. 39 is a side view of a simulated hand gun, according to an exemplary embodiment of the present disclosure.
Figure 40:
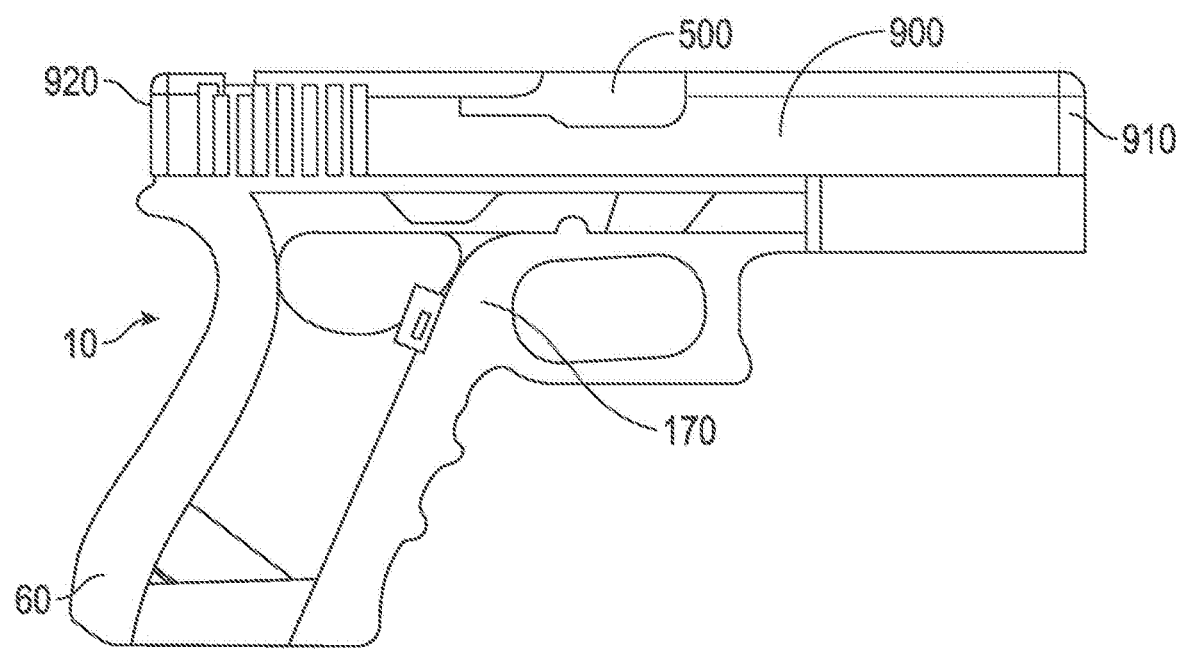
FIG. 40 is an opposite side view of the simulated hand gun shown in FIG. 39.
Figure 41:
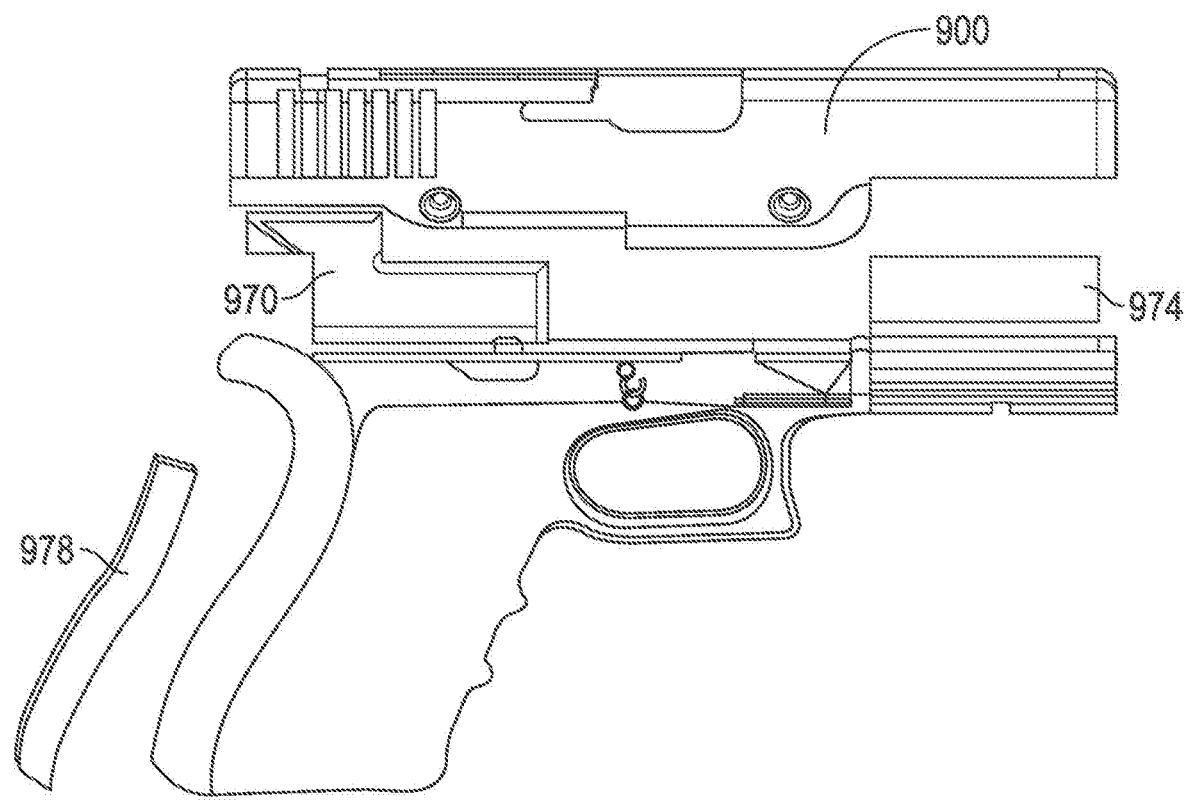
FIG. 41 is an exploded view of the simulated hand gun shown in FIG. 40.

FIG. 39 is a side view of another embodiment of a simulated firearm 10 simulating a hand gun. FIG. 40 is a side view of a simulated hand gun system 10, taken from the opposite side as shown in FIG. 39. FIG. 41 is an exploded view of the simulated hand gun system 10.

The smaller size of simulated hand guns may provide smaller spaces to incorporate the elements of the method and apparatus, including but not limited to the linear motor 500, sliding rod/mass 600, and controls. Volumetric region 978 may include controlling circuitry for the linear motor 500 and power supply 60 (taking the place of controller 50 shown in the embodiment of FIG. 1). Sec, e.g., FIG. 41. In various embodiments, volumetric areas 970 and/or 974, in addition to (or instead of) volumetric area 978 may be used to house the controlling circuitry. This configuration may allow the entire control system to be housed in simulated firearm body 20 providing a compact property for the simulator.

Control circuitry may be operatively connected to the linear motor 500, the charging slider 900, and/or the trigger 170. Control circuitry may react to user request actions such as charging (cocking) the slider 900 or pulling the trigger 170 to operate the linear motor 500 to produce recoil or some other request unique to the weapon being simulated. Control circuitry may also monitor incoming signals from the sensors on the linear motor 500 for the sliding rod/mass 600, such as current control loops or position sensing hall-effect sensors. In various embodiments, sensors may show the transient longitudinal position of the sliding rod/mass 600, and the control circuitry may operatively control the linear motor 500 to cause the sliding rod/mass 600 to dynamically follow a predefined waveform for emulating a particular recoil of a firing firearm being simulated. In various embodiments, the controller may, based on sensory data received make corrections to the dynamic movements of the sliding rod/mass 600 for the linear motor 500. In embodiments, the controller may be programmed based on parameters inputted by user 5.

Volumetric areas 970 and 974 may be used to step-up to the required voltage (DC to DC converter) from the battery 60 and also to drive the power waveforms into the linear motor 500 for motion control of the sliding rod/mass 600. By keeping the volumetric areas 970 and 974 to the top of the handgun system 10, around the linear motor 500, convection currents from the movement of the slider 900 (whether it be by charging or by movement induced by the linear motor 500 moving the sliding rod/mass 600) may be exploited to help remove waste heat from the recoil reaction and the electronics of the linear motor 500 that support that recoil reaction. In various embodiments, all of the positions for volumetric regions are unique in that appropriate driving powers are available to the linear motor 500 for recoil simulation as well as the appropriate space and heat transfer materials/methods to remove waste heat from the linear motor 500 after each trigger pull or charging of the simulated weapon by the user. Additionally, if the sliding mass 600 moves directly with the handgun slider 900 during charging or "cocking" of the simulated handgun, the energy input from charging or "cocking" by user 5 may be used to generate current via the linear motor and then routed for storage back to the super-capacitor simulated magazine described herein. Moreover, the system described herein may be likened to regenerative breaking as used in hybrid automobiles and locomotives. The device may include a coil(s) of wire and a magnet(s) running through the coil(s) to produce an electric current in the coil(s) that may be stored in any traditional electricity storage device like batteries, capacitors, etc.

Figure 62:
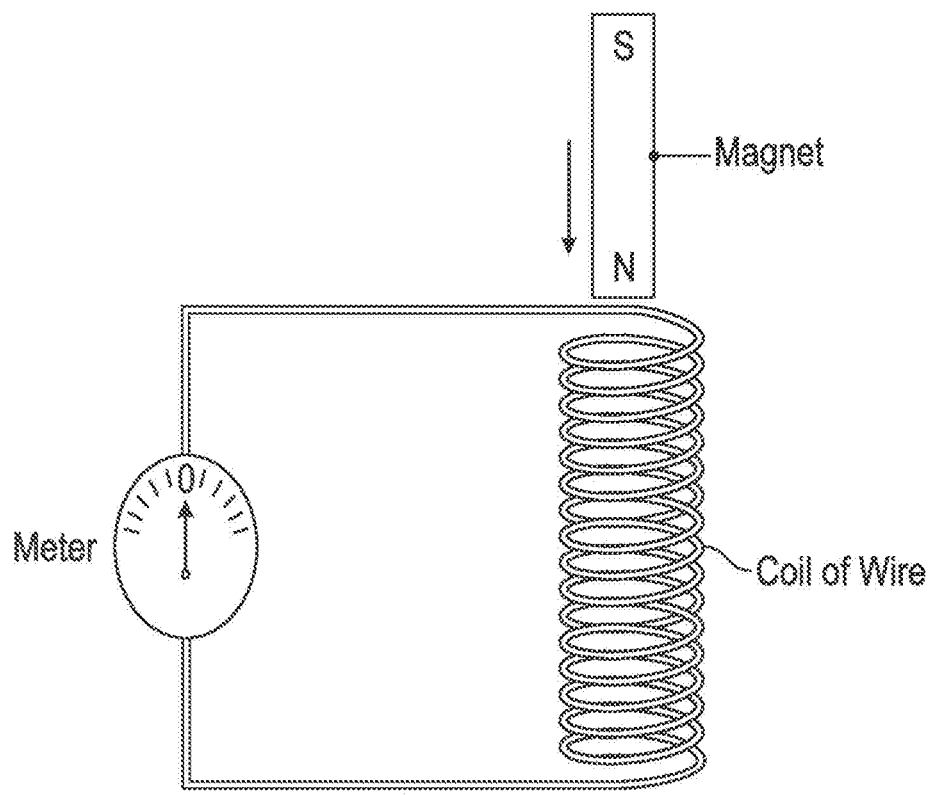
FIG. 62 is a schematic of a meter where a generated current can be measured or stored as a magnet is moved through a coil, according to an exemplary embodiment of the present disclosure.

FIG. 62 shows a meter where the capacitor or other power storage device may be coupled. For an active system, the coil would have to be coupled and decoupled from the driving electronics to properly store the energy. This may be done with traditional switches and switching components like transistors (MOSFETs). The driving electronics would by default be coupled to the coil(s) for generation of recoil and haptic effects. Then, while user 5 is not using the linear motor to produce recoil but is in the process of charging (loading) or 'cocking' the simulated firearm or peripheral, the driving electronics are decoupled from the coil(s) and coupled to the power storage device via a switch or sensor that senses action of user 5 to get ready to load the simulated device. For example, user 5 grabs the simulated firearm slider 900 and depresses a switch or a sensor coupling the linear motor coil(s) to the power storage device and then charges or loads the simulated weapon, generating electricity by moving the magnets of linear motor 500 through the linear motors coil(s). This electricity is stored in the power storage device either directly or may be run through additional electronics to modify the parameters (voltage) for proper storage into the power storage device. Then user 5 may let go of the slider 900 and the switch or sensor may recouple the linear motor coil(s) to the driving electronics.

For control loop implementation, the linear motor 500 may be controlled from the linear motor controller via proportional-integral-derivative (PID), linear-quadratic regulator (LQR), linear-quadratic-Gaussian (LQG), or any other suitable control loop method. In one embodiment, the linear motor 500 may be controlled via a PID controller and substantially has the PID implementation programmed to produce recoil/shock effects. In another embodiment, the linear motor 500 may be controlled via a LQR controller and substantially has the LQR implementation programmed to produce recoil/shock effects. In other embodiments, the linear motor 500 may be controlled via a LQG controller and substantially have the LQG implementation programmed to produce recoil/shock effects.

In embodiments, movements of linear motor 500 may be more efficient using a PID controller for the production of recoil/shock effects. In one embodiment, movements of linear motor 500 may be more efficient using a LQR controller for the production of recoil/shock effects. Movements of linear motor 500 may be more efficient using a LQG controller for the production of recoil/shock effects.

Linear motor 500 may be more efficient using a PID controller for the production of recoil/shock effects and the regenerative charging that occurs from input of user 5 as discussed above. In another embodiment, linear motor 500 may be more efficient using a LQR controller for the production of recoil/shock effects and the regenerative charging that occurs from input of user 5 as discussed above. In yet another embodiment, linear motor 500 may be more efficient using a LQG controller for the production of recoil/shock effects and the regenerative charging that occurs from input of user 5 as discussed above.

Generally, hand gun system 10 may include hand gun body 20, linear motor 500 operatively controlling sliding rod or mass 600, wherein linear motor 500 is attached to simulated firearm body 20, controller 50 operatively connected to linear motor 500, and power supply 60 powering controller 50. In this embodiment, hand gun system 10 may include a cocking slider 900 having first 910 and second 920 ends.

Figure 42:
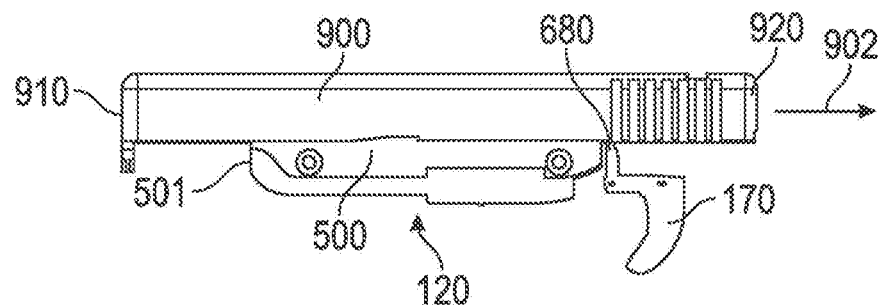
FIG. 42 is a side view of an upper receiver (with handgun slide) of a simulated hand gun, according to an exemplary embodiment of the present disclosure.
Figure 43:
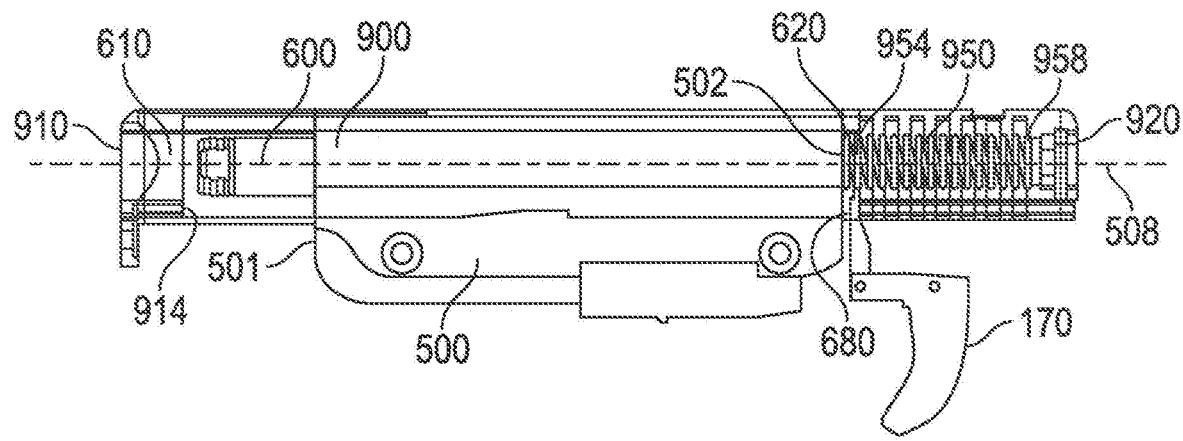
FIG. 43 is an internal side view of components of the upper receiver shown in FIG. 42 which are ready for the cocking of a slider before a simulation cycle, according to an exemplary embodiment of the present disclosure.

FIG. 42 is a side view of the upper receiver 120 of hand gun system 10. FIG. 43 shows the internal components of the upper receiver 120 ready for cocking of the slider 900 before the initiation of a simulation cycle.

Upper receiver 120 may include slider 900, linear motor 500, sliding mass 600, and spring 950. As with other embodiments, linear motor 500 operatively connects to sliding mass 600 and dynamically controls the kinematic movements of sliding mass 600 to cause a predefined kinematic output from sliding mass 600 to simulate recoil from the firing of the handgun.

Slider 900 may be slidingly connected to linear motor 500. Sliding mass 600 may be elastically connected to slider 900 via spring 950. Slider 900 may include first end 910 and second end 920. Sliding mass/rod 600 may include first end 610 and second end 620. Spring 950 may include first end 954 and second end 958.

Figure 44:
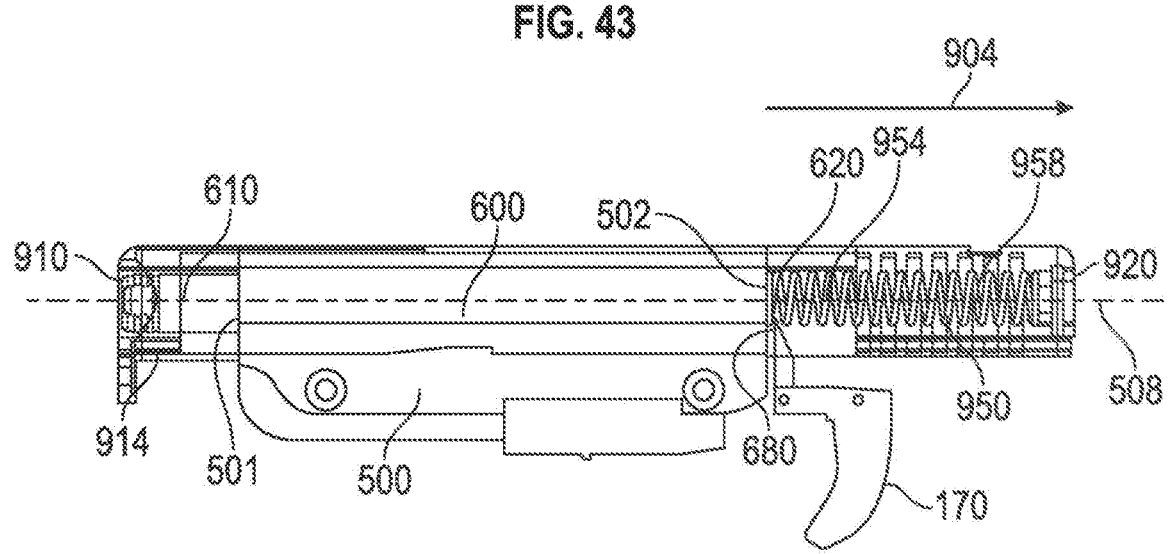
FIG. 44 is a schematic of the slider shown in FIG. 43 being pulled backwardly to cock the simulated hand gun, according to an exemplary embodiment of the present disclosure.
Figure 45:
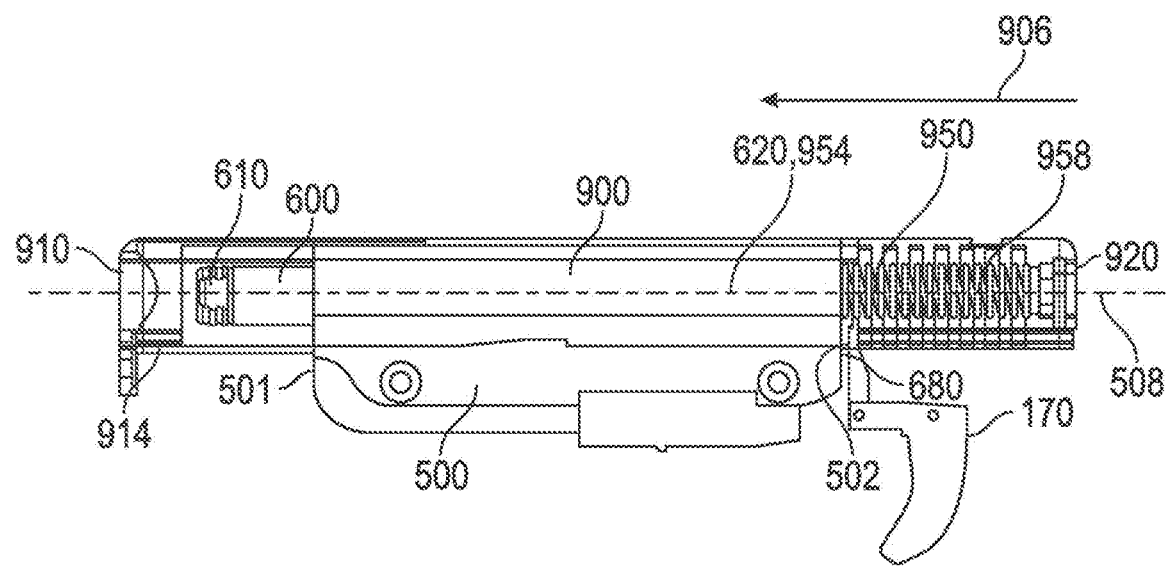
FIG. 45 is a schematic of the slider shown in FIG. 44 returning to a pre-firing simulated position for the simulated hand gun, according to an exemplary embodiment of the present disclosure.

FIG. 44 schematically shows slider 900 being pulled backwardly (in the direction of arrow 904) to cock the simulated hand gun. FIG. 45 schematically shows slider 900 returning to a pre-firing simulated position for the simulated hand gun. Before a firing cycle catch 680 resists longitudinal movement of sliding mass/rod 600 along longitudinal center line 508, by catch 680 being in contact with second end 620.

During a simulated hand gun charging operation, when a user 5 is pulling rearwardly the simulated hand gun's slider 900, the trigger pin or sear 680 resists rearward longitudinal movement of the linear motor's sliding rod/mass 600. During rearward pulling of the slider 900, the trigger pin or sear 680 blocking rearward longitudinal movement of the linear motor's sliding rod/mass 600 removes any need to power the linear motor 500 to resist the rearward movement of the linear motor's sliding rod/mass 600 during the simulated hand gun charging operation. With sliding mass/rod 600 held longitudinally in place, slider 900 may be pulled backwardly (schematically indicated by arrow 904) to simulate a cocking of a hand gun. Movement of slider 900 in the direction of arrow 904 may cause expansion of spring 950 which is attached to both second end 920 of sliding mass/rod 600 and second end 920 of slider until shoulder 914 of slider 900 comes in contact with a stop such as first end 501 of linear motor 500. User 5 may release slider 900 and expanded spring 950 will cause slider 900 to move forwardly in the direction of arrow 906.

During the simulated handgun charging operation, when the user 5 releases the slider 900 of the simulated handgun, the spring 950 may pull the slider 900 forwardly until the slider 900 reverts to the position shown in FIG. 45. During the cocking procedure catch 680 prevents sliding mass/rod 600 from moving longitudinally in the direction of arrow 904. Spring 950 connected to both the sliding mass/rod 600 of linear motor 500 and slider 900 of the simulated handgun may have a spring constant to simulate the amount of resistance that a user 5 charging/cocking a real handgun would feel when charging the handgun by pulling on the handgun's slider.

Figure 46:
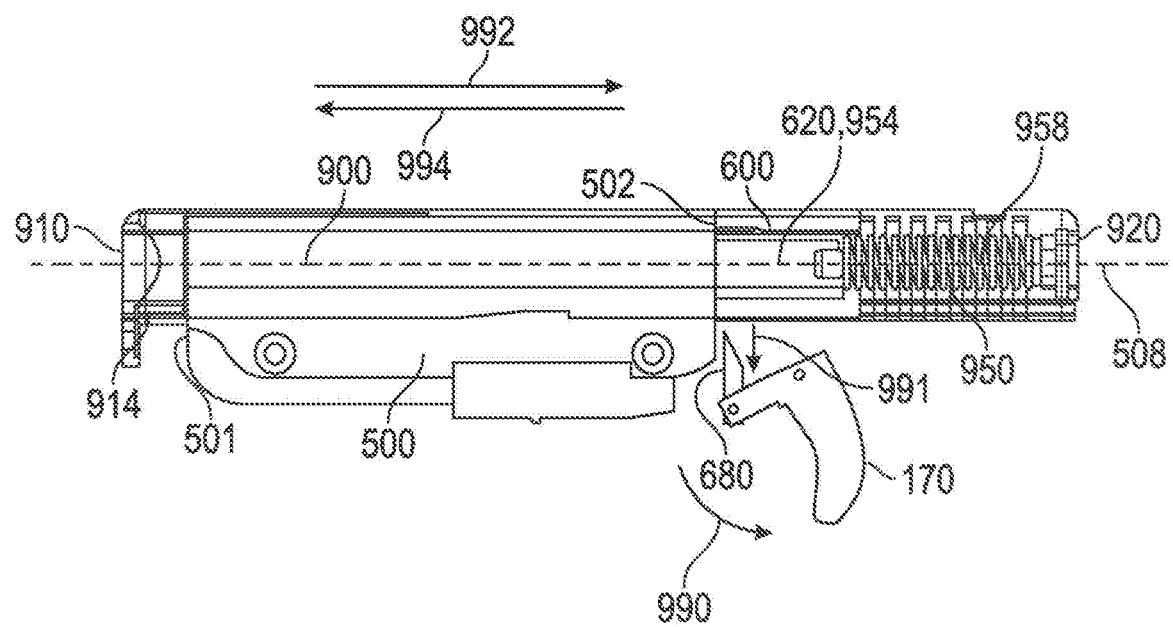
FIG. 46 is a schematic of a linear motor moving the sliding rod in a rearward direction until a shoulder of the slider shown in FIG. 45 hits the stop, according to an exemplary embodiment of the present disclosure.

Pulling the trigger 170 may cause the trigger pin or sear mechanism 680 to release the linear motor's sliding rod/mass 600, and then power the linear motor 500. Powered linear motor 500 may enter a simulation cycle wherein the linear dynamic movement of the sliding rod/mass 600 is controlled by the linear motor 500 to simulate the recoil forces that a user of an actual hand gun would feel when firing the actual hand gun. FIG. 46 schematically shows linear motor 500 moving sliding mass/rod 600 rearwardly (schematically indicated by arrow 992) to emulate recoil of a hand gun until the shoulder 914 of the slider 900 hits a mechanical stop (in this case shoulder 914 coming in contact with first end 501 of linear motor 500). The simulation cycle may begin by trigger 170 being pulled in the direction of arrow 990 which both activates controller 60 to control linear motor 500 to enter a simulation cycle, and also causes catch 680 to move in the direction of arrow 991 and release sliding mass/rod 600. Other forms of mechanical stops may be envisioned such as those described in other embodiments in this application, e.g., first end 610 coming in contact with a stopping shoulder on the simulated hand gun other than first end 501. During movement in the direction of arrow 992, second end 620 of sliding mass/rod 600 may push on first end 954 of spring 950 which is completely compressed, and second end 958 of spring 950 may push on second end 920 of slider 900. Accordingly, during the initial stroke of sliding mass 600 in the direction of arrow 992, the effective/actual mass being controllably kinematically moved by linear motor 500 is the combined mass of sliding mass/rod 600 plus spring 950 plus slider 900. As described in other embodiments, hitting mechanical stop may cause an enlarged transfer of impulsive energy to the user in simulating recoil, and also place linear motor 500 in the mode of returning sliding mass/rod 600 to a pre-firing simulated position for the simulated hand gun shown in FIG. 45. Arrow 994 schematically indicates that, after slider 900 hits the mechanical stop, linear motor 500 causes sliding mass/rod 600 to now be controllably moved in a forward direction (schematically indicated by arrow 994) until sliding mass/rod 600 reaches its pre-firing simulated position for the simulated hand gun shown in FIG. 45. During the reverse stroke (in the direction of arrow 994) second end 620 of sliding mass/rod 600 may pull on first end 954 of spring 950 which becomes somewhat extended based on its spring constant, and second end 958 of spring 950 will in turn pull on second end 920 of slider 900. Accordingly, during the return stroke of sliding mass 600 in the direction of arrow 994, the effective/actual mass being controllably kinematically moved by linear motor 500 may be the combined mass of sliding mass/rod 600 plus spring 950 plus slider 900 (assuming that the spring constant of spring 950 is relatively large compared to the mass of slider 900).

The kinematic control of linear motor 500 may be programmed to kinetmatically control (e.g., acceleration, velocity, and/or position) the mass which linear motor 500 moves to emulate various hypothetical recoil force versus time diagrams for hand guns which force versus time diagrams may be substantially different than those of rifles including substantially matching a plurality of simulation point data sets.

Figure 47:
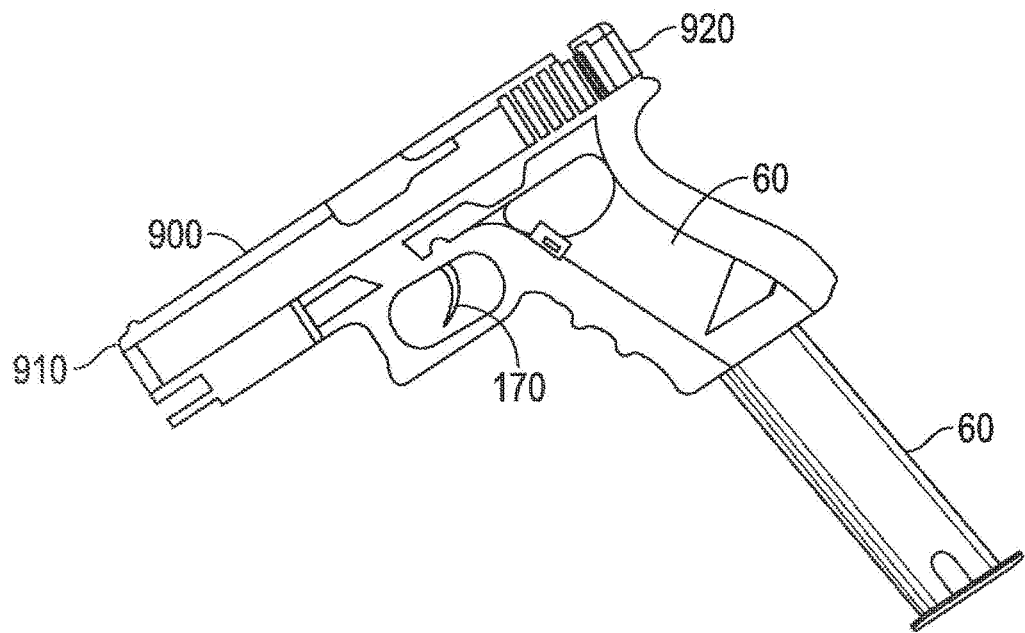
FIG. 47 is a side view of a simulated hand gun with removable power supply (battery) replicating a magazine, according to an exemplary embodiment of the present disclosure.
Figure 48:
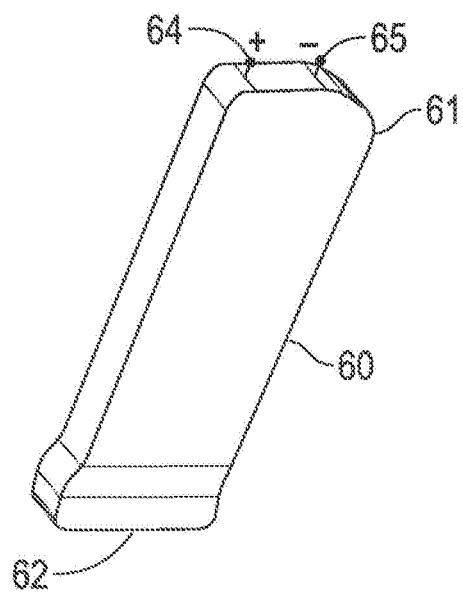
FIG. 48 is an isometric view of the power supply (battery) shown in FIG. 47 removed from the simulated hand gun, according to an exemplary embodiment of the present disclosure.

FIG. 47 shows a simulated hand gun system 10 with removable power supply 60 replicating a magazine. FIG. 48 shows a side view of the power supply 60. Power supply 60 may include first end 61 and second end 62 with electrical contacts 64, 65. In one embodiment, the simulated ammunition clip 60 with power supply may include the same look and feel (other than the power contacts) as the magazine of the gun being simulated. Contacts 64, 65 may be any conventionally available contacts and may be spring loaded to ensure a repeatable and secure connection to the electronics housed inside the weapon simulator body.

In one embodiment, the linear motor 500 may be powered down between recoil simulation cycles, but maintain the sliding mass/rod 600 home simulation position before the start of each simulation cycle. Powering down the linear motor 500 reduces overall power consumption because between simulation cycles the linear motor 500 does not drain power to maintain the sliding rod/mass 600 home or pre-simulation position. Powering off linear motor 500 between simulation cycles may also facilitate charging of the power supply 60 to the method and apparatus.

Methods of Wireless Power

Due to the space constraints associated with smaller simulation devices, e.g., gaming controllers, shock sticks, handgun based simulators, etc., embodiments of the present disclosure may include alternatives to traditional batteries such as lithium-ion chemistries. These alternatives may apply to the whole range of simulators considered herein, whether for use in weapons training programs or for use in gaming peripherals. Power devices/power availability is important in both consumer and military applications of the present disclosure. Embodiments of the present disclosure may include power sources that drive the linear motor systems and/or controllers described herein. One embodiment may include super-capacitors (ultra-capacitors) as a battery pack method for simulators.

Figure 63:
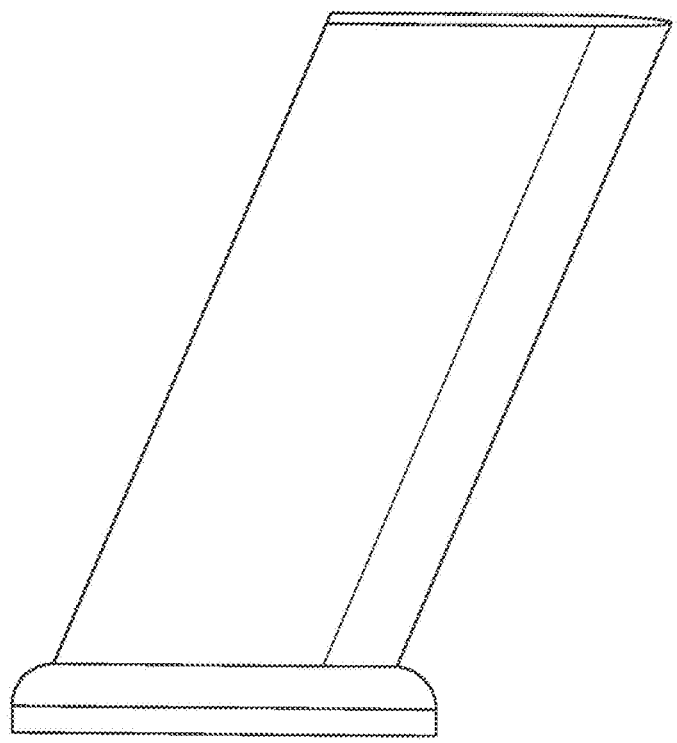
FIG. 63 is an isometric view of a shortened simulated handgun magazine, according to an exemplary embodiment of the present disclosure.

FIG. 63 shows a shortened simulated handgun magazine as described herein regarding FIGS. 47 and 48. Not shown are the electrodes used to connect the emulated handgun magazine to the simulated weapon for power, but may generally be located in the same place as in FIG. 48 or located on the sides of the magazine. The magazine may house a number of super-capacitors electrically connected in series or parallel or in multiple configurations of series and parallel to produce a viable voltage and current source to power the linear motor system. The simulated handgun magazine above may take the form of other sizes and shapes to mate with different weapon simulator types for the proper simulation of those clips or magazines, and those too may contain a number of super-capacitors in configurations described herein.

Figure 64:
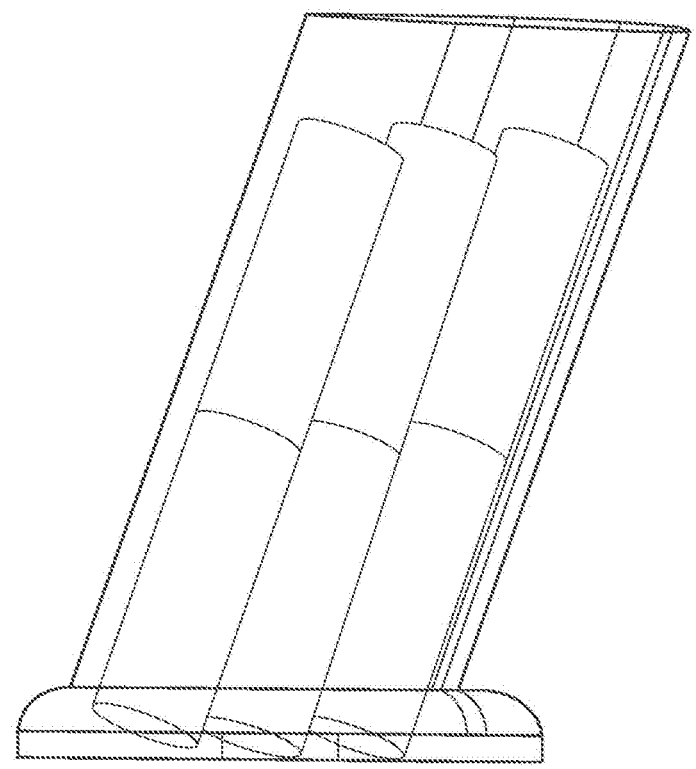
FIG. 64 is an isometric internal view of the simulated handgun magazine shown in FIG. 63 with super-capacitors visible.

FIG. 64 shows the same simulated handgun magazine as FIG. 63 with the outer housing made transparent and the super-capacitors made visible. Balancing circuitry and wires have been omitted for brevity, but should be considered included in the available space shown. These circuits regulate charging of the capacitors when attached to a charging terminal and balance voltage between capacitors for proper operation. Using super-capacitors in this application is important because it is used in concert with several other factors. The controller system for linear motor 500 may turn the motor OFF after each recoil cycle as described herein allowing for drastic power reduction while only powering minimal wireless and logic components. Furthermore, through the reduction of power, the shot count available in each simulated magazine may be considered. In the magazine above, enough power is available for 30 recoil cycles and to run the wireless and logic components for 10 or more hours. Considering this, charge time is a major factor. However, charge time for capacitor based technology is orders of magnitudes faster than that of typical lithium-ion battery technology. This has to do with the nature of capacitors. Thus, for a typical simulated magazine using super-capacitors, charging times of seconds may be realized versus many minutes or hours avoided charging batteries and an accurate simulation of the entire system that is tetherless be obtained.

Figure 65:
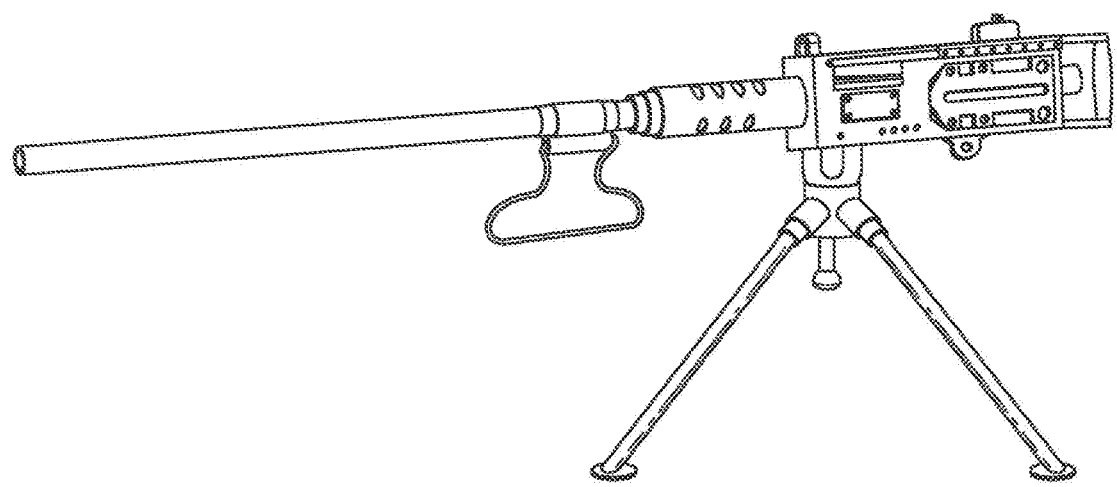
FIG. 65 is an isometric view of a charging/loading mechanism for a heavy weapon platform, according to an exemplary embodiment of the present disclosure.
Figure 66:
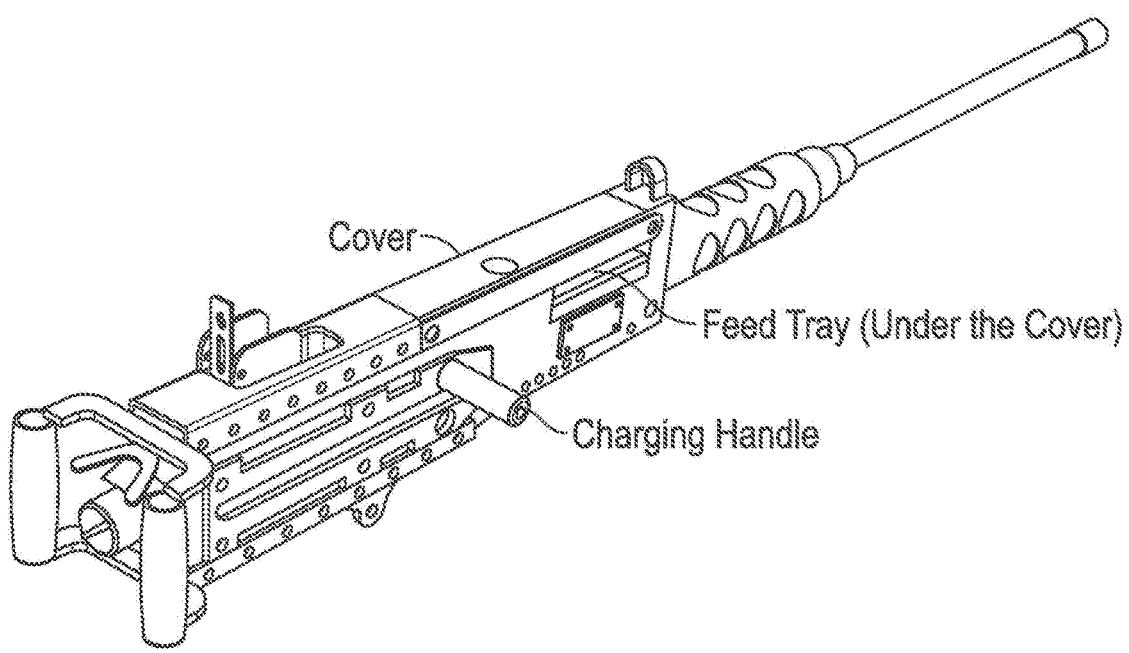
FIG. 66 is an isometric view of a charging/loading mechanism for a heavy weapon platform, according to an exemplary embodiment of the present disclosure.
Figure 67:
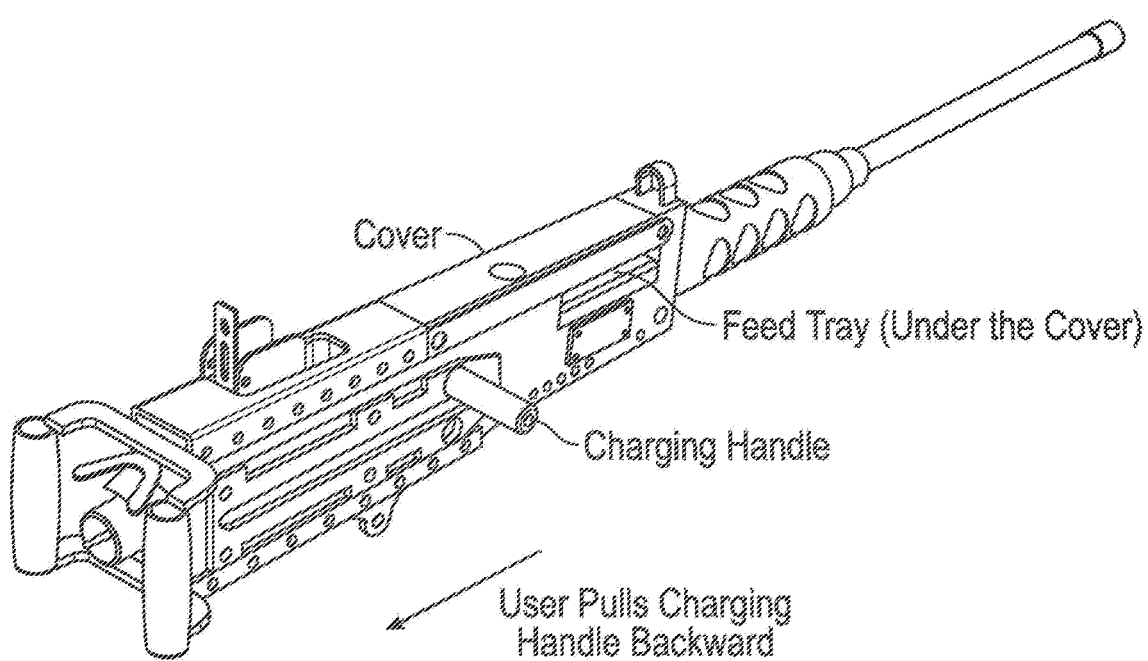
FIG. 67 is an isometric view of a charging/loading mechanism for a heavy weapon platform showing a direction the user would pull on the charging handle for loading, according to an exemplary embodiment of the present disclosure.
Figure 68:
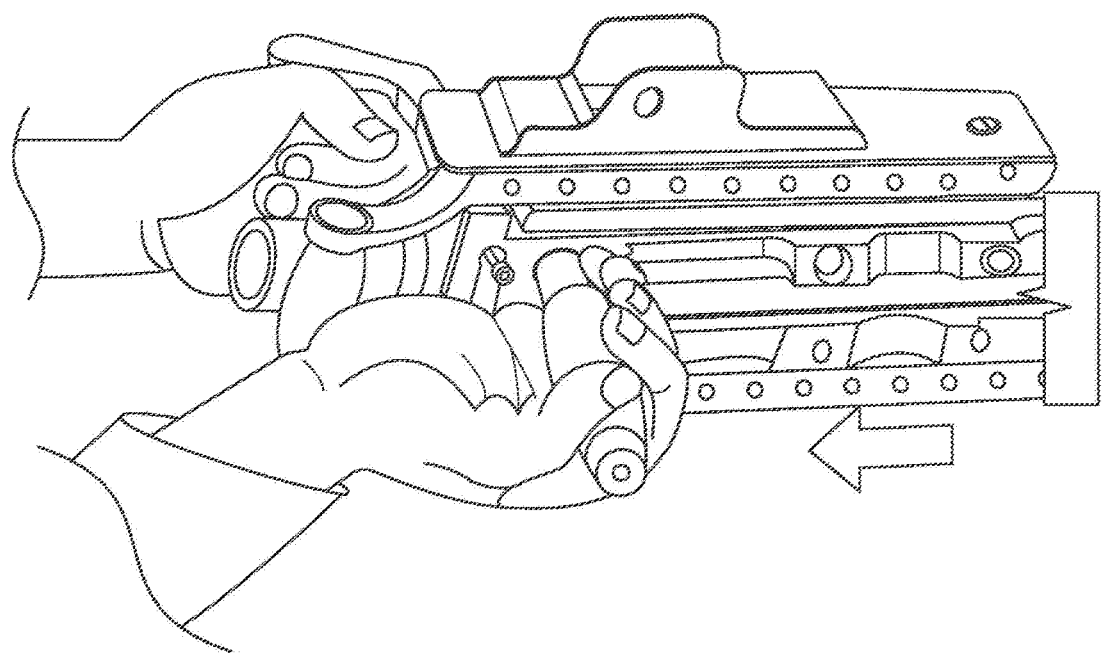
FIG. 68 is an isometric view of a user pulling a charging handle via a charging/loading mechanism for a heavy weapon platform, according to an exemplary embodiment of the present disclosure.

FIG. 65 is an isometric view of a charging/loading mechanism for a weapon platform. Embodiments of the present disclosure provide methods for emulating the charging/loading mechanism for weapon platforms. According to embodiments of the present disclosure, linear motors employed in weapon simulation may typically apply forces from 67N to 700N. To emulate the charging spring, a charging handle may be mechanically connected to the linear motor slider and disconnected from the linear motor slider after use. During the use of the charging handle, a switch or sensor tells the linear motor controller to reduce power to the linear motor reducing its maximum force constant or the maximum force that may be applied to resist changes in slider movement. See FIG. 66. As shown, the motor is maintaining position along linear path (not firing). User 5 may grab charging handle, signaling for motor controller to reduce power to motor (signaled via button or sensor). User 5 may pull the handle, and motor may resist change in position with force F, but may not be able to due to the decrease in available power from linear motor controller (i.e. motor's position lags). See FIGS. 67 and 68. The motor's reduced power may emulate the spring in normal cocking mechanism and user 5 may complete the charging cycle by releasing handle. The motor may return to its initial position under reduced power (still emulating the spring). Once the initial linear starting position is reached and user is no longer activating charging handle buttons/sensors, the motor may return to full power and may be ready to emulate recoil.

As shown in FIG. 61, the linear motor is treated as a simple spring. $F_{restore}$ is the force imparted on the user by the spring trying to return to its original location (x), which may be described by Hook's Law (F=−kx). The change in x or ($\Delta$x) determines the spring's force pulling back on the user, typically as the distance x increases so does Frestore until material deformation is reached.

This emulation of the charging spring by the linear motor may follow the traditional spring used in the heavy weapon simulator being emulated by varying its resistance force over the linear position of the motor's slider with a single spring constant k. Or the motor may emulate multiple spring constants $k_1 \ldots _2 \ldots _3 \ldots$ to emulate other mechanical resistances encountered in a typical heavy weapon platform's linear movement associated with the charging handle. For instance, as the motor's slider is moved to position $\Delta$x it may apply a spring constant $k_1$ to the user by altering the force available to the motor to resist changes in slider position. Then as the motor is moved to position 2($\Delta$x), it may apply a spring constant $k_2$ to the user varying $F_{restore}$ over the linear position. Thus, the traditional heavy weapon spring may be emulated over the linear position with other mechanical forces figured in as well.

The values for the spring constants $k_1 \ldots k_2 \ldots k_3 \ldots$ may be found by testing the traditional spring's force constraints with a force measurement tool per the $\Delta$x or by the spring manufacturer's specification sheet.

Embodiments of the present disclosure described herein may be applied to charging handles/charging mechanisms on handguns, rifles, shotguns, etc. as well as the heavy weapon example described herein.

Figure 82:
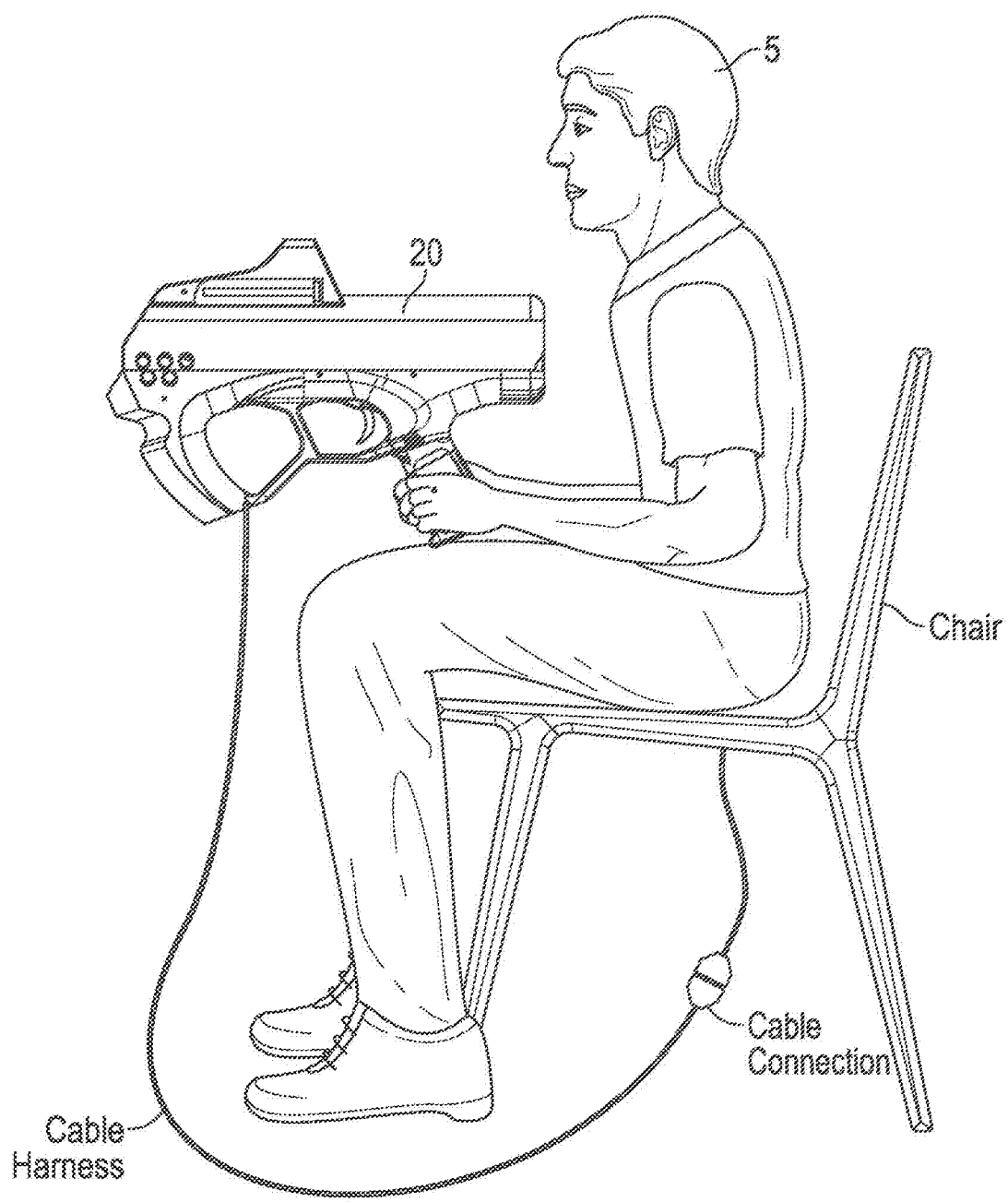
FIG. 82 is a side view of a user holding a virtual reality gaming peripheral that includes a shock stick and that is connected to a chair via a removable cable harness, according to an exemplary embodiment of the present disclosure.

FIG. 51 schematically illustrates one embodiment of the method and apparatus of system 10. System 10 may be a part of or include a "game." Game may utilize the Unity development environment/platform or Unreal Engine® development environment/platform or a similar development environment. The Unity development platform is a flexible and powerful development engine for creating multiplatform 3D and 2D games and interactive experiences. The Unity development platform, and other platforms such as the Unreal Engine platform, are used in a wide array of industries for the creation of immersive simulation and gaming environments. In exemplary embodiments, a Unity plugin/game, Dynamic Link Library (DLL), and/or other plugin/game may interface with linear motor 500 via controller 50 though serial, CAN bus, and/or other communications bus/protocols between the "Game" and Linear Motor 500 blocks depicted in FIG. 51. This allows for the "Game" portion of the diagram to interpret signals from user 5 as described herein and then feed those signals into the plugin so linear motor 500 may be arbitrarily moved in a manner specified by gaming/simulation conditions. An example of this interaction between the gaming environment and user 5 may be illustrated with reference to FIG. 82. As shown, user 5 is seated via a chair gaming/simulation peripheral, and user 5 is also holding a VR peripheral with attached shock stick. A communications interface may be established between the VR peripheral (including the linear motor 500) and the simulation/gaming environment or "Game" block in FIG. 51. Since the VR peripheral may be able to report its position in free space via positional trackers as described herein, the "Game" portion of FIG. 51 may be able to capture the VR peripheral's location in free space. While user 5 is holding the VR peripheral as shown in FIG. 82, the "Game" portion of FIG. 51 may interpret this configuration as the VR peripheral being setup as a typical handgun or rifle. Thus, the "Game" portion of FIG. 51 may direct linear motor 500 via the plugin to emulate a typical firing sequence when the trigger is depressed. If user 5 then holds the VR peripheral body perpendicular to the position shown in FIG. 82, the "Game" portion of FIG. 51 may interpret the change in position to mean that the VR peripheral should be considered a chainsaw. Thus, the "Game" portion of FIG. 51 may direct linear motor 500 via the plugin to emulate a typical chainsaw effect where linear motor 500 moves slider 600 in a constant back and forth motion and then increases the frequency of this motion when the trigger is depressed on the VR peripheral.

In one embodiment, a plugin may be used to control linear motor 500 from a game or simulation environment.

In an embodiment, the plugin may have a graphical user interface to simplify development of specific motor movements.

In embodiments, the graphical user interface may show the movement vs time, acceleration vs time, velocity vs time, and/or hybrid graphs for linear motor 500.

In further embodiments, the graphical user interface may show the graphs described herein, and may allow the developer to manipulate those graphs arbitrarily for programing arbitrary movements for linear motor 500.

In another embodiment, the plugin may have a drop down menu so typical linear motor effects may be easily assigned to different events.

In additional embodiments, the plugin may be called by a larger program (game/simulation) to facilitate faster development times without needing to recreate substantially all the functionality and communications protocols from the plugin and integrating into each larger program.

In an embodiment, the plugin may communicate through a wireless interface to the "Game" and "Linear Motor" portions of FIG. 51 as described herein.

In one embodiment, the plugin may receive temperature and power usage data from linear motor 500.

In another embodiment, the plugin may use the temperature and power usage data, as described herein, to calculate the maximum movements for the motor 500 to keep it from failing (slider 600 jogging out of distance, using too much power, etc.)

Wand Embodiment

Figure 49:
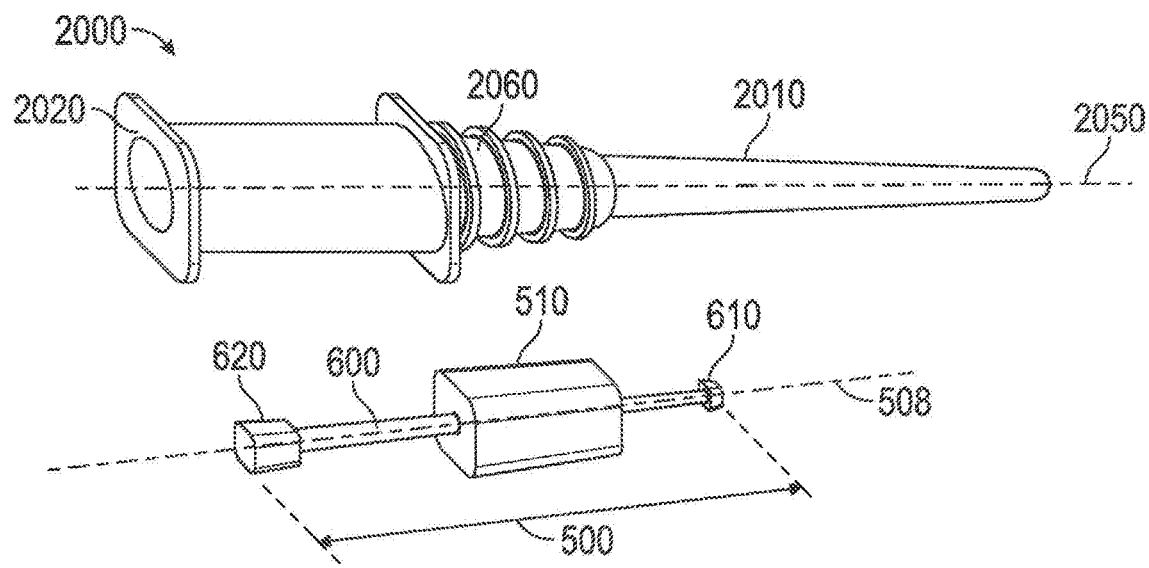
FIG. 49 is an isometric view of a simulated magical wand with a linear motor removed, according to an exemplary embodiment of the present disclosure.
Figure 50:
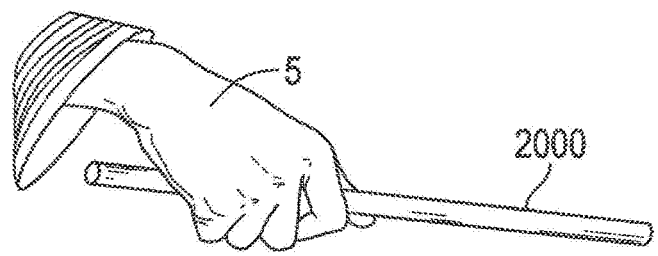
FIG. 50 is a side view of a user holding the gaming wand shown in FIG. 49.

FIGS. 49 through 51 illustrate one embodiment for incorporating linear motor 500 into a wand 2000 gaming piece. FIG. 49 shows one embodiment of a simulated magical wand 2000 with a linear motor 500 removed. FIG. 50 shows a user 5 with a gaming wand 2000.

Wand 2000 may include first end 2010, second end 2020 and have longitudinal center line 2050 with a center of gravity 2060. Linear motor 500 with longitudinal centerline 508 may include sliding mass/rod 600 and be incorporated into the interior of wand 2000. The incorporation of linear motor 500 into wand 2000 may be such that centerline 508 is coincident with centerline 2050 causing sliding movement of sliding mass/rod 600 to be along center line 2050. In other embodiments, centerline 508 may be spaced apart an arbitrary angle from centerline 2050 in either a parallel or non-parallel condition. When spaced apart and parallel, sliding movement of sliding mass/rod 600 may be parallel but not along center line 2050. When spaced apart and non-parallel, sliding movement of sliding mass/rod 600 may be both not parallel and not along center line 2050.

In various embodiments, during game play the center of gravity 2060 may be repositioned at least 25 percent of the overall length of wand 2000. In embodiments, the center of gravity 2060 may be repositioned at least 30, 35, 40, 45, 50, 55, 60, 65, 70, 75, 80, 85, and 90 percent of the overall length of wand 2000. In various embodiments, the center of gravity 2060 may be repositioned along a range of between any two of the above referenced percentages of the overall length of wand 2000.

In one embodiment, linear motor 500 and sliding mass/rod 600 may provide an increased level of gaming immersion especially for gaming users, such as in virtual reality gaming immersion. For example, in-game play may be used to analyze predefined linear motor 500 effects to be imposed on the user created by controlled movement of the sliding mass/rod 600.

In one embodiment, these effects may be a form of communication to the user in connection with whether or not a gaming goal is getting close to successful completion (such as whether he or she is casting a spell correctly or incorrectly). For example, a user during game play may attempt to move wand 2000 to correctly cast a gaming spell. This gaming spell may require that the wand be moved through a predefined set of transient/time dependent motions. In one embodiment, as the user successfully performs a first set of the predefined transient motions, linear motor 500 may cause sliding mass/rod 600 to move through a first set of motions causing a first set of haptic sensations to be sent to the user (such as a vibration or general movement to indicate to the user that the spell is being performed correctly). In embodiments, as the user successfully performs a second set of the predefined transient motions, linear motor 500 may cause sliding mass/rod 600 to move through a second set of motions causing a second set of haptic sensations to be sent to the user (such as increased strength of vibrations or increased general movement to indicate to the user that the spell is continued to be performed correctly). From here, the completion of the spell gives a third set of haptic sensations such as a large shock or vibration.

In an embodiment, if the user fails to perform the first set of predefined transient motions, linear motor 500 may cause sliding mass/rod 600 to move through a modified first set of motions causing a modified first set of haptic sensations to be sent to the user (such as weakened vibrations/stopping altogether or weakened general movement to indicate to the user that the spell is being performed incorrectly, or stopping altogether to indicate to the user that the spell was incorrectly cast).

In embodiments, the methods and apparatuses described herein may include the following steps to produce haptic effects for the user during game play:
1) The user begins to cast their spell by moving the wand 2000 where the accelerometer(s) and gyroscope(s) are inserted.
2) The accelerometer(s) and gyroscope(s) pass their collected information about wand 2000's movement to the game 10.
3) The game 10 interprets how the linear motor 500 should respond from preprogrammed data and then engages the linear motor 500 to move.
4) The user is experiencing the vibration(s), shock(s), and changes in center of gravity 2060 that the linear motor 500 induces in the wand 2000 body or facade.

Tennis Racket

Figure 53:
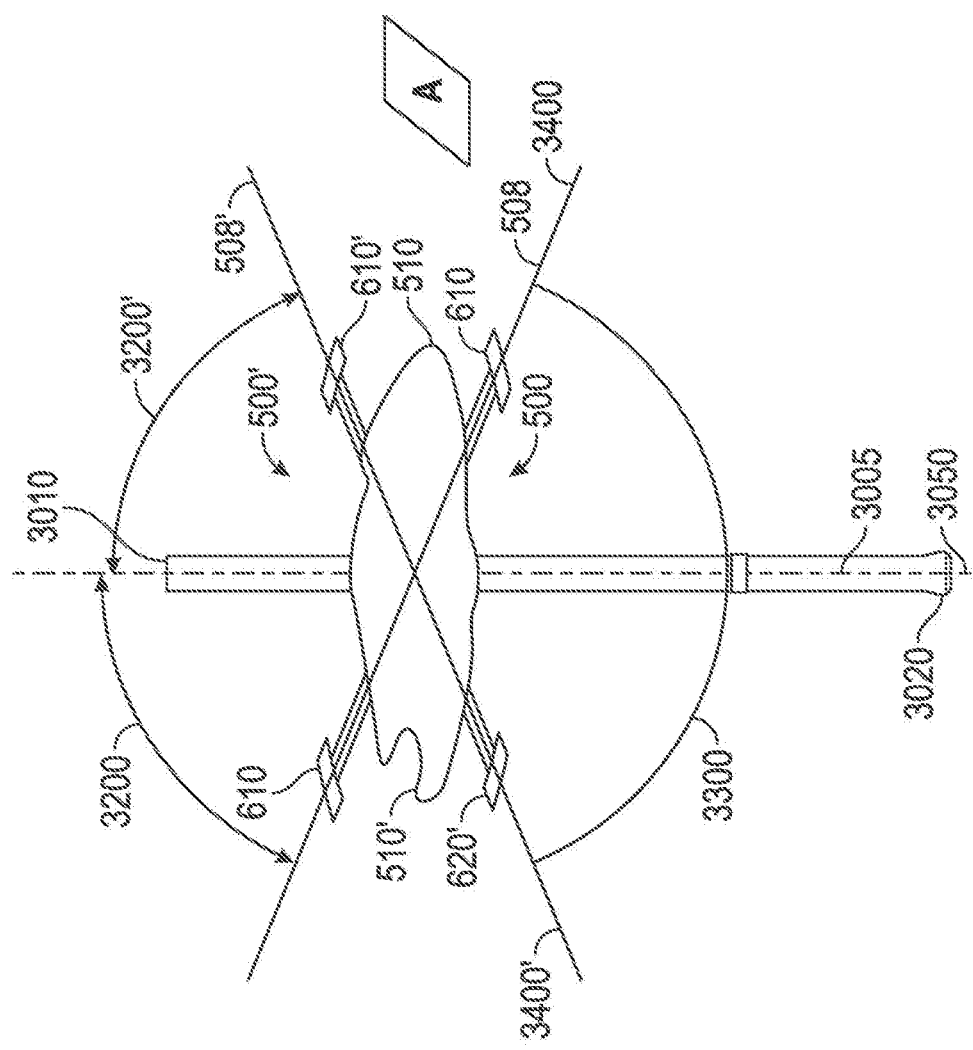
FIG. 53 is an internal plan view of the simulated tennis racket shown in FIG. 52 with a racket portion removed.
Figure 52:
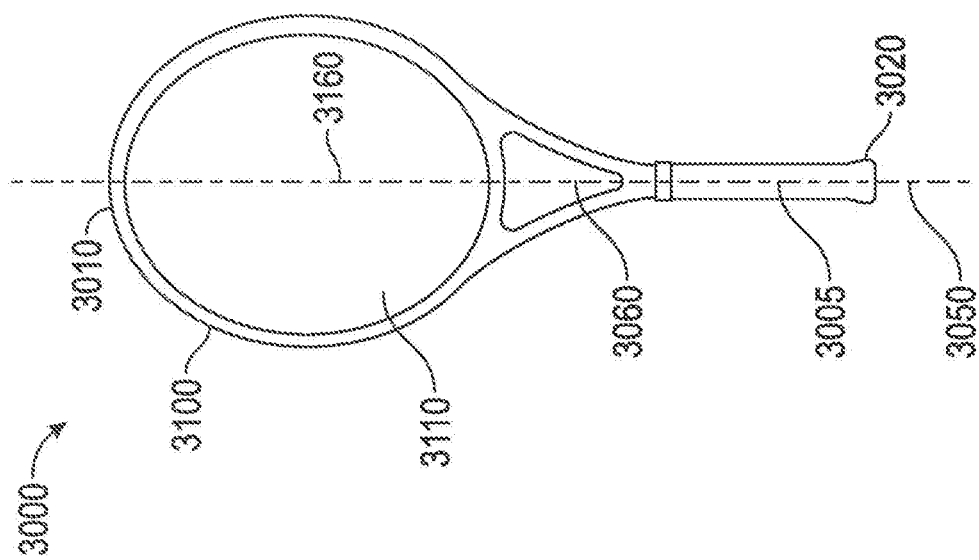
FIG. 52 is a front view of a simulated tennis racket with a plurality of linear motors, according to an exemplary embodiment of the present disclosure.
Figure 54:
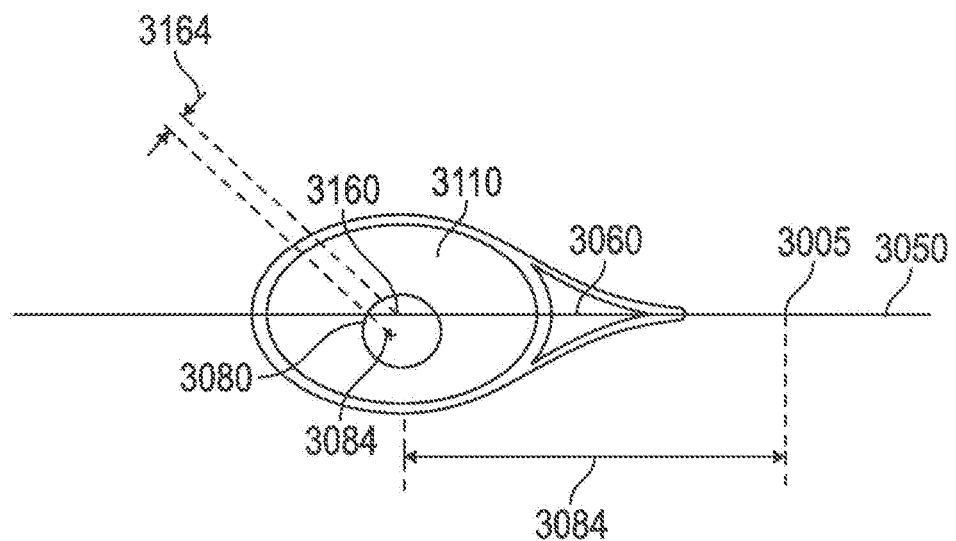
FIG. 54 is a side view of a simulated tennis racket, according to an exemplary embodiment of the present disclosure.

FIG. 52 shows one embodiment of a simulated tennis racket 3000 with a plurality of linear motors 500 and 500'. FIG. 53 shows the simulated tennis racket 3000 with a plurality of linear motors 500 and 500' with the racket portion removed. FIG. 54 schematically illustrates a tennis ball hitting a tennis racket.

Racket 3000 may include hand grip 3005, first end 3010, second end 3020, and have longitudinal center line 3050 with a home center of gravity 3060.

Linear motor 500 with longitudinal centerline 508 may include sliding mass/rod 600 and be incorporated into the interior of racket 3000. Linear motor 500' with longitudinal centerline 508' may include sliding mass/rod 600' and be incorporated into the interior of racket 3000. The incorporation of linear motors 500 and 500' into racket 3000 may be such that centerlines 508 and 508' may be coincident with centerline 3050 causing sliding movement of sliding masses/rods 600 and 600' to be along center line 3050. In other embodiments, centerlines 508 and/or 508' may be spaced apart an arbitrary angle from centerline 3050 in either a parallel or non-parallel condition. When spaced apart and parallel, sliding movement of sliding masses/rods 600 and 600' may be parallel but not along center line 3050. When spaced apart and non-parallel, sliding movement of sliding masses/rods 600 and 600' may be both not parallel and not along center line 3050.

The movement of the sliding masses/rods 600 and 600' allows for the movement of the center of gravity 3060 of racket 3000 relative to hand grip location 3005 to a new location 3060'. Moving the center of gravity 3060 relative to hand grip location 3005 allows for the racket to simulate different rackets for the user. In various embodiments, the center of gravity 3060 may be located on the longitudinal axis 3050. In other embodiments, the center of gravity 3060 may be located off of the longitudinal axis. In embodiments, the center of gravity 3060 may be relocated during game play. During game play, the center of gravity 3060 may be repositioned at least 25 percent of the overall length of tennis racket 3000. In embodiments, the center of gravity 3060 may be repositioned at least 30, 35, 40, 45, 50, 55, 60, 65, 70, 75, 80, 85, and 90 percent of the overall length of tennis racket 3000. The center of gravity 3060 may be repositioned along a range of between any two of the above referenced percentages of the overall length of tennis racket 3000.

Having a plurality of linear motors (e.g., 500 and 500') in spaced apart and/or non-parallel/skewed locations relative to the simulation article may allow for an increased number of simulation events and types. For example, in a skewed and spaced apart condition in the housing of the simulation article controlled kinematic movement of the plurality of sliding masses/rods 600 and 600' respectively by linear motors 500 and 500' may simulation force, angular, impulse, vibrational, rotational, torque, along with other types of dynamic movement.

In FIG. 53, centerline 508 makes an angle 3200 with centerline 3050, centerline 508' makes an angle 3200' with centerline 3050, and centerline 508 makes an angle 3300 with centerline 508'. The different sliding angles and/or different sliding positions of sliding masses 600 and 600' along with independent kinematic control of sliding masses 600 and 600' allow for controlled emulation of many different possible kinematic activities from the real world.

For vector type systems (i.e., non-scalar), it is assumed that Cartesian coordinates are used (although a polar coordinate system may also be used).

FIG. 54 describes an embodiment that may be used to emulate a real world sports game where a tennis ball is impacted by a tennis racket. The illustration assumes that the hand grip location 3005 is the origin of the coordinate system. At the point of impact 3080 (having Cartesian coordinates $D_x$ 3081, $D_y$ 3082, and $D_z$ 3083) between the tennis racket 3000 and tennis ball, the tennis ball may have a velocity vector (having Cartesian velocity components $V_x$, $V_y$, and $V_z$) relative to the tennis racket 3000. The relative velocity vector may take into account the calculated velocity vectors of both the tennis ball and the tennis racket 3000. In one embodiment, the velocity of tennis racket 3000 may be assumed to be zero. In other embodiments, the velocity of the racket 3000 may be calculated based on gaming sensors in the racket 3000 game piece.

The relative forces (torque, force, and impulse) on the hand grip 3005 due to a hypothetical impact between the tennis ball (having a velocity vector and $mass_b$) with a point of impact 3080 on tennis racket 3000 having an overall $mass_{fr}$ and center of gravity (at location 3060) may be calculated using standard Newtonian laws of motion, force, and energy. One or more of these calculated relative forces (torque, force, and impulse) from this first impact on hand grip location 3005 (e.g., what the user should feel) may be emulated by linear motors 500 and 500' controlling and/or independently moving sliding masses/rods 600 and 600'.

In various embodiments, the hypothetical webbing 3110 may also be modeled and used in the calculation of the relative forces (torque, force, and impulse) on the hand grip 3005 due to a hypothetical impact between the tennis ball 3005 with tennis racket 3000. In this case, the elasticity of the webbing 3110 may be set forth along with the tightness of the stringing, size of the web, and the relative location of the point of impact 3080 on the webbing to the center 3160 of the webbing.

In various embodiments, emulated relative torque at hand grip point 3005 may be created by linear motors 500 and 500' controlling and/or independently moving sliding masses/rods 600 and 600'. In embodiments, emulated relative force at hand grip point 3005 may be emulated by linear motors 500 and 500' controlling and/or independently moving sliding masses/rods 600 and 600'. In other embodiments, emulated relative impulse at hand grip point 3005 may be emulated by linear motors 500 and 500' controlling and/or independently moving sliding masses/rods 600 and 600'.

Similarly, the relative forces (torque, force, and impulse) on the hand grip 3005 due to a second hypothetical impact between the tennis ball (having a second velocity vector) and the tennis racket 3000 with a second point of impact 3080' may be calculated using standard laws of motion and forces. One or more of these calculated relative forces (torque, force, and impulse) from this second impact on hand grip location 3005 (e.g., what the user should feel) may be emulated by linear motors 500 and 500' controlling and/or independently moving sliding masses/rods 600 and 600'.

Similarly, the relative forces (torque, force, and impulse) on the hand grip 3005 due to a third hypothetical impact between the tennis ball (having a third velocity vector different from the first and second velocity vectors) and the tennis racket 3000 with a third point of impact 3080" (which happens to be the same location at first impact 3080) may be calculated using standard laws of motion and forces. One or more of these calculated relative forces (torque, force, and impulse) from this third impact on hand grip location 3005 (e.g., what the user should feel) may be emulated by linear motors 500 and 500' controlling and/or independently moving sliding masses/rods 600 and 600'.

In various embodiments, the relative forces (torque, force, and impulse) on the hand grip 3005 caused by the impact between tennis ball and racket 3000 may be emulated by linear motors 500 and/or 500'.

In embodiments, the method and apparatus actually calculate a post impact velocity vector for tennis ball after leaving tennis racket 3000.

Various options using the one or more linear motors 500, 500', 500", etc. are set forth below:

(1) In one embodiment, a plurality of linear motors 500, 500', 500" may be provided that independently control a plurality of different controllable weight units 600, 600', 600".

(2) In an embodiment, a housing facade unit may be provided having a plurality of different spaced apart positional locations in the housing facade unit for receiving and holding one or more linear motors linear motors 500, 500', 500" and controllable weight units 600, 600', 600". In various embodiments, the positional locations may be selectable by a user.

(3) In another embodiment, a housing facade unit may be provided having a plurality of different angular orientations for receiving and holding one or more linear motors 500, 500', 500" and controllable weight units 600, 600', 600". In various embodiments, the angular orientations may be selectable by a user.

(4) In one embodiment, a plurality of different housing facade units may be provided with different positions and/or angular orientations for receiving and holding one or more linear motors 500, 500', 50" and controllable weight units 600, 600', 600". In various embodiments the positional locations and/or angular orientations may be selectable by a user.

(5) In an embodiment, a selectable set of linear motors 500, 500', 500" and controllable weight units 600, 600', 600" may be provided, each having adjustable configurations including spacing and/or orientation of the different controllable weights 600, 600', 600" in a housing.

(6) In various embodiments, one or more of the linear motors 500, 500', 500" and controllable weight units 600, 600', 600" may include a plurality of different weight inserts.

(7) In embodiments, one or more of the linear motors 500, 500', 500" and controllable weight units 600, 600', 600" may include a plurality of different and selectable mechanical stopping positions for the controllable weights.

(8) In various embodiments, the methods and apparatuses described herein may simulate operations of one or more selectable gaming devices such as tennis racket, baseball bat, magic wand, hockey stick, cricket bat, badminton, pool stick, boxing glove(s), sword, light saber, bow and arrow, golf club, and fishing pole.

(9) In embodiments, the methods and apparatuses described herein may haptically simulate one or more secondary type actions of system being emulated, for example, halo plasma gun, broken bat, bat vibrations after hitting baseball or charging/loading, etc.

In various embodiments, the linear motor system, including the firearm simulation systems described herein, may be used in virtual reality gaming peripherals.

Figure 69:
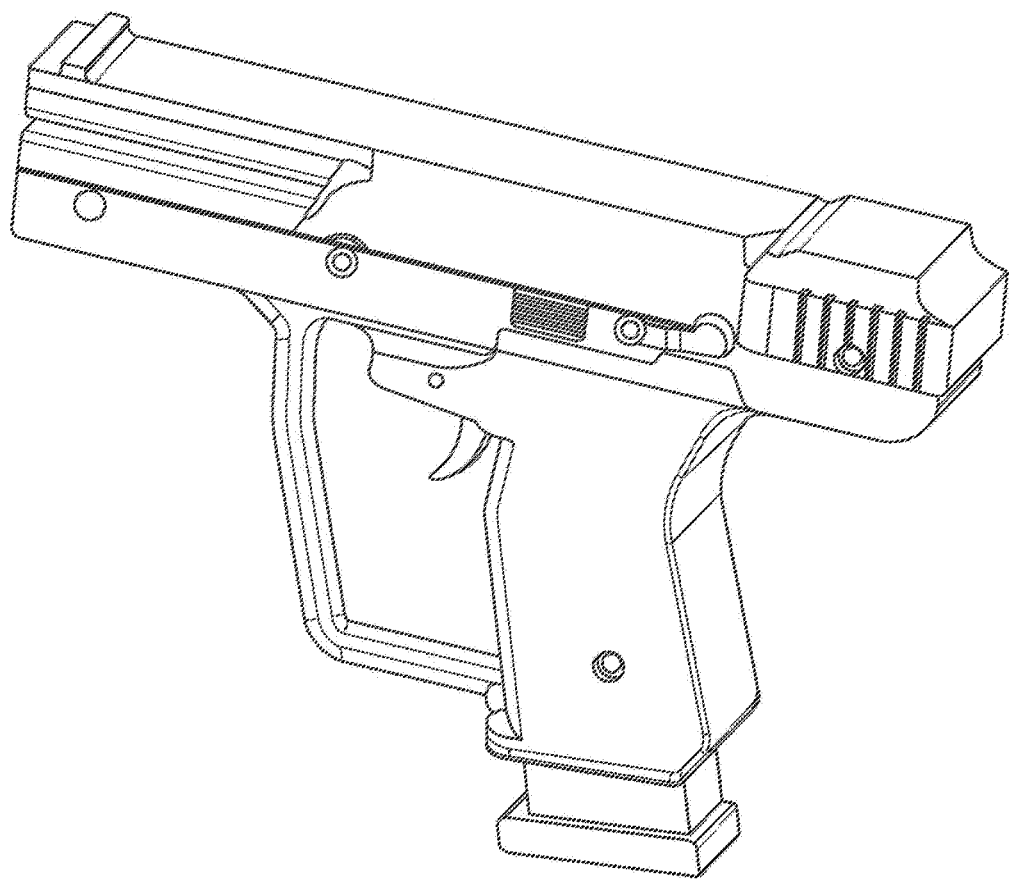
FIG. 69 is an isometric view of a peripheral embodiment including a linear motor, according to an exemplary embodiment of the present disclosure.

For instance, FIG. 69 shows a simulated firearm embodiment that includes linear motor 500. The embodiment is tracked into virtual reality games via optical tracking, and/or with other tracking systems, with set markers on the body of the simulated firearm.

Figure 70:
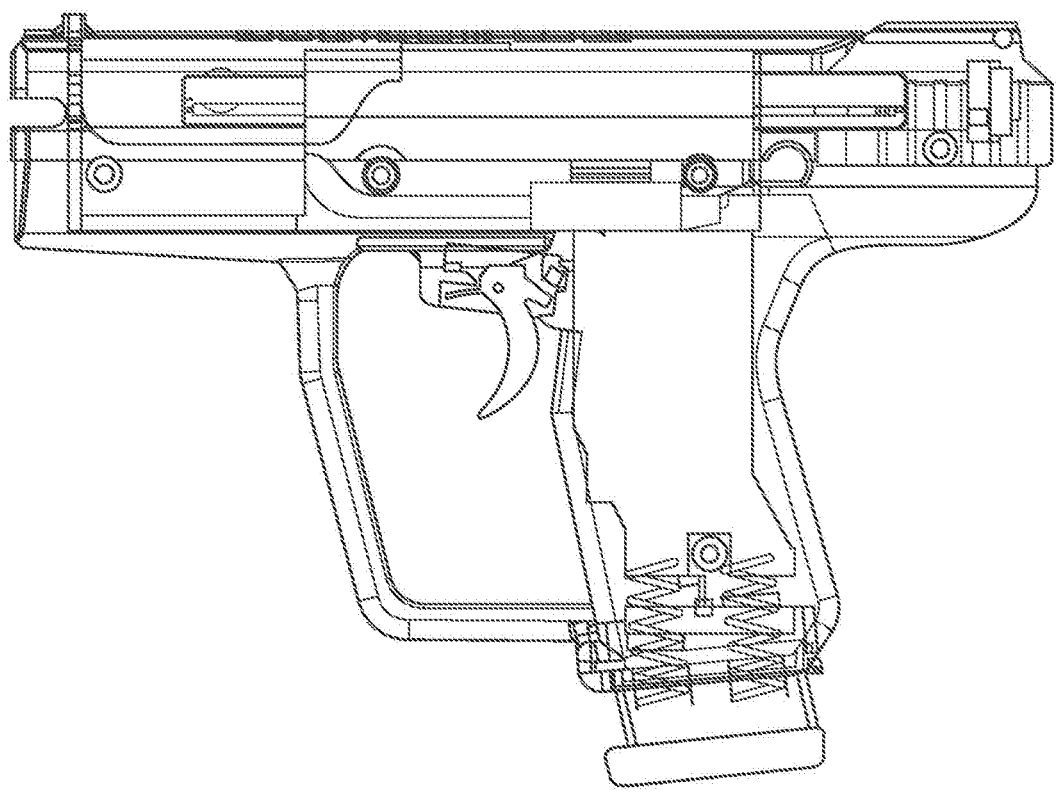
FIG. 70 is an internal side view of the peripheral embodiment shown in FIG. 69 with linear motor, sliding mass, and mechanical stop exposed.

FIG. 70 shows a transparent view of the simulated firearm embodiment shown in FIG. 69 with linear motor 500 and sliding mass 600 exposed as well as mechanical stop 800. As shown, mechanical stop 800 is visible towards the back of the simulated firearm body and is a multicomponent stop made from polypropylene and a rubber bumper. The polypropylene or other available plastics allow the slider to quickly impart energy without damaging sliding mass 600. The rubber bumper behind the polypropylene piece also allows the transfer of energy over time to be adjusted for the end user and additionally allows energy to be safely transferred to the body of the simulated firearm. This method of energy transfer, using a multicomponent mechanical stop 800, applies to all mechanical stops herein.

Figure 71:
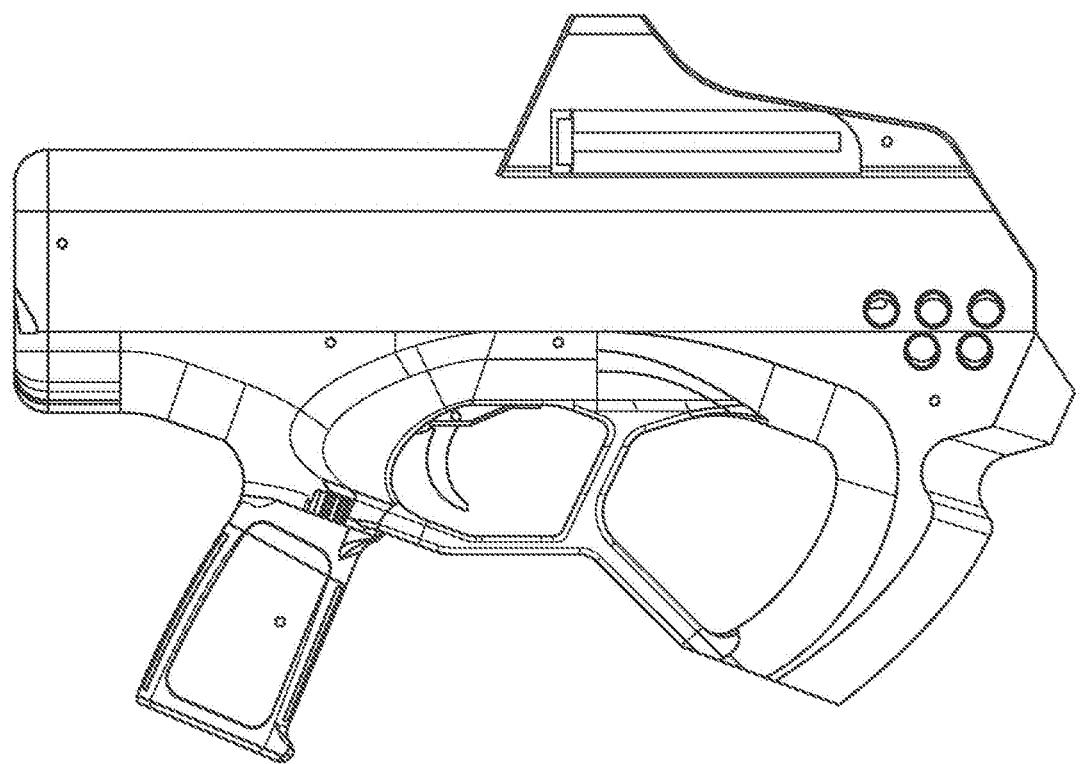
FIG. 71 is a side view of a virtual reality gaming peripheral, according to an exemplary embodiment of the present disclosure.
Figure 72:
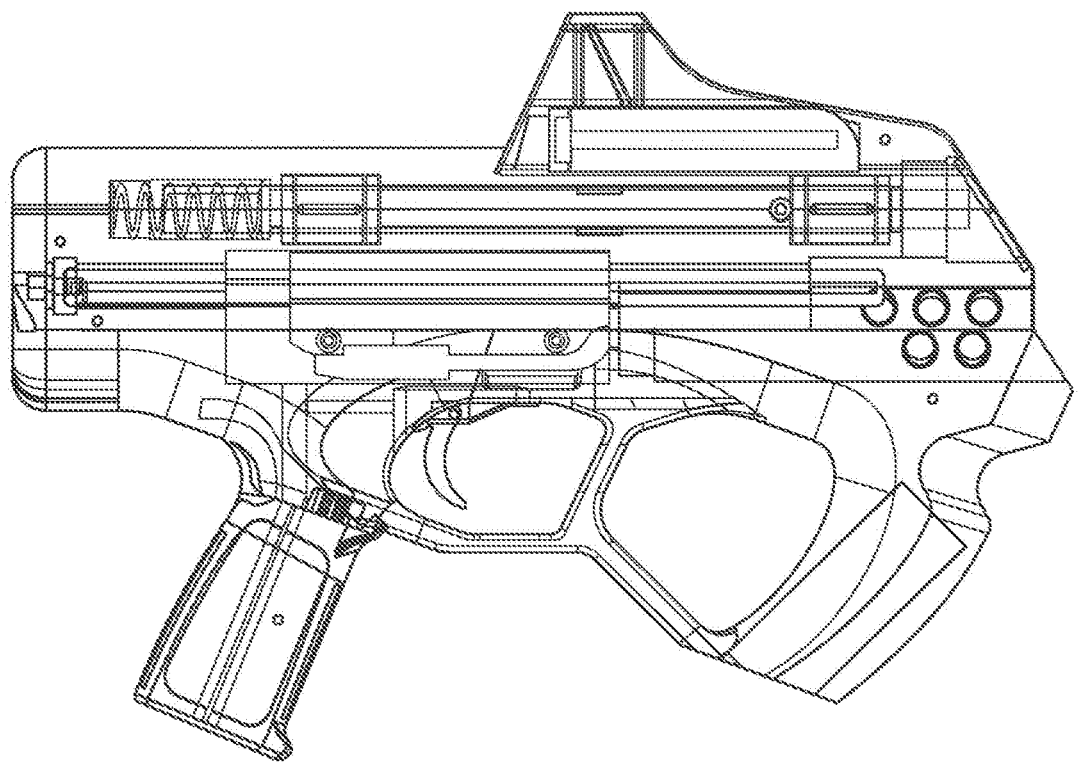
FIG. 72 is an internal side view of the virtual reality gaming peripheral shown in FIG. 71.

FIGS. 71 and 72 show side views of an additional virtual reality gaming peripheral. This peripheral utilizes the same type of multicomponent mechanical stop 800 as shown and described in the previous embodiment. This gaming peripheral has an added charging handle for simulating in-game-play charging (reloading) of the simulated firearm. It also may be tracked into the virtual reality game; however, this simulated peripheral body may be tracked by using magnetic tracking (positioning) with the mount for the tracker shown at the top of each figure.

These gaming peripherals do not have to come in the form of simulated firearms, they may come with the same base components: linear motor 500, sliding mass 600, mechanical stop 800, a power source and controller (that may be embedded within the body), a trigger, etc. and emulate other bodies. Those other bodies may be baseball bats, magic wands, tennis rackets, cricket bats, pool sticks, boxing gloves, traditional gamepads, two handed controllers, fishing rod and reel, light saber, sword, nun chucks (nunchaku), golf club, chainsaw, ax, knife police baton, chair, etc. In these embodiments, substantially the same shock or recoil forces may be emulated as were emulated in the simulated firearms described in the various embodiments herein.

For instance, consider a common chair where a linear motor recoil system has been implemented for use in training and simulation. The chair may be used with traditional games or simulations for deeper immersion via force feedback (shock and rumble). It may further be used for deeper immersion via force feedback in virtual reality environments where simulations having user 5 with a HMD sit in the chair and environments containing a sitting position may be emulated. Whether it be the chair in a simulated helicopter cockpit, a truck, or any other vehicle traditionally including a 'chair' for the operator to sit, each may be emulated for user 5.

Figure 73:
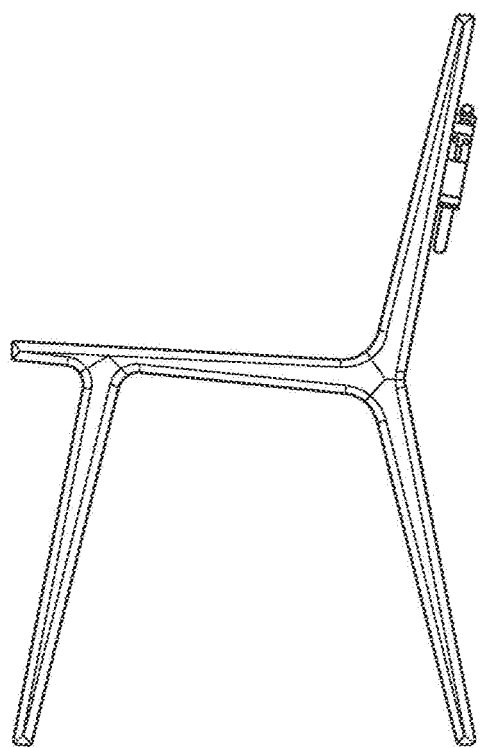
FIGS. 73 and 74 are side views showing two positions of a linear motor on a chair, according to an exemplary embodiment of the present disclosure.
Figure 74:
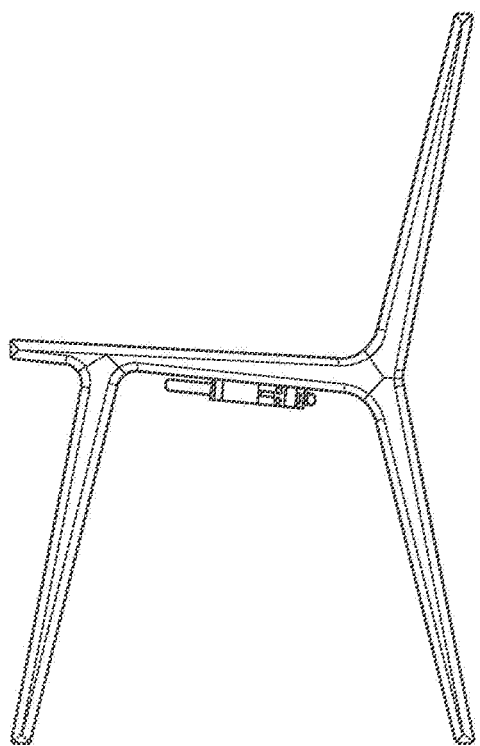

FIGS. 73 and 74 show a common chair used to illustrate two positions for linear motor 500 to produce recoil, shock, vibrations, force feedback, etc. for user 5. In the typical chair, user 5 is interfaced with the back of the chair and bottom of the chair that supports weight of user 5. By varying the linear motor as described herein, user 5 may experience force feedback and recoil effects that would not normally be available to him during game-play or training simulation.

Figure 75:
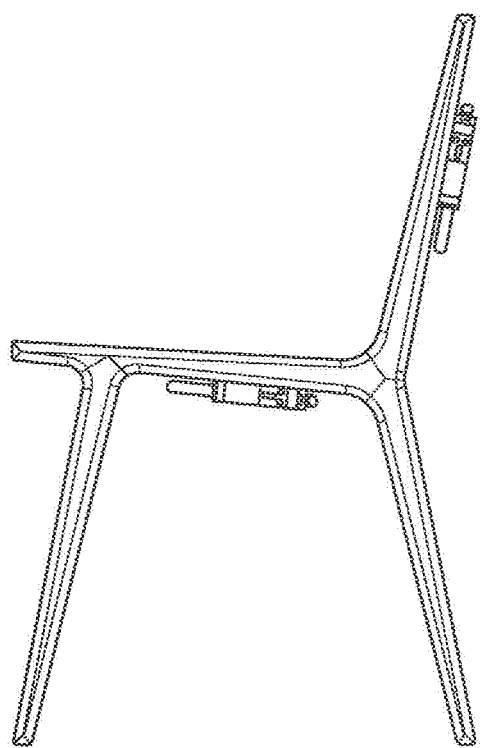
FIG. 75 is a side view of linear motors attached to the chair in both the positions of linear motor shown in FIGS. 73 and 74.

FIG. 75 shows two linear motors connected to both the back and bottom of a chair. These two or more (not pictured) linear motors may work in unison to produce recoil and force feedback associated effects for virtual reality experience of user 5 as it relates to what user 5 is perceiving in training simulation or game-play.

In an embodiment, the entire linear motor system may be contained within the chair or attached to the chair. This system may include the linear motor 500, sliding mass 600, mechanical stop 800, the linear motor controller, and the linear motor power source as described herein.

In embodiments, the linear motor system may be attached in the form of a shock stick as described herein.

Figure 76:
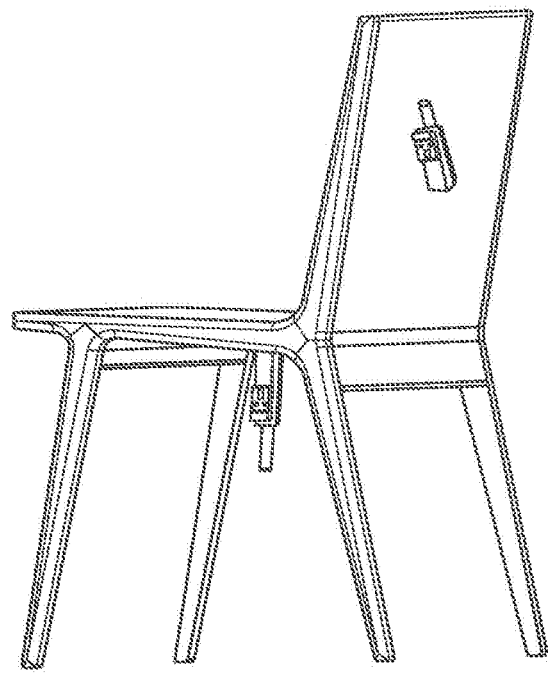
FIG. 76 is an isometric view of linear motors attached in different orientations on a chair, according to an exemplary embodiment of the present disclosure.

FIG. 76 shows an embodiment of the linear motors attached in different orientations to produce different effects (force vectors) to user 5.

In an embodiment, multiple linear motors may be attached to the bottom and to the back of the chair.

In embodiments, the linear motors may be driven via sound from the simulation or game that converts certain preset frequencies out to control the motion of the linear motor(s).

In other embodiments, the linear motor(s) may be driven directly from the simulation or game via the mechanism and flow diagram picture that is described herein.

In embodiments, the linear motor(s) may be attached to the legs of the chair.

Linear Motor System as an Attachment

Various advantages of using the linear motor system with a detachable part of firearm simulator body 20 may also be evident when using the detachable section as a drop in replacement to a real weapons system for simulation training. For instance, referring to FIGS. 2 and 3, FIG. 2 is a complete assembly of a firearm and FIG. 3 is the upper assembly of FIG. 2. In FIG. 3, the motor is housed in upper assembly 120 allowing it to be mated with lower assembly 140. Upper assembly 120, including the linear motor system, may be used as a drop in replacement of a real firearm for simulations training. Upper assembly 120, as shown and described previously, includes the laser assembly for target painting and the necessary feature set to emulate a real weapon. Upper assembly 120 may also include the controller and power unit to direct the motion of linear motor 500 for recoil production and secondary reactive force effects generated by the real weapon system being emulated.

To take the idea above further, the linear motor system may also be located in a typical butt stock housing for use as a detachable training piece or drop in kit.

Figure 77:
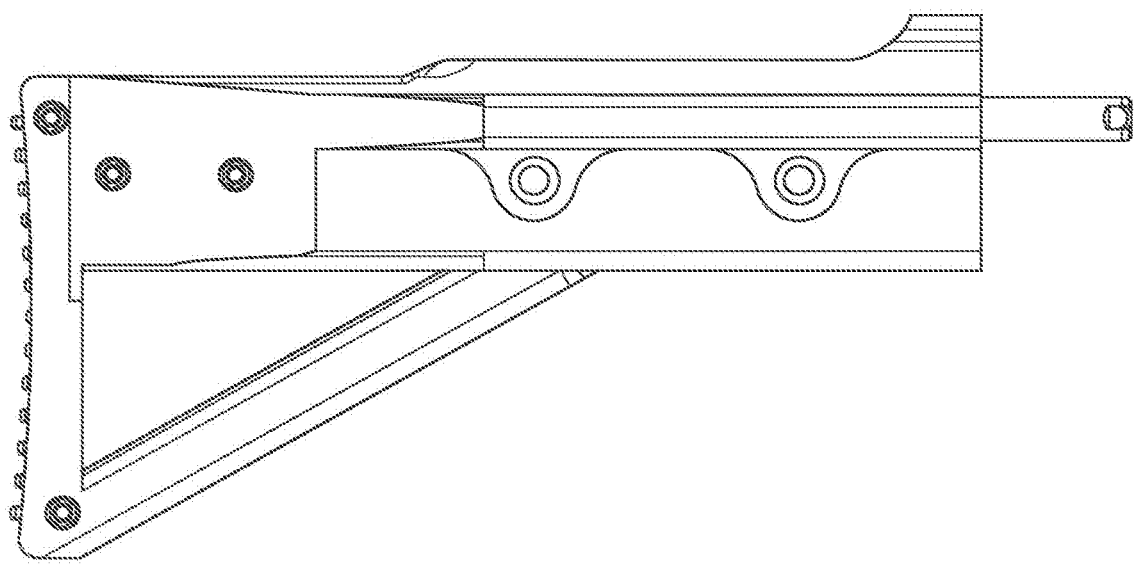
FIG. 77 is a side view of a modified butt stock including a linear motor system, according to an exemplary embodiment of the present disclosure.
Figure 78:
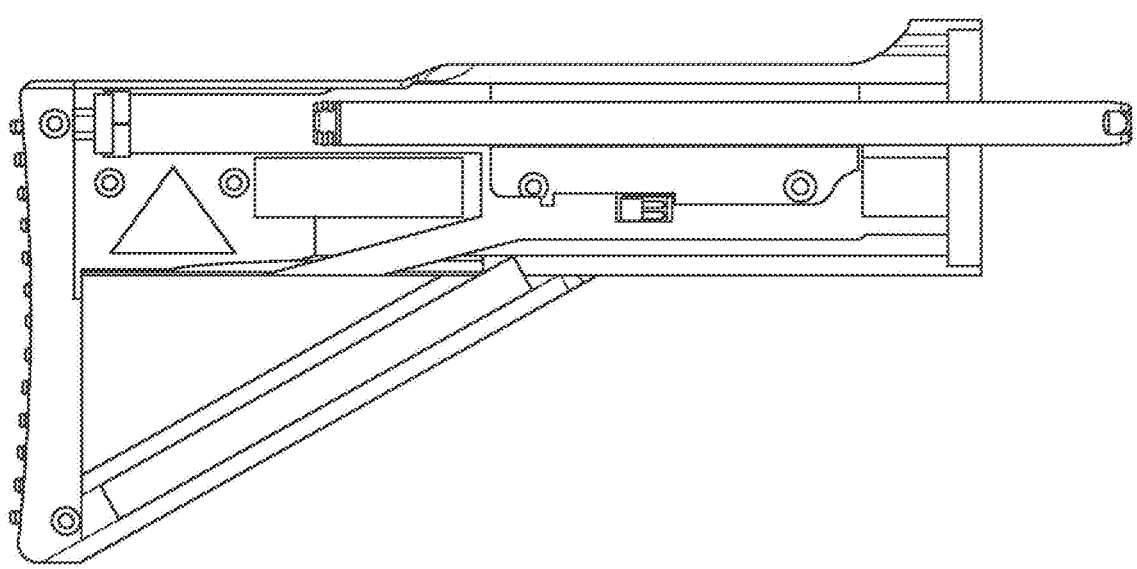
FIG. 78 is an internal side view of the modified butt stock shown in FIG. 77.

FIGS. 77 and 78 show a modified butt stock containing the linear motor system. The butt stock includes the mechanical stop and may also include the controller and power unit necessary to drive the motor. Butt stocks come in many different sizes and shapes and the location and placement of the linear motor and mechanical stop may be altered to accommodate theses space constraints. Moreover, the controller unit and power unit location within the butt stock may also be altered to reflect space constraints. Lastly, the forward-most position where the butt stock is attached to the body of either weapon simulator 20 or a real firearm as a drop in kit may also vary following the requirements of the attachment point from body 20 or from the real firearm that typical butt stocks attach.

Figure 79:
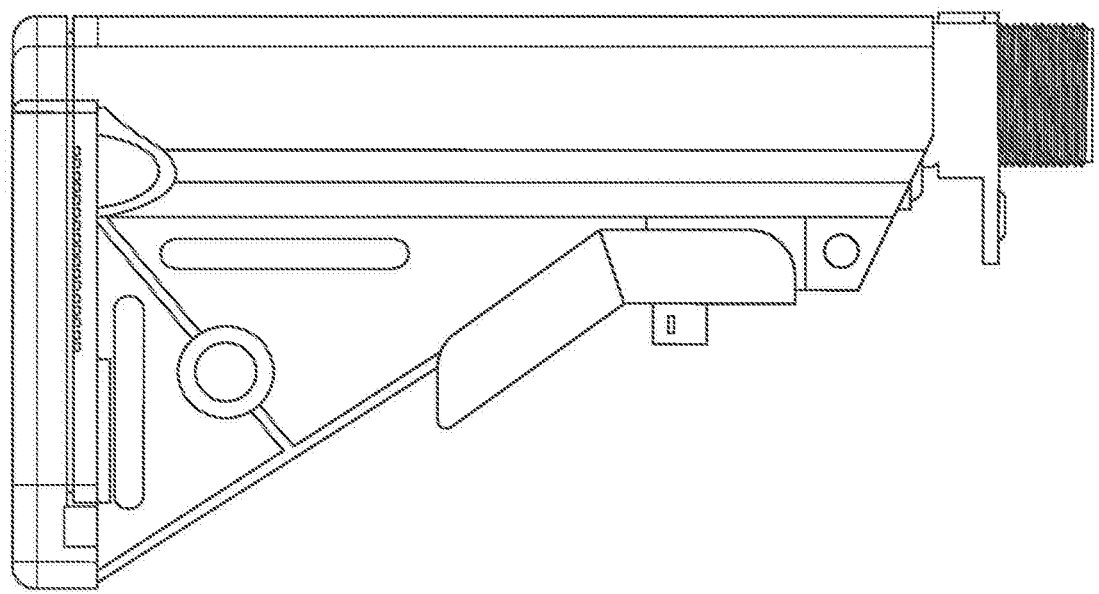
FIG. 79 is a side view of the modified butt stock shown in FIGS. 77 and 78 with a threaded buffer tube visible.

For reference to the attaching portion of the butt stock, threaded buffer tube 230 is visible in FIG. 79. The attachment point in the previous two figures may thus be modified to attach to the point of body 20 or to the traditional point in a real firearm as a drop in kit for simulations training.

The butt stock embodiment described herein may be powered by the power devices mentioned herein such as a battery, capacitor or super-capacitor pack, etc. The butt stock embodiment described herein may be controlled by the linear motor controllers described herein.

Shock Stick

Figure 80:
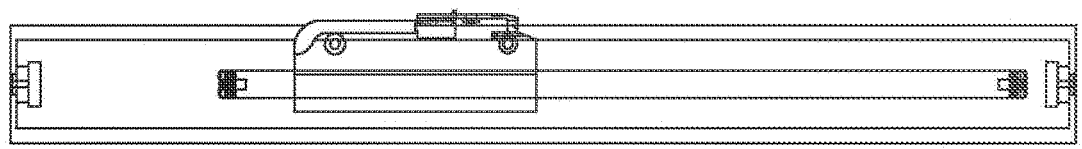
FIG. 80 is an internal side view of a shock stick including a linear motor housed inside a hollow cylinder, according to an exemplary embodiment of the present disclosure.
Figure 81:
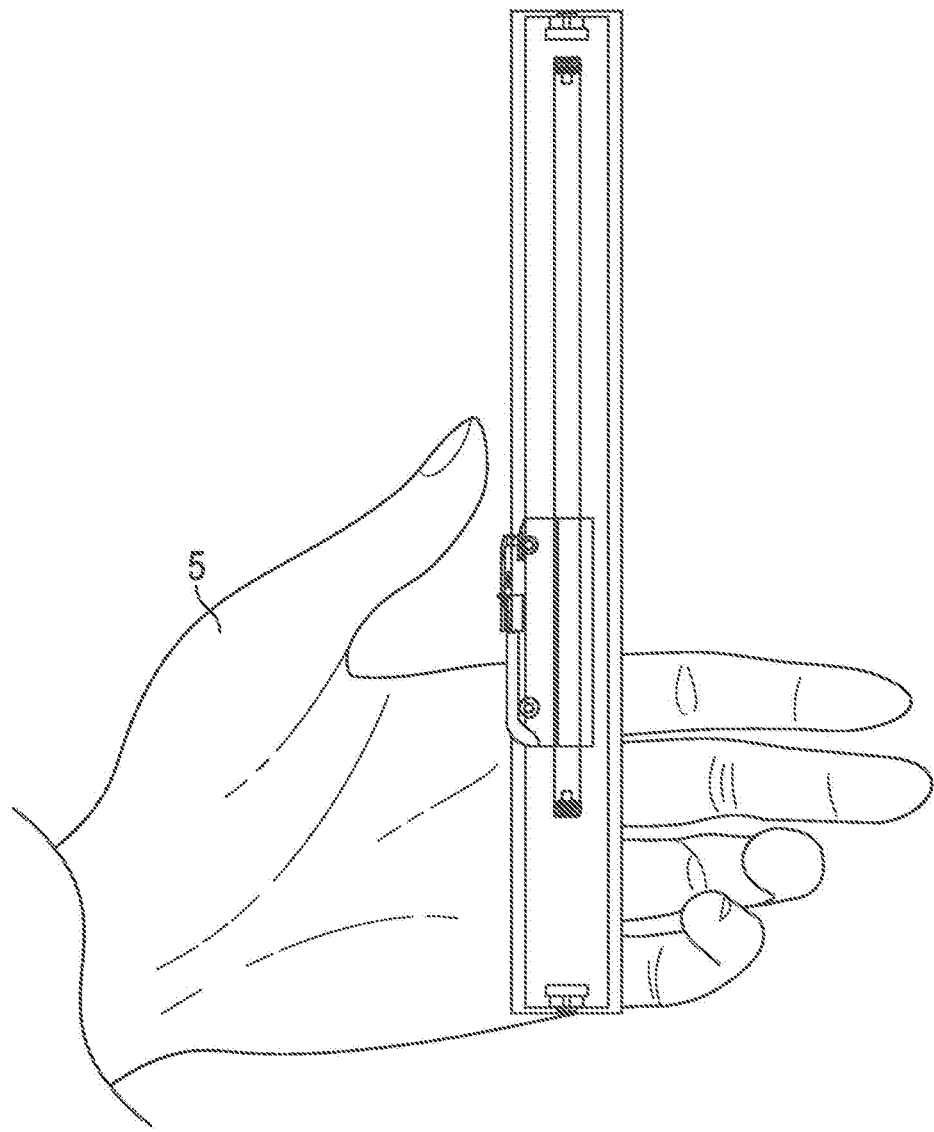
FIG. 81 is a schematic of a user holding the shock stick shown in FIG. 80.

FIG. 80 shows a linear motor 500 housed inside a hollow cylinder (shock stick) along with sliding mass 600 and two multipart mechanical stops on the left and right side of sliding mass 600. The multipart (multicomponent) mechanical stops 800 are described herein. As shown in FIG. 80, linear Motor 500 is offset to the left side of the shock stick. User 5 may hold the shock stick as shown in FIG. 81. The offset accounts for center of gravity effects so that user 5 may effectively hold the shock stick. The shock stick may produce all effects contained herein and include recoil, shock, vibration, transient vibration, force feedback, and other haptic effects described herein.

In an embodiment, mechanical stops 800 may be substantially the same.

In one embodiment, mechanical stops 800 may use different materials to produce different force versus time graphs even though linear motor is applying the same force versus time to each separate mechanical stop.

In embodiments, the shock stick may be inserted into different housings emulating different peripherals like baseball bats, magic wands, tennis rackets, cricket bats, pool sticks, boxing gloves, traditional gamepads, two handed controllers, fishing rod and reel, light saber, sword, nun chucks (nunchaku), golf club, chainsaw, ax, knife police baton, chair, etc.

In one embodiment, the shock stick may be used with another shock stick for game play.

In another embodiment, the shock stick may be used with two or more additional shock sticks and two or more peripheral bodies.

In other embodiments, the shock stick may be a virtual reality peripheral that may be used alone or in a separate housing as described herein.

In one embodiment, the shock stick's linear motor 500 may be moved up or down its linear path for center of gravity adjustment.

In other embodiments, the shock stick may transmit position data via tracking as described herein to the training simulation or game.

In various embodiments, the shock stick may be tetherless and include the linear motor system: linear motor 500, sliding mass 600, mechanical stop 800, a linear motor controller, and a power source.

In one embodiment, the shock stick may be tetherless and include a wireless communication device.

In other embodiments, the shock stick may recharge its power source through movement of user 5 via the same mechanism described herein.

In one embodiment, the shock stick embodiment may be sufficiently small to fit within a smartphone or cellphone housing for the generation of vibrations, force feedback, recoil, or shock.

In other embodiments, the shock stick—being sufficiently small to fit within a smartphone or cellphone housing—may be used to recharge the smartphone or cellphone though movement of user 5 via the same mechanism described herein.

In one embodiment, the shock stick's sliding mass 600 may be composed of a plurality of different types of magnets (neodymium, ceramic, etc.).

In embodiments, the shock stick's sliding mass 600 may be composed of a plurality of different types of magnets (neodymium, ceramic, etc.) and the magnets form a repeating pattern in the slider (i.e. neodymium, ceramic, neodymium, ceramic, etc.).

In one embodiment, the shock stick's sliding mass 600 may be composed of a plurality of different types of magnets (neodymium, ceramic, etc.) and the magnets form an irregular pattern in the slider (i.e. ceramic, neodymium, neodymium, ceramic, etc.). In another embodiment, the shock stick may include a connector plate configured such that its related power and communications may be placed on or inside a separate enclosure. For example, this enclosure may encompass a chair or other body where the shock stick may be inserted or removed from.

FIG. 82 shows user 5 holding a VR peripheral that may include the shock stick described herein which may be connected to the chair via a removable cable harness. As shown, the chair may include all the necessary electronics to power and communicate with the shock stick and the gaming console/computer running the game or simulation. In an embodiment, the shock stick as described herein may be removed from the VR peripheral and detached from the cable harness shown in FIG. 82 and inserted into the chair.

In one embodiment, the shock stick as described herein may be removed from the VR peripheral and inserted into the chair without the need of removing the cable harness.

FIG. 81 shows a user 5 holding the shock stick shown in FIG. 80. User 5 may wear a head mounted display or other virtual reality display described herein. The shock stick's position may be monitored via positional tracking and/or other tracking systems, e.g., the tracking systems described herein. Since user 5 is wearing the HMD, visual reality of user 5 is being altered. When user 5 looks down to see the shock stick, he may see one of the previously mentioned peripherals such as for example a tennis racket. As long as the grip on the shock stick (where user 5 physically holds the shock stick) feels substantially similar to the grip on a tennis racket, then user 5 may be tricked into believing that he/she is holding a tennis racket. The training simulation or in-game-play may further be enhanced when linear motor kinematically moves as described herein. This experience applies to the breadth of one and two-handed peripherals or objects. For instance, the tennis racket may be considered a one-handed object. The baseball bat, since two hands are used at once, may be considered a two-handed object. These objects may both be successfully emulated by the shock stick as long as physical contact points of user 5 with the shock stick 'feel real' and successfully physically recreate the sensations by such physical grips.

Therefore, in an embodiment, a plurality of grips may be applied to the shock stick for proper emulation of the object being emulated in the simulation or in-game-play.

Figure 83:
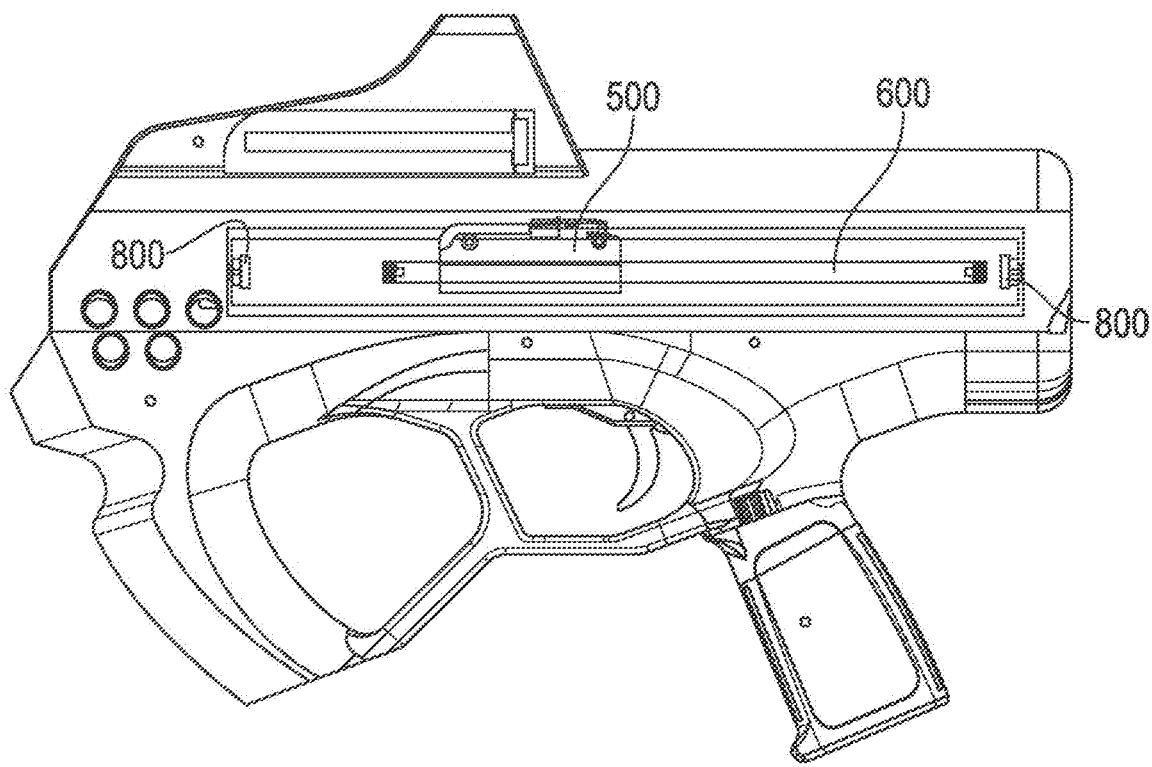
FIG. 83 is an internal side view of a shock stick inserted into a peripheral body, according to an exemplary embodiment of the present disclosure.

FIG. 83 shows the shock stick inserted into a peripheral body. The peripheral body may contain all the necessary elements to: power, communicate, control, and send signals to and from the body either in wired or wireless form.

In other embodiments, the shock stick may be inserted into different housings that contain the correct grips for that housing embodiment and may have a plurality of grips that may be applied to the housing the shock stick is inserted into. As shown in FIG. 83, the forward grip to the left and the back grip to the right are examples of grips that may conform to tricking user 5 into thinking that they are holding a simulated weapon/gaming gun peripheral in VR since they emulate the correct feel and placement of a wide range of available grips that may be found on weapons.

Standing and Transient Produced Wave Forms

Figure 55:
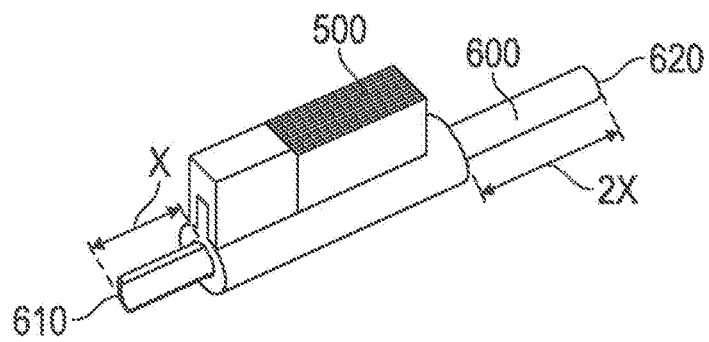
FIG. 55 is a perspective view of a linear motor and sliding mass/rod combination, according to an exemplary embodiment of the present disclosure.

FIG. 55 is a perspective view of a linear motor 500 and sliding mass/rod 600 combination. In various embodiments, linear motor 500 may be programmed to cause sliding rod/mass 600 to move kinematically in a predefined controlled manner to produce various different predefined standing or resonant frequencies of sliding rod/mass 600 for imposing/creating predefined force, acceleration, velocity, location of center of gravity of sliding rod/mass 600, momentum, and impulse. In embodiments, the standing or resonant frequencies may have the following properties:

(1) standing amplitudes,
(2) standing periods, and
(3) standing frequencies.

Figure 56:
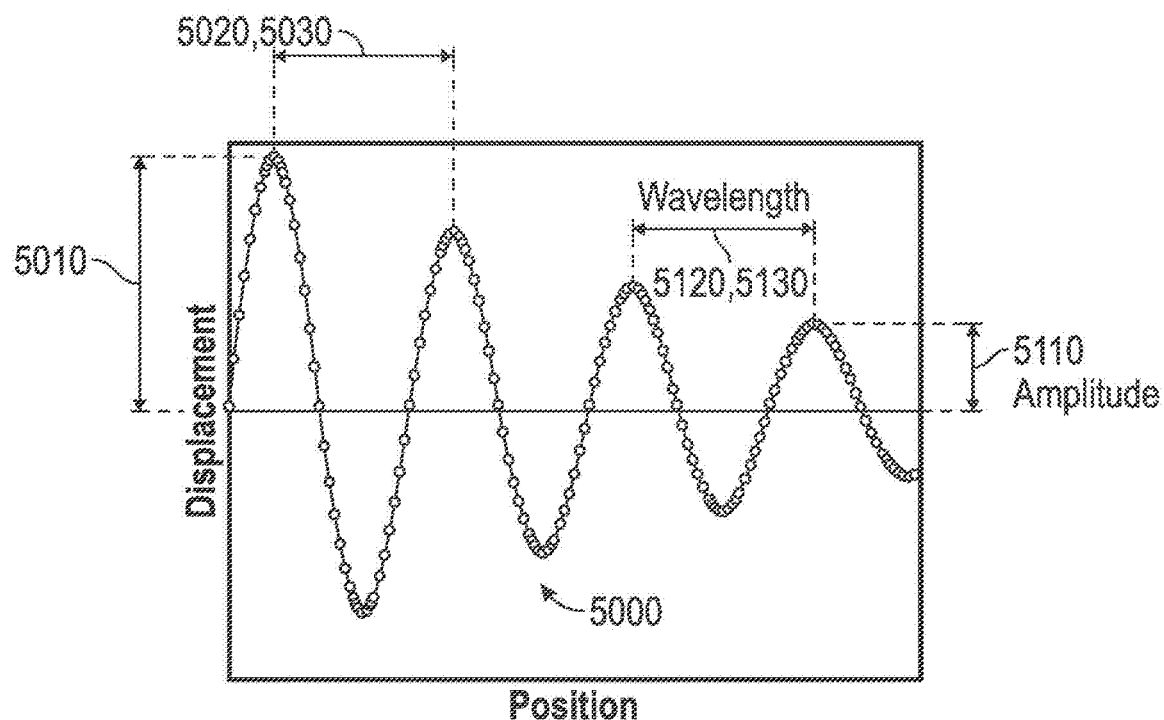
FIG. 56 is a diagram of a standing or resonating wave form with a changing property such as amplitude, according to an exemplary embodiment of the present disclosure.
Figure 57:
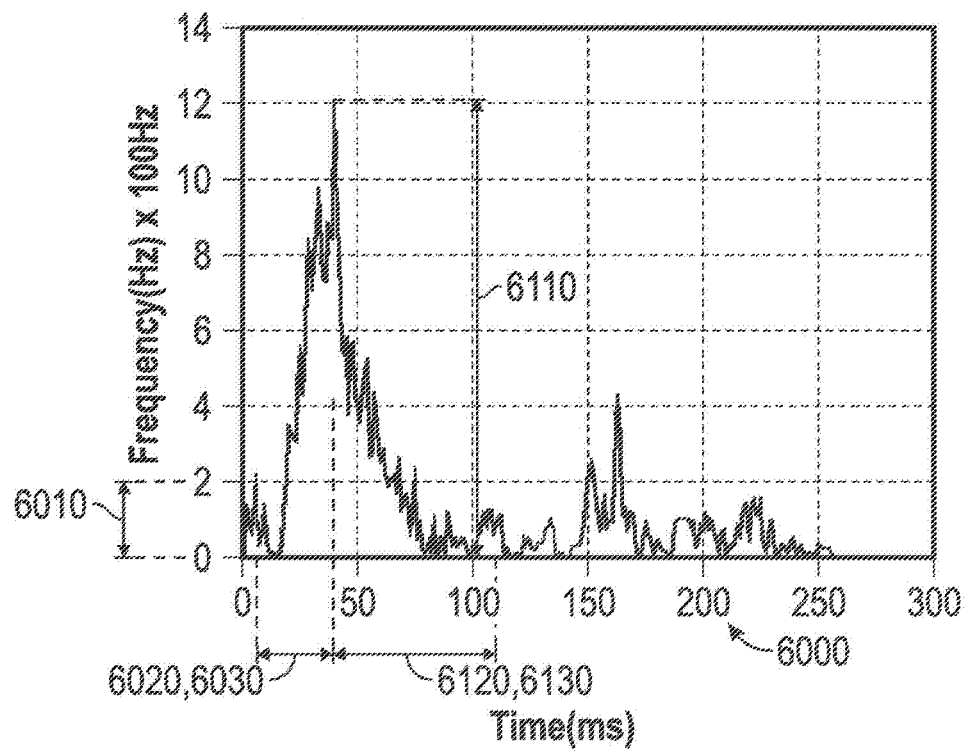
FIG. 57 is a diagram of various transient wave forms with different properties of amplitude and period, according to an exemplary embodiment of the present disclosure.

FIG. 56 shows a standing or resonating wave form 5000 with a changing property such as amplitude 5010. FIG. 57 shows various transient wave form 6000 with different properties of amplitude 6010 and period 6030.

Figure 58:
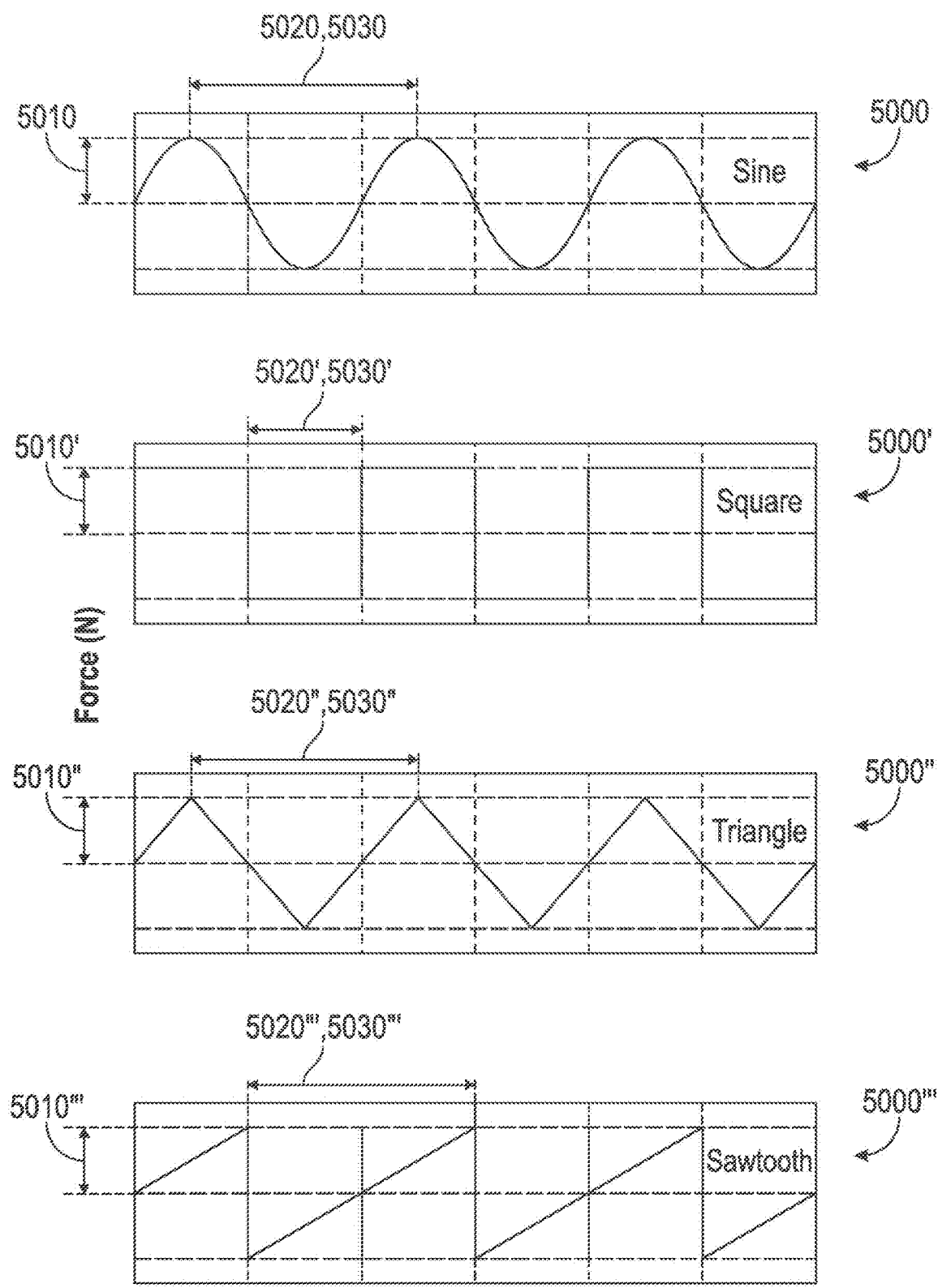
FIG. 58 is a diagram of various types of standing or resonating waveforms with constant wave form properties, according to an exemplary embodiment of the present disclosure.

FIG. 58 shows various types of standing or resonating waveforms forms 5000 (sinusoidal), 5000' (step or rectangular), 5000" (triangular), and 5000'" (sawtooth) with constant wave form properties of amplitude 5010, wave length 5020 and period 5030. Wavelength and period are functions of each other based on the velocity of the wave and the formula wave length is equal to velocity of wave times period of wave. Period is equal to the reciprocal of the frequency.

In various embodiments, the original and/or different kind of standing or resonant frequencies may be selected from the group of standing wave frequencies including sinusoidal, sawtooth, triangular, rectangular, and/or step wave functions. In various embodiments linear motor 500 may switch between producing the type or kind of standing or resonant wave form. In embodiments, linear motor 500 controlling sliding mass/rod 600 may be programmed to switch between producing different standing or resonant frequencies from a set of a plurality of possible predefined standing or resonant frequencies, the selection being based on different gaming events (e.g., satisfaction of a gaming goal or failure of a gaming goal) and/or different user input.

In embodiments, linear motor 500 may switch between producing the same type or kind of standing or resonant wave form, but with different wave form properties such as (1) standing amplitudes, (2) standing periods, and/or (3) standing frequencies. In various embodiments, for a particularly imposed standing or resonant wave form, linear motor 500 may vary a selected property of the imposed wave form (e.g., amplitude, period, frequency) from an initial predefined standing or resonant predefined waveform property value to a second selected predefined standing or resonant predefined waveform property value by a minimum percentage of change from the initial value, such as at least 5 percent change in value (e.g., the standing amplitude is changed in value by at least 5 percent of the initial predefined standing or resonant amplitude value). In embodiments, the percentage of change may be at least 5, 10, 15, 20, 25, 30, 35, 40, 45, 50, 55, 60, 65, 70, 75, 80, 85, 90, 95, and/or 99 percent from the initial predefined value of the standing or resonant wave form property to the changed value. In other embodiments, the percentage of change of the selected property may be within a range of percentage change which range is selected from between any two of the above specified percentages of minimum change (e.g., between 10 and 45 percent of change).

Linear motor 500 may be programmed to produce one or more transient vibrations in force, acceleration, velocity, location of center of gravity of sliding rod/mass 600, momentum, and/or impulse which are superimposed over standing resonant frequencies in force, acceleration, velocity, location of center of gravity of sliding rod/mass 600, momentum, and impulse being produced by linear motor 500. In various embodiments the superimposed transient frequencies may have the following properties:
(1) transient amplitudes,
(2) transient periods,
(3) transient frequencies,
(4) transient time length of superimposition, and
(5) transient time length of gaps between transient time lengths of superimposition.

Figure 59:
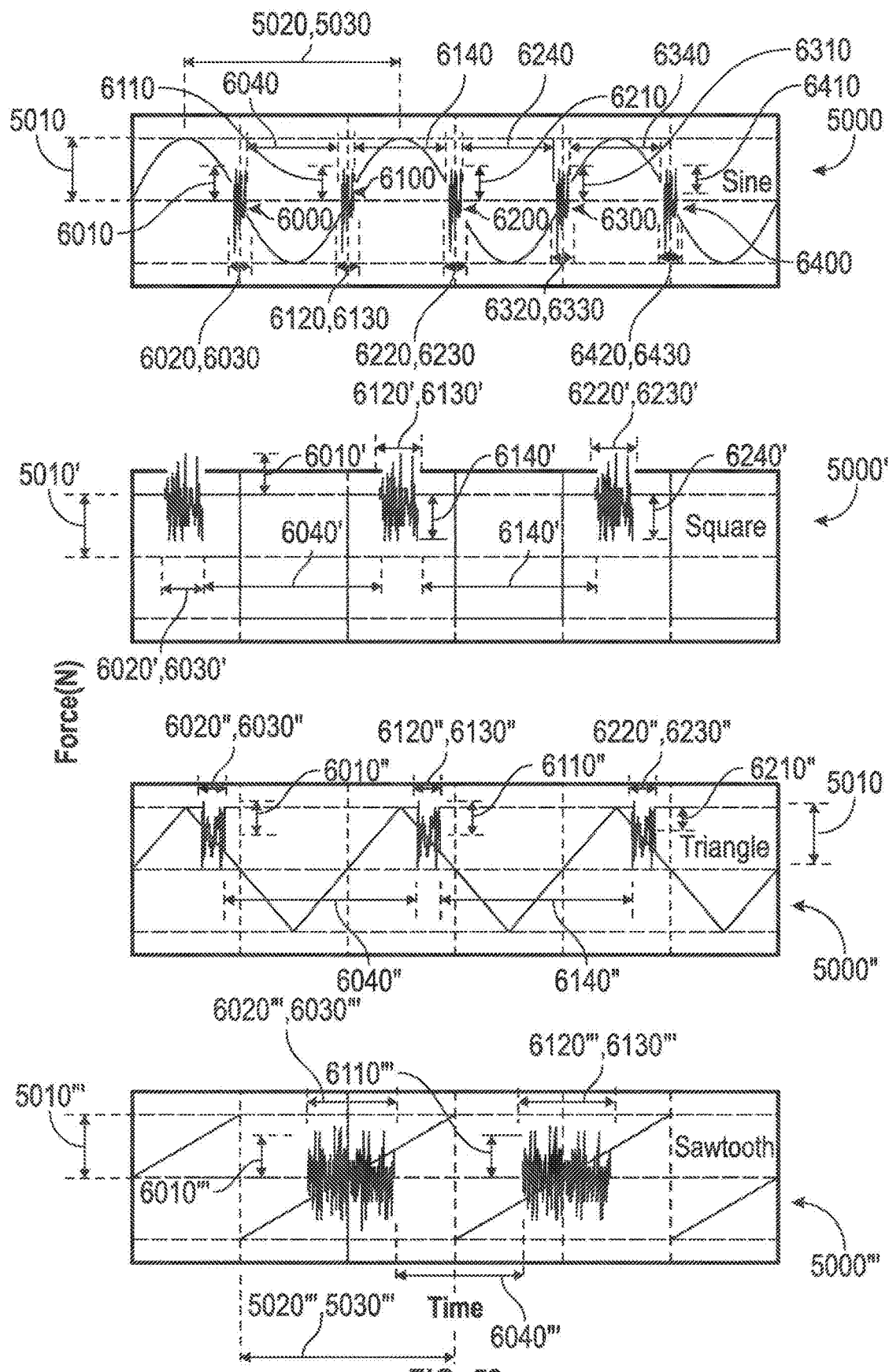
FIG. 59 is a diagram of various types of standing or resonating waveforms with constant wave form properties but with superimposed transient wave forms with changing wave form properties, according to an exemplary embodiment of the present disclosure.

FIG. 59 shows various types of standing or resonating waveforms (sinusoidal), 5000' (step or rectangular), 5000" (triangular), and 5000''' (sawtooth) with constant 10 wave form properties but with superimposed transient wave forms 6000 with possible changing wave form properties.

For sinusoidal resonant or standing waveform 5000 produced by linear motor 500, linear motor may also be programmed to produce various transient wave forms such as wave forms 6000, 6100, 6200, 6300, and 6400. In embodiments, the properties (e.g., amplitude, period, and wavelength, along with time gap between transient wave forms) of each transient wave form 6000, 6100, 6200, 6300, and 6400 may be substantially the same as the other produced transient wave forms. In various embodiments, one or more of the properties (e.g., amplitude, period, and wavelength, along with time gap between transient wave forms) of each transient wave form 6000, 6100, 6200, 6300, and 6400 may be the same as the other transient wave forms in its properties (e.g., amplitude, period, and wavelength, along with time gap between transient wave forms). For example, amplitude 6010 may be that same as amplitude 6110, 6210, and/or 6310. As another example, period 6020 may be the same as periods 6120, 6220, and/or 6320. In another example, wavelength 6030 may be the same as wavelengths 6130, 6230, and/or 6330. In yet another example, time gap 6040 may be the same as time gaps 6140, 6240, and/or 6340. Similar examples for the transient wave forms may be provided for superimposing on standing or resonating wave forms 5000', 5000", and 5000'''.

In various embodiments, one or more of the properties (e.g., amplitude, period, and wavelength, along with time gap between transient wave forms) of each transient wave form 6000, 6100, 6200, 6300, and 6400 may be varied from the respective properties of one or more of the same respective properties (e.g., amplitude, period, and wavelength, along with time gap between transient wave forms) for one or more of the other produced transient wave forms. For example, amplitude 6010 may be different from amplitude 6110, 6210, and/or 6310. As an example, period 6020 may be different from periods 6120, 6220, and/or 6320. In another example, wavelength 6030 may be different from wavelengths 6130, 6230, and/or 6330. In yet another example, time gap 6040 may be different from time gaps 6140, 6240, and/or 6340. Similar examples for the transient wave forms may be given for superimposing on standing or resonating wave forms 5000', 5000", and 5000'''.

In various embodiments, linear motor 500 may switch between producing the same type or kind of standing or resonant wave form, but with different wave form properties such as (1) transient amplitudes, (2) transient periods, (3) transient frequencies, (4) transient time length of superimposition, and/or (5) transient time length of gaps between transient time lengths of superimposition. In embodiments, for a particularly imposed transient frequency, linear motor 500 may vary a selected property of the imposed transient frequency (e.g., amplitude, period, frequency, length of time of superimposition, length of time gap between imposition of different transient frequency wave forms) from an initial predefined transient waveform property value to a second selected predefined transient waveform property value by a minimum percentage of change from the initial value, such as at least 5 percent change in value (e.g., the transient amplitude is changed in value by at least 5 percent of the initial predefined transient amplitude value). In embodiments, the percentage of change may be at least 5, 10, 15, 20, 25, 30, 35, 40, 45, 50, 55, 60, 65, 70, 75, 80, 85, 90, 95, and/or 99 percent from the initial predefined value of the transient wave form property to the changed value. In various embodiments, the percentage of change of the selected property may be within a range of percentage change which range is selected from between any two of the above specified percentages of minimum change (e.g., between 10 and 45 percent of change).

Linear motor 500 controlling sliding mass/rod 600 may be programmed to produce and/or switch between producing different transient frequencies from a set of a plurality of possible predefined transient frequencies, the selection being based on different gaming events (e.g., satisfaction of a gaming goal or failure of a gaming goal) and/or different user input. In various embodiments, the production and/or switching may be intended to emulate a shock from virtual gaming play. Shock is a term for extreme forces that matter is subjected to (usually measured as acceleration versus time). A mechanical or physical shock is a sudden acceleration or deceleration caused, for example, by impact, drop, kick, earthquake, or explosion. The recoil described herein is also a form of shock. Shock may be characterized by its peak acceleration, the duration, and the shape of the shock pulse (e.g., half sine, triangular, trapezoidal, etc.). The shock response spectrum is a method for further evaluating a mechanical shock.

In embodiments, the amplitude of a particular superimposed transient frequency produced by linear motor 500 controlling sliding mass/rod 600 may be varied over time. In various embodiments, the amplitude may decrease over time, increase over time, or decrease and increase over time.

The frequency of a superimposed transient frequency produced by linear motor 500 controlling sliding mass/rod 600 may be varied over time. In various embodiments, the frequency may decrease over time, increase over time, or decrease and increase over time.

In various embodiments, one or more of the above specified properties of a particular superimposed transient frequency produced by linear motor 500 controlling sliding mass/rod 600 may be varied between different superimposed transient frequencies on the same standing resonant frequency created by linear motor 500.

Transient wave functions may be used to simulate various abnormal operating conditions even in firearms, such as a mechanical failure, misfire, jamming, and failure to feed a second round of ammunition to fire which causes or may cause jamming.

As to a further discussion of the manner of usage and operation of the present disclosure, the same should be apparent from the above description. Accordingly, no further discussion relating to the manner of usage and operation will be provided.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted.

What is claimed is:

1. A firearm simulator, comprising:
   a body configured to simulate a firearm;
   a linear motor mounted on the body, the linear motor having a sliding mass and at least two independently controllable magnetic coils that are magnetically coupled to the sliding mass;
   a cocking lever or charging handle that is movably mounted on the body and that is operatively coupled to the sliding mass of the linear motor such that when a user moves the cocking lever or charging handle to simulate a cocking or ammunition charging operation, the sliding mass moves with the cocking lever or charging handle; and
   a controller that is operatively coupled to the linear motor and that sends a control signal to the linear motor that causes the sliding mass of the linear motor to exert a resistance force on the cocking lever or charging handle that acts to resist movement of the cocking lever or charging handle.

2. The firearm simulator of claim 1, wherein the control signal causes the sliding mass to exert a first resistance force on the cocking lever or charging handle as the cocking lever or charging handle travels over a first distance.

3. The firearm simulator of claim 2, wherein the first resistance force simulates a force that a first spring having a first spring constant would apply to the cocking lever or charging handle.

4. The firearm simulator of claim 2, wherein the control signal causes the sliding mass to exert a second resistance force on the cocking lever or charging handle as the cocking lever or charging handle travels over a second distance after having traveling over the first distance.

5. The firearm simulator of claim 4, wherein the first resistance force simulates a force that a first spring having a first spring constant would apply to the cocking lever or charging handle, and wherein the second resistance force simulates a force that a second spring having a second spring constant would apply to the cocking lever or charging handle.

6. The firearm simulator of claim 4, wherein the first resistance force simulates a force that a first spring having a first spring constant would apply to the cocking lever or charging handle, and wherein the second resistance force simulates forces that both the first spring and a second spring having a second spring constant would together apply to the cocking lever or charging handle.

7. The firearm simulator of claim 1, wherein the cocking lever or charging handle is configured such that when a user grasps and moves the cocking lever or charging handle to simulate a cocking or ammunition charging operation, the cocking lever or charging handle moves between a rest position and an actuated position.

8. The firearm simulator of claim 7, wherein when the user releases the cocking lever or charging handle after moving the cocking lever or charging handle to the actuated position, the control signal causes the sliding mass to push the cocking lever or charging handle back to the rest position.

9. The firearm simulator of claim 7, wherein the cocking lever or charging handle is configured such that when the cocking lever or charging handle is in the rest position, the sliding mass is not coupled to the cocking lever or charging handle, and such that as the cocking lever or charging handle moves away from the rest position, the sliding mass becomes coupled to the cocking lever or charging handle such that the sliding mass moves as the cocking lever or charging handle continues to move toward the actuated position.

10. The firearm simulator of claim 9, wherein when the user releases the cocking lever or charging handle after moving the cocking lever or charging handle to the actuated position, the control signal causes the sliding mass to push the cocking lever or charging handle back to the rest position, and wherein when the cocking lever or charging handle arrives back at the rest position, the cocking lever or charging handle becomes disconnected from the sliding mass.

11. The firearm simulator of claim 7, further comprising an energy storage device mounted on the body and operatively coupled to the linear motor, wherein when a user moves the cocking lever or charging handle from the rest position to the actuated position, the sliding mass of the linear motor moves relative to the at least two coils, causing the at least two coils to generate electrical energy that is stored in the energy storage device.

12. A firearm simulator, comprising:
   a body configured to simulate a firearm;
   a linear motor mounted on the body, the linear motor having a sliding mass and at least two independently controllable magnetic coils that are magnetically coupled to the sliding mass;
   a cocking lever or charging handle that is movably mounted on the body and that is operatively coupled to the sliding mass of the linear motor such that when a user moves the cocking lever or charging handle to simulate a cocking or ammunition charging operation, the sliding mass moves with the cocking lever or charging handle;
   a controller that is operatively coupled to the linear motor and that sends a control signal to the linear motor; and
   an energy storage device mounted on the body and operatively coupled to the linear motor, wherein when a user moves the cocking lever or charging handle to simulate a cocking or ammunition charging operation the sliding mass of the linear motor moves relative to the at least two coils, causing the at least two coils to generate electrical energy that is stored in the energy storage device.

13. The firearm simulator of claim 12, wherein when a user moves the cocking lever or charging handle to simulate a cocking or ammunition charging operation, the controller sends a control signal to the linear motor that causes the sliding mass of the linear motor to exert a resistance force on the cocking lever or charging handle that acts to resist movement of the cocking lever or charging handle.

14. The firearm simulator of claim 13, wherein the control signal causes the sliding mass to exert a first resistance force on the cocking lever or charging handle as the cocking lever or charging handle travels over a first distance.

15. The firearm simulator of claim 14, wherein the first resistance force is intended to simulate a force that a first spring having a first spring constant would apply to the cocking lever or charging handle.

16. The firearm simulator of claim 13, wherein the control signal causes the sliding mass to exert a second resistance force on the cocking lever or charging handle as the cocking lever or charging handle travels over a second distance after having traveling over the first distance.

17. The firearm simulator of claim 16, wherein the first resistance force is intended to simulate a force that a first spring having a first spring constant would apply to the cocking lever or charging handle, and wherein the second resistance force is intended to simulate a force that a second spring having a second spring constant would apply to the cocking lever or charging handle.

18. The firearm simulator of claim 16, wherein the first resistance force is intended to simulate a force that a first spring having a first spring constant would apply to the cocking lever or charging handle, and wherein the second resistance force is intended to simulate a force that both the first spring and a second spring having a second spring constant would together apply to the cocking lever or charging handle.

19. The firearm simulator of claim 13, wherein the cocking lever or charging handle is configured such that when a user grasps and moves the cocking lever or charging handle to simulate a cocking or ammunition charging operation, the cocking lever or charging handle moves between a rest position and an actuated position.

20. The firearm simulator of claim 19, wherein when the user releases the cocking lever or charging handle after moving the cocking lever or charging handle to the actuated position to simulate a cocking or ammunition charging operation, the control signal causes the sliding mass to push the cocking lever or charging handle back to the rest position.

21. The firearm simulator of claim 19, wherein the cocking lever or charging handle is configured such that when the cocking lever or charging handle is in the rest position, the sliding mass is not coupled to the cocking lever or charging handle, and such that as the cocking lever or charging handle moves away from the rest position, the sliding mass becomes coupled to the cocking lever or charging handle such that the sliding mass moves as the cocking lever or charging handle continues to move toward the actuated position.

* * * * *